(12) United States Patent
Sevindik

(10) Patent No.: US 12,328,475 B2
(45) Date of Patent: *Jun. 10, 2025

(54) METHODS AND APPARATUS FOR DYNAMIC CABLE NETWORK POWER MANAGEMENT

(71) Applicant: Charter Communications Operating, LLC, St. Louis, MO (US)

(72) Inventor: Volkan Sevindik, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/732,109

(22) Filed: Jun. 3, 2024

(65) Prior Publication Data

US 2024/0323485 A1 Sep. 26, 2024

Related U.S. Application Data

(63) Continuation of application No. 17/384,215, filed on Jul. 23, 2021, now Pat. No. 12,003,816.

(51) Int. Cl.
    *H04N 21/443* (2011.01)
(52) U.S. Cl.
    CPC ......... *H04N 21/4436* (2013.01); *Y02D 30/50* (2020.08)
(58) Field of Classification Search
    CPC .......................... H04N 21/4436; Y02D 30/50
    See application file for complete search history.

(56) References Cited

U.S. PATENT DOCUMENTS

| 2008/0123568 A1* | 5/2008 | Rofougaran | H04L 12/2801 370/279 |
|---|---|---|---|
| 2008/0260389 A1* | 10/2008 | Zheng | H04Q 11/0067 398/115 |
| 2013/0051225 A1* | 2/2013 | Pullen | H04L 47/12 370/468 |
| 2013/0094551 A1* | 4/2013 | Ling | H04L 7/0033 375/222 |
| 2013/0188482 A1* | 7/2013 | Lee | H04L 47/25 370/235 |
| 2014/0269293 A1* | 9/2014 | Patrick | H04L 47/32 370/233 |
| 2015/0067815 A1* | 3/2015 | Overcash | H04L 63/101 726/11 |
| 2016/0021208 A1* | 1/2016 | Freiman | H04L 67/306 709/203 |

* cited by examiner

*Primary Examiner* — Randy A Flynn
(74) *Attorney, Agent, or Firm* — Straub & Straub; Stephen T. Straub; Michael P. Straub

(57) ABSTRACT

The presentation invention relates to methods and apparatus for managing cable network power consumption. An exemplary method in accordance with one embodiment includes the steps of: receiving a message by a cable modem instructing the cable modem to reduce power consumption; increasing, by the cable modem, a buffer size of at least one of: (i) a cable modem downlink buffer included in the cable modem, or (ii) a cable modem uplink buffer included in the cable modem in response to receiving the message; and switching, by the cable modem, from a first mode of operation to a second mode of operation after performing one or both of: (i) transmitting uplink data to the cable modem termination system, and (ii) transmitting downlink data to a wireless base station, said second mode of operation being a power savings modem of operation.

20 Claims, 32 Drawing Sheets

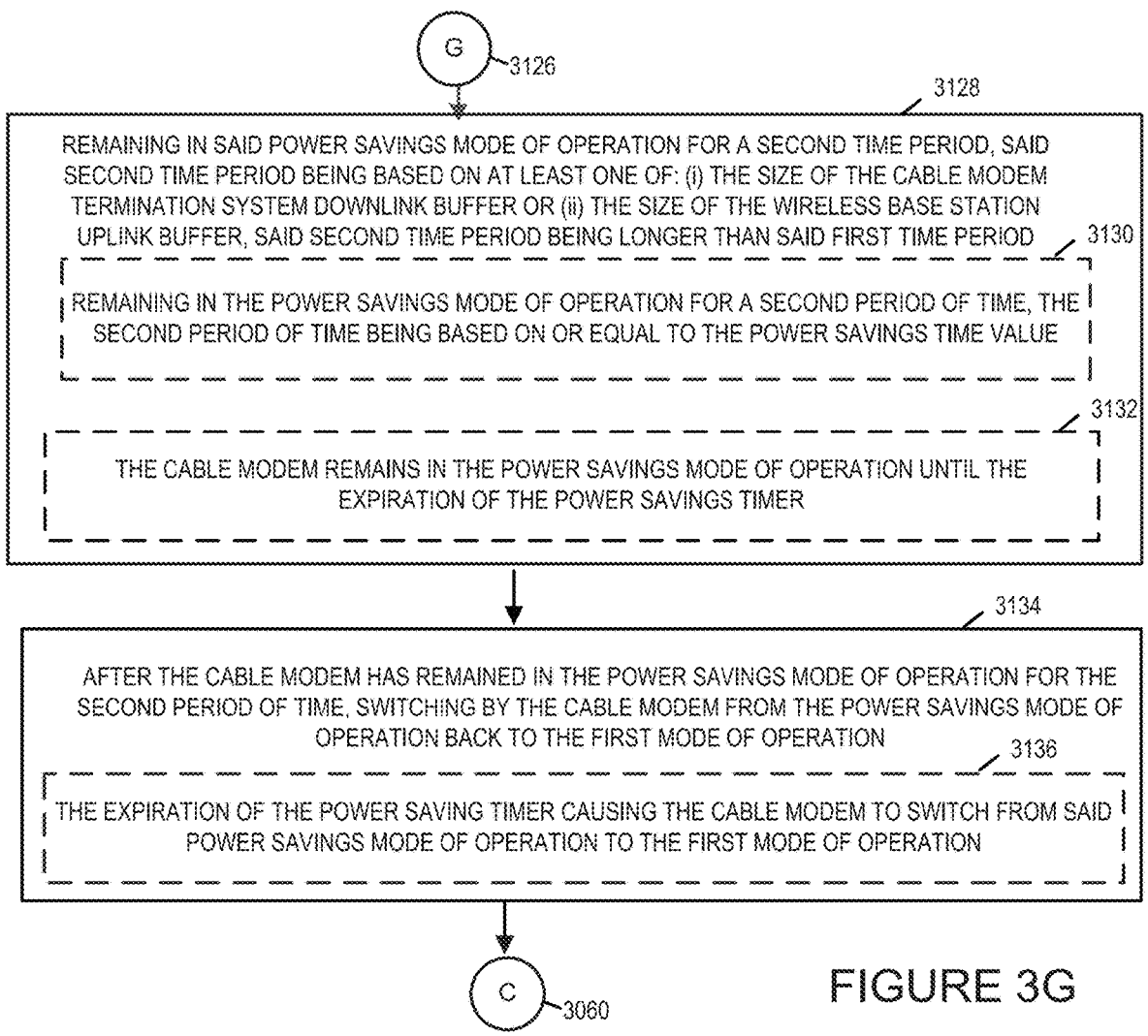

METHODS AND APPARATUS FOR DYNAMIC CABLE NETWORK POWER MANAGEMENT

RELATED APPLICATIONS

The present application is a continuation of U.S. patent application Ser. No. 17/384,215 filed on Jul. 23, 2021 which published as U.S. Patent Application Publication No.: US 2023-0024637 A1 on Jan. 26, 2023 and which is hereby expressly incorporated by reference in its entirety.

FIELD OF INVENTION

The present invention relates to methods and apparatus for power management in cable networks. The present invention is also directed to implementing dynamic power saving methods and apparatus in cable systems, e.g., Data Over Cable Service Interface Specification (DOCSIS) networks. Various features of the present invention relate to methods and apparatus for efficiently utilizing power in cable modems. The present invention also relates to methods and apparatus for saving and/or conserving power in cable modems of cable systems wherein the cable modems are connected to and, in some instances, are powering wireless base stations. The present invention also relates to methods and apparatus for storing and/or buffering data in cable modems, cable modem termination systems and wireless base stations in a manner allowing for the conservation of power utilization by the cable modems and the cable modem network.

BACKGROUND OF THE INVENTION

Power consumption in cable networks, such as for example DOCSIS networks, is very crucial for network design and operation since if there is no power available in a certain region, the service provider can not operate the cable network in that region. Also, if the service provider has limited power plant capability in a particular region, then the service provider cannot operate too many cable modems in that region when the service provider is supplying the power to operate the cable modem, Thus, the management and distribution of available power among cable modems in cable networks is one of the technological problems and issues that service providers face. With the introduction of new 5G networks and 5G wireless networks. e.g., 5G CBRS networks, power consumption has increased. Upgrading power plants to handle increased loads is extremely expensive. Furthermore, the service providers are constantly looking for ways to more efficiently and effectively manage and utilize power in their networks to save costs associated with the expenditure of energy.

From the above it should be understood that there is a need for new and/or improved methods and apparatus for managing power effectively and efficiently in cable networks. Furthermore, there is a need for a technology solution to how to manage and distribute power so as to be able to make the utilization of power consumption of the network more efficient and be able to power more devices without upgrading the power plant supply the cable networks power in a region that has limited power availability. There is a further need for new and/or improved methods and apparatus for minimizing power consumption by cable modems. There is a further need for new and/or improved methods and apparatus for operating cable modems in a more effective and efficient manner so that the cable modems utilize power for essential tasks and minimize or eliminate the use of power for other non-essential tasks. There is an additional need for new and/or improved methods and apparatus to more efficiently and effectively manage and utilize power in cable networks to save costs associated with the expenditure of energy. There is a further need for new and improved methods and apparatus to conserve power in cable systems so that more devices, e.g., cable modems and/or wireless base stations can be powered using the same amount of energy, There is a further need for new and/or improved methods and apparatus for increasing power efficiency in legacy cable modem devices and cable systems. There is a further need for new and/or improved methods for dynamically managing power utilization by cable modems. There is also a need for new and/or improved methods and apparatus for storing and/or buffering data in cable modems, cable modem termination systems and wireless base stations in a manner allowing for the conservation of power utilization by the cable modems and the cable modem network. There is a further need for new and/or improved methods and apparatus for storing and/or buffering data in cable modems, cable modern termination systems and wireless base stations which allow for the conservation of power by the cable modems and the cable modem network without compromising the quality of service provided to subscribers, e.g., without introducing transmission delay that would render data transmission as not meeting quality of service levels, standards and/or thresholds.

SUMMARY OF THE INVENTION

Some service providers which operate both wireless and wired networks use a strand based deployment model for at least a portion of their wireless base stations. In the strand based deployment model, the service provider places or connects one or more of its wireless base stations, e.g., Citizen Broadband Radio Service Devices (CBSDs) in a Citizen Broadband Radio Service (CBRS) network, to the service provider's cable strand to provide services, e.g., 5G services, to its subscribers. Each of the wireless base stations, e.g., CBSDs, is connected to a separate cable modem (CM) and each of the separate cable modems is in turn connected to a cable modem termination system (CMTS). The cable modem termination system is a server typically residing in the service provider's data center or cable head end. The cable modem termination system is connected to the service provider's core network, e.g., a 5G core network. In some situations, the service provider's data center and in turn the cable modem termination system are located in the service provider's core network. The cable modem termination system receives data from core network elements and/or devices and will schedule and send this data to the wireless base stations, e.g., CBSDs, via the cable modems to which the wireless base stations are connected. The cable modem termination system has a buffer for each cable modem which is attached to it. The cable modem termination system does not have any information about the wireless base stations, e.g., CBSDs. or other users that are connected to the wireless base stations, e.g., CBSDs. Each cable modem termination system may, and typically does, have a plurality of cable modems connected to it. In some examples, the cable modem termination system supports thousands or tens of thousands of cable modems which are connected to it.

As discussed above, power consumption in cable networks, such as for example DOCSIS networks, is very crucial for network design and operation since if there is no power available in a certain region, the service provider can not operate the cable network in that region. Also, if the service provider has limited power plant capability in a particular region, then the service provider cannot operate too many cable modems in that region. Thus, the management and distribution of available power among cable modems in cable networks is one of the technological problems and issues that service providers face. With the introduction of new 5G networks and 5G wireless networks, e.g., 5G CBRS networks, power consumption has increased. Upgrading power plants to handle increased loads is extremely expensive. Furthermore, the service providers are constantly looking for ways to more efficiently and effectively manage and utilize power in their networks to save costs associated with the expenditure of energy.

The present invention provides new and/or improved methods and apparatus for power management in cable networks. The present invention is also directed to implementing new and/or improved dynamic power savings and/or conservation methods and apparatus in cable systems, e.g., Data Over Cable Service Interface Specification (DOCSIS) networks. Various features of the present invention relate to methods and apparatus for efficiently managing and utilizing power in cable modems. Various embodiments of the present invention also provide new and/or improved methods and apparatus for saving and/or conserving power in cable modems of cable systems wherein the cable modems are connected to and, in some instances are, powering wireless base stations. Various embodiments of the present invention also provide new and/or improved methods and apparatus for managing, storing and/or buffering data in cable modems in an efficient manner allowing for the conservation of power utilization by the cable modems. Various embodiments of the present invention also provide new and/or improved method and apparatus for storing and/or buffering data in cable modems, cable modem termination systems and wireless base stations which allow for the conservation of power by the cable modems and the cable modem network without compromising the quality of service provided to subscribers, e.g., without introducing transmission delay that would render data transmission as not meeting quality of service levels, standards and/or thresholds. Various embodiments of the present invention solve one or more of the problems discussed above.

In explaining the various features of the invention they will sometimes be discussed in the context of examples where the wireless base stations are CBSD devices in a CBRS network connected to a cable modem which is connected to a core network. However, such examples are to facilitate understanding of the invention and it should be appreciated that the methods and apparatus are not limited to CBRS embodiments or wireless base stations which are CBSDs.

An exemplary method in accordance with one embodiment of the present invention includes the steps of: receiving a message by a cable modem from a cable modem termination system instructing the cable modem to reduce power consumption; in response to receiving the message from the cable modem termination system instructing the cable modem to reduce power consumption, increasing, by the cable modem, a buffer size of at least one of: (i) a cable modem downlink buffer included in the cable modem, or (ii) a cable modem uplink buffer included in the cable modem; and switching, by the cable modem, from a first mode of operation to a second mode of operation after performing one or both of: (i) transmitting uplink data to the cable modem termination system, and (ii) transmitting downlink data to a wireless base station, said second mode of operation being a power savings modem of operation.

In most embodiments, the method further includes the step of the cable modem remaining in said power savings mode of operation for a first time period, said first time period being based on at least one of cable modem termination system buffer information or wireless base station buffer information. In various embodiments, the cable modem is positioned between the cable modem termination system and the wireless base station. In various embodiments, the cable modem uplink data buffer is used by the cable modem for storing uplink data received from the wireless base station and the cable modem downlink data buffer is used by the cable modem for storing downlink data received from the cable modem termination system.

In some embodiments, the method further includes the steps of: receiving, by the cable modem, said cable modem termination system buffer information from the cable modem termination system; and receiving, by the cable modem, said wireless base station buffer information from the wireless base station. The cable modem receives this information prior to determining the first period of time based on these values.

In some embodiments, the method further includes the steps of: instructing the wireless base station to increase a size of a wireless base station uplink buffer included in the wireless base station when said cable modem increases the buffer size of the cable modem uplink buffer. In some embodiments, the step of instructing the wireless base station to increase the size of the wireless base station uplink buffer included in the wireless base station includes instructing the wireless base station to increase the size of the wireless base station uplink buffer by an amount equal to or greater than the increase of the size of the cable modem uplink buffer.

In some embodiments, the method further includes the step of: instructing the cable modem termination system to increase a size of a cable modem termination system downlink buffer included in the cable modem termination system used for storing data to be communicated to the cable modem when said cable modem increases the buffer size of the cable modem downlink buffer. In some embodiments, the step of instructing the cable modem termination system to increase the size of the cable modem termination system downlink buffer included in the cable modem termination system includes instructing the cable modem termination system to increase the size of the cable modem termination system downlink buffer used for storing downlink data to be transmitted to the cable modem by an amount equal to or greater than the increase of the size of the cable modem downlink buffer.

In some embodiments, the method includes the additional step of determining the first period of time based on: (i) at least one of: the cable modem termination system buffer information or the wireless base station buffer information; and (ii) at least one of: (a) an amount of delay introduced into uplink data traffic by the cable modem remaining in the power savings mode of operation for the first period of time, or (b) an amount of delay introduced into downlink data traffic by the cable modem remaining in the power savings mode of operation for the first period of time.

In some embodiments, the step of determining the first period of time is further based on at least one of the following: a type of data being transmitted in the uplink data traffic or the type of data being transmitted in the downlink data traffic.

In various embodiments, the method further includes that upon switching to said power savings mode of operation, turning off power by said cable modem to one or more cable modem transmitters included in said cable modem.

In various embodiments, the method further includes that upon switching to said power savings mode of operation, turning off power by said cable modem to one or more cable modem receivers included in said cable modem.

In some embodiments, the wireless base station is part of a wireless network operated by a first service provider. In some embodiments, the cable modem is part of a cable network operated by the first service provider. In some embodiments, the cable modem termination system is part of the cable network operated by the first service provider. In various embodiments, the wireless base station is a Citizens Broadband Service Device (CBSD) and the wireless network is a Citizens Broadband Radio Service (CBRS) network.

In various embodiments, the cable modem is powered by the cable modem termination system. In many embodiments, the wireless base station is powered by the cable modem termination system via the cable modem. In various embodiments, a cable modem termination system CMTS power management device monitors the power consumption of the CMTS and cable modems and determines when the CMTS needs to instruct the cable modems it supports to reduce power.

In some embodiments, the method further includes the step of: receiving power by the cable modem from the cable modem termination system over a first cable connecting the cable modem termination system and the cable modem, said first cable also being used for communicating messages between the cable modem termination system and the cable modem.

In some embodiments, the method further includes the step of: providing power by the cable modem to the wireless base station over a second cable connecting the cable modem to the wireless base station, said second cable also being used for communicating messages between the cable modem and the wireless base station.

In various embodiments, the power is provided by the cable modem termination system to the cable modem using Power over Ethernet. In some embodiments, the power is provided by the cable modem to the wireless base station using power over Ethernet.

In some embodiments, the cable modem termination system buffer information includes a first downlink buffer size value expressed as an amount of time (e.g., an amount of time it takes for the cable modem termination system downlink buffer for the cable modem to fill up to its capacity); and the wireless base station buffer information includes a first uplink buffer size value expressed as an amount of time (e.g., an amount of time it takes for the wireless base station uplink buffer to fill up to its capacity).

In some embodiments, the method further includes the steps of: receiving, by the cable modem, while said cable modem is in said first mode of operation downlink data from the cable modem termination system; storing the received downlink data at the cable modem in a cable modem downlink buffer; receiving, by the cable modem, while said cable mode is in said first mode of operation uplink data from the wireless base station; storing the received uplink data at the cable modem in a cable modem uplink buffer; and waiting until at least one of the following occurs: (i) the amount of data in the cable modem uplink buffer reaches a first threshold value, or (ii) the amount of data in the cable modem downlink buffer reaches a second threshold value, before transmitting either the stored downlink data or the stored uplink data.

In some embodiments, the first threshold value is an amount wherein 100% of all buffer entries in the cable modem uplink buffer are occupied (i.e., the buffer is full). In some other embodiments, the first threshold value is an amount less than 100% of all buffer entries in the cable modem uplink buffer being occupied.

In some embodiments, the second threshold value is an amount wherein 100% of all buffer entries in the cable modem downlink buffer are occupied (i.e., the buffer is full). In some embodiments, the second threshold value is an amount less than 100% of all buffer entries in the cable modem uplink buffer being occupied (e.g., the buffer is full and receipt of additional data will cause it to overflow), necessary).

In some embodiments, the method further includes that upon switching to said power savings mode of operation, turning off power by said cable modem to one or more cable modem transmitters included in said cable modem and turning off power by said cable modem to one or more cable modem receivers included in said cable modem.

In various embodiments, the switching, by the cable modem, from the first mode of operation to the second mode of operation occurs after performing both of: (i) transmitting uplink data to the cable modem termination system, and (ii) transmitting downlink data to the wireless base station, said second mode of operation being a power savings mode of operation.

In most embodiments, the turning off power by said cable modem to one or more cable modem transmitters included in said cable modem includes turning off power to all transmitters included in said cable modem; and the turning off power by said cable modem to one or more cable modem receivers included in said cable modem includes turning off power to all receivers included in said cable modem. In some embodiments wherein the cable modem uses a transceiver the cable modem turns off power to the transceiver.

In various embodiments, the method further includes that prior to turning off said one or more cable modem transmitters, (i) transmitting by the cable modem a first message to the wireless base station indicating that data is not to be sent by the wireless base station to the cable modem; and (ii) transmitting a second message to the cable modem termination system indicating that data is not to be sent by the cable modem termination system to the cable modem.

The method in various embodiments further includes that after the cable modem has remained in the power savings mode of operation for the first time period, switching by the cable modem from the power savings mode of operation back to the first mode of operation.

In some embodiments, the method further includes the step of: setting, by the cable modem, a power saving timer to expire after a first time value equal to said first time period prior to or upon entering said power saving mode of operation. The expiration of said power saving timer in various embodiments causes the cable modem to switch from said power saving mode of operation to the first mode of operation.

In some embodiments, upon switching from power savings mode of operation to said first mode of operation, the method further includes: turning power on to: (i) the one or more cable modem transmitters for which power was turned off, and (ii)) the one or more cable mode receivers for which the power was turned off.

In some embodiments, after turning on power to the one or more transmitters and one or more receivers, the method includes transmitting a message to the cable modem termination system indicating the cable modem termination system is to send data to the cable modem and also transmitting a message to the wireless base station indicating the wireless base station is to send data to the cable modem.

In some embodiments, the method further includes the step of: determining, by the cable modem, the first time period based on at least one of the wireless base station buffer information or the cable modem termination system buffer information. In some such embodiments, the step of determining, by the cable modem, the first time period based on at least one of the wireless base station buffer information or the cable modem termination system buffer information includes: determining, by the cable modem, the first time period to be less than the smaller of: (i) an amount of time for a wireless base station uplink buffer used for storing uplink data to be transmitted to the cable modem to fill up or reach its capacity or (ii) an amount of time for the cable modem termination system downlink buffer used for storing downlink data to be transmitted to the cable modem to fill up or reach its capacity.

The present invention is also applicable to apparatus and system embodiments wherein one or more devices implement the steps of the method embodiments. In some apparatus embodiments each of the cable modems, cable modem termination systems, wireless base stations, CBSDs, user equipment devices, mobile terminals, cable modem termination system power management devices, resource allocation management devices, SAS devices, and each of the other apparatus/devices/nodes of the system include one or more processors and/or hardware circuitry, input/output interfaces including receivers and transmitters, and a memory. The memory including instructions when executed by one or more of the processors control the apparatus/device of the system to operate to perform the steps and/or functions of various method embodiments of the invention.

The present invention is also applicable to and includes apparatus and systems such as for example, apparatus and systems that implement the steps and/or functions of the method embodiments. For example, a communication system in accordance with one embodiment of the present invention includes a cable modem including: a memory including uplink and downlink buffers, and a processor that controls the cable modem to perform the following operations: receiving a message by a cable modem from a cable modem termination system instructing the cable modem to reduce power consumption; in response to receiving the message from the cable modem termination system instructing the cable modem to reduce power consumption, increasing, by the cable modem, a buffer size of at least one of: (i) a cable modem downlink buffer included in the cable modem, or (ii) a cable modem uplink buffer included in the cable modem; and switching, by the cable modem, from a first mode of operation to a second mode of operation after performing one or both of: (i) transmitting uplink data to the cable modem termination system, and (ii) transmitting downlink data to a wireless base station, said second mode of operation being a power savings modem of operation.

In various embodiments, the processor further controls the cable modem to perform the additional operation of remaining in said power savings mode of operation for a first time period, said first time period being based on at least one of cable modem termination system buffer information or wireless base station buffer information.

The present invention is also directed to non-transitory computer readable medium embodiments. In an exemplary non-transitory computer readable medium, the non-transitory computer readable medium includes a first set of computer executable instructions which when executed by a processor of a cable modem cause the cable modem to perform the steps of: receiving a message by a cable modem from a cable modem termination system instructing the cable modem to reduce power consumption; in response to receiving the message from the cable modem termination system instructing the cable modem to reduce power consumption, increasing, by the cable modem, a buffer size of at least one of: (i) a cable modem downlink buffer included in the cable modem, or (ii) a cable modem uplink buffer included in the cable modem; and switching, by the cable modem, from a first mode of operation to a second mode of operation after performing one or both of: (i) transmitting uplink data to the cable modem termination system, and (ii) transmitting downlink data to a wireless base station, said second mode of operation being a power savings modem of operation.

In various embodiments, the non-transitory computer readable medium first set of computer executable instructions which when executed by the processor of the cable modem further cause the cable modem to perform the additional step of: remaining in said power savings mode of operation for a first time period, said first time period being based on at least one of cable modem termination system buffer information or wireless base station buffer information.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 3 illustrates the combination of FIGS. 3A, 3B, 3C, 3D, 3D, 3F and 3G.

FIG. 3G illustrates the steps of the seventh part of an exemplary method in accordance with one embodiment of the present invention.

FIG. 12 illustrates the combination of FIGS. 12A, 12B, 12C, 12D, and 12E.

DETAILED DESCRIPTION

Figure 1:
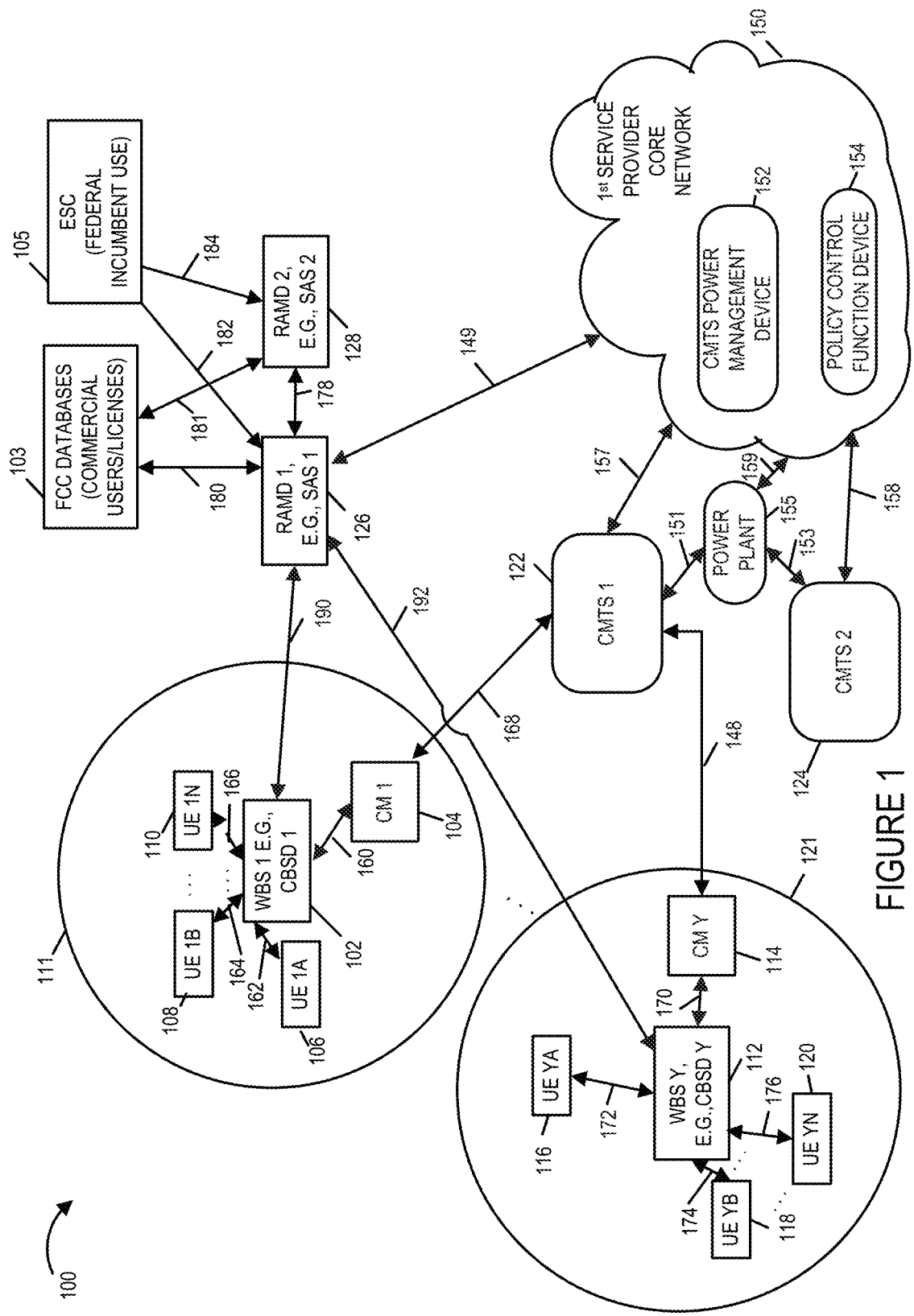
FIG. 1 illustrates an exemplary system in accordance with one embodiment of the present invention.

The current invention is applicable to cable systems which employ cable modem termination systems which power cable modems. The current invention is also applicable to service providers which operate both wireless and wired networks that use a strand based deployment model for at least a portion of their wireless base stations. In the strand based deployment model, the service provider places or connects one or more of its wireless base stations, e.g., Citizen Broadband Radio Service Devices (CBSDs) in a Citizen Broadband Radio Service (CBRS) network, to the service provider's cable strand to provide services, e.g., 5G services, to its subscribers. Each of the wireless base stations, e.g., CBSDs, is connected to a separate cable modem (CM) and each of the separate cable modems is in turn connected to a cable modem termination system (CMTS). The cable modem termination system is a server which typically resides in the service provider's data center. The cable modem termination system may be, and in some embodiments, is located in the service provider's cable head end location. The cable modem termination system is connected to the service provider's core network, e.g., a 5G core network. In some embodiments, the service provider's data center and the cable modem termination systems located in the data center are located in the service providers core network.

The cable modem termination system receives data from core network elements and/or devices and will schedule and send this data to the wireless base stations, e.g., CBSDs, via the cable modems to which the CBSDs are connected. The cable modem termination system has a buffer for each cable modem which is attached to it. The cable modem termination system does not have any information about the wireless base stations, e.g., CBSDs, or other users that are connected to the wireless base stations, e.g., CBSDs. The cable modem termination system typically receives power from a power plant that is owned and/or operated by the service provider. The cable modem termination system provides power to the cable modems to which it is connected, Each cable modem in turn typically provides power to the wireless base station, e.g., CBSD, which is connected to the cable modem. A cable modern in most embodiments supports and/or is connected to a single wireless base station. Each cable modem termination system ray, and typically, does support a plurality of cable modems, i.e., has a plurality of cable modems connected to it. In some embodiments, the cable modem termination system supports thousands or tens of thousands of cable modems.

As discussed above, the present invention provides new and/or improved methods and apparatus for power management in cable networks. The present invention is also directed to implementing new and/or improved dynamic power savings and/or conservation methods and apparatus in cable systems, e.g., Data Over Cable Service Interface Specification (DOCSIS) networks. Various features of the present invention relate to methods and apparatus for efficiently managing and utilizing power in cable modems. Various embodiments of the present invention also provide new and/or improved methods and apparatus for saving and/or conserving power in cable modems of cable systems wherein the cable modems are connected to and, in some instances are, powering wireless base stations. Various embodiments of the present invention also provide new and/or improved methods and apparatus for managing, storing and/or buffering data in cable modems in an efficient manner allowing for the conservation of power utilization by the cable modems. Various embodiments of the present invention also provide new and/or improved method and apparatus for storing and/or buffering data in cable modems, cable modem termination systems and wireless base stations which allow for the conservation of power by the cable modems and the cable modem network without compromising the quality of service provided to subscribers, e.g., without introducing transmission delay that would render data transmission as not meeting quality of service levels, standards and/or thresholds.

For explanatory purposes various features of the current invention will be explained using CBRS wireless network. However, as also explained above a CBRS wireless network is merely an exemplary wireless network in which the invention may be implemented.

Citizens Broadband Radio Service networks are networks that include user equipment devices, e.g., mobile or wireless devices such as for example cell phones, smart phones, laptops, tablets, Citizens Broadband Radio Service Devices (CBSDs) which serve as access points/base stations, and Spectrum Access Systems which are resource allocation management devices that provide spectrum assignments and manage frequency interference through power management of the wireless base stations (CBSDs) transmission power. The Citizens Broadband Radio Service network utilizes 150 megahertz in the 3550-3700 MHz band referred to as the 3.5 GHz Band. One important aspect of the CBRS network is the limitation of interference, e.g., radio transmission, from multiple transmission sources, e.g., multiple CBSD devices located near each other or in close proximity to one another. The CBRS network includes resource allocation management devices referred to as Spectrum Access Systems that obtain information about registered or licensed commercial users in the 3.5 GHz band from FCC databases and information about federal incumbent users of the band from ESC (Environmental Sensing Capability) system and interact directly or indirectly with CBSDs operating in the band to ensure that Citizens Broadband Radio Service users operate in a manner consistent with their authorizations and promote efficient use of the spectrum resource. Among the Spectrum Access System functions as defined in the Amendment of the Commission's Rules with Regard to Commercial Operations in the 3550-3650 MHz Band released Apr. 21, 2015 are that: it determines the available frequencies at a given geographic location and assign them to CBSDs; it determines the maximum permissible transmission power level for CBSDs at a given location and communicates that information to the CBSDs; it registers and authenticates the identification information and location of CBSDs; it enforces exclusion and protection zones, including any future changes to such Zones, to ensure compatibility between Citizens Broadband Radio Service users and incumbent federal operations; it protects Priority Access Licensees (PAL) from impermissible interference from other Citizens Broadband Radio Service users such as the General Authorized Access users; ensures secure and reliable transmission of information between the SAS, ESC, and CBSDs; and it facilitates coordination and information exchange between SASs. Through the management of the CBSDs power transmission levels in a geographical area the SAS manages the radio interference in the geographical area.

FIG. 1 illustrates an exemplary communications system 100 having an architecture implemented in accordance with the present invention. This exemplary communications system includes a 5G Citizens Broadband Radio Service wireless network, a core network and a cable network which couples at least some of the wireless base stations of the CBRS network to the core network. In the exemplary embodiment, a first service provider or operator operates and/or owns the cable network, the CBRS wireless network and the core network. The communications system 100 includes a plurality of wireless base stations (WBS 1 (e.g., Citizens Broadband Radio Service Device (CBSD) 1 102, . . . , WBS Y (e.g., CBSD Y) 112, a resource allocation management device (RAMD 1)(e.g., Spectrum Access System device 1 (SAS 1)) 126, a RAMD 2 (e.g., SAS 2) 128, databases of commercial users/licenses (e.g., an FCC Database) 103, an Environmental Sensing Capability (e.g., Federal Incumbent Use) (ESC)) system 105, a plurality of user equipment (UE) devices UE 1A 106, UE 1B 108, . . . , UE 1N 110, UE YA 116, UE YB 118, . . . , UE YN 120, Cable Modem (CM) 1 104, . . . , Cable Modem Y 114, Cable Modem Termination System (CMTS) 1 122, Cable Modem Termination System 124, Cable Modem Termination System Power Management Device 152, Policy Control Function Device 154, communications links 148, 149, 156, 158, 160, 162, 164, . . . , 166, 168, 170, 172, 174, . . . , 176, 178, 181, 182, 184, 190, 192, a first cell 111 illustrating the first base station 102's coverage area, a second cell 121 illustrating the second base station 112's coverage area.

The first cell 111 of the network is serviced by the WBS 1 (e.g., CBSD 1) 102. The first cell 111 illustrates the wireless coverage range of WBS 1 (e.g., CBSD 1) 102 at a first time T1. The user equipment devices also sometimes referred to as user terminal devices UE 1A 106, UE 1B 108, . . . , UE 1N 110 are located in the first cell 111 and are in active wireless communications with WBS 1 (e.g., CBSD 1) 102. Communications links 162, 164, and 166 illustrate wireless communications channels, e.g., radio channels, over which WBS 1 (e.g., CBSD 1) 102 and UE 1A 106, UE 1B 108, . . . , UE 1N 110 communicate respectively.

The second cell 121 of the wireless network is serviced by WBS 2 (e.g., CBSD 2) 112. The second cell 121 illustrates the wireless coverage range of WBS 2 (e.g., CBSD 2) 112 at the first time T1. The user equipment devices UE YA 116, UE YB 118, . . . , UE YN 120, (Y being an integer greater than 1) are located in the second cell 121 and are in communication with WBS 2 (e.g., CBSD 2) 112. Communications links 172, 174, . . . , 176 illustrate wireless communications channels, e.g., radio channels, over which WBS 2 (e.g., CBSD 2) 112 and UE YA 116, UE YB 116, . . . , UE YN 1260 communicate respectively.

Resource Allocation Management Device (RAMD) 1 (e.g., SAS 1) 126 is coupled to Resource Allocation Management Device (RAMD) 2 (e.g., SAS 2) 128 via communications link 178. RAMD 1 (e.g., SAS 1) 126 is coupled to databases 103 via communications link 180. RAMD 2 (e.g., SAS 2) 128 is coupled to databases 103 via communications link 181. ESC system 105 is coupled to RAMD 1 (e.g., SAS 1) 126 and RAMD 2 (e.g., SAS 2) 128 via communications links 182 and 184. The ESC system is used to detect, sense Navy radar operations in the wireless bands utilized for communications in the wireless network, e.g., in CBRS networks the ESC detects or senses Navy radar operation within 3550-3650 MHz near the coasts, and provide notifications over the communications links to RAMD 1 (e.g., SAS 1) 126 and RAMD 2 (e.g., SAS 2) 128. RAMD 1 (e.g., SAS 1) 126 manages the WBS 1 (e.g., CBSD 1) 102 and WBS 2 (e.g., CBSD 2) 112 spectrum allocation and transmission power to limit interference in the wireless network (e.g., CBRS wireless network). RAMD 2 (e.g., SAS 2) 128 manages other wireless base stations (e.g., CBSDs) in the wireless network which are not shown in FIG. 1. Resource Allocation Management Device 1 (e.g., SAS 1) 126 and Resource Allocation Management Device 2 (e.g., SAS 2) 128 communicate and share information regarding the wireless network coverage of the wireless base stations (e.g., CBSDs) each respectively manage and coordinate management of the allocation of spectrum and power transmission levels of wireless base stations (e.g., CBSDs) throughout the wireless network. While only two Resource Allocation Management Devices (e.g., SAS devices) are shown in FIG. 1 it should be understood that additional Resource Allocation Management Devices (e.g., SAS devices) are typically used in the wireless network (e.g., CBRS network). The WBS 1 102, and WBS Y 112 coupled and/or connected to the RAMD 1 126 via the 1st service provider core network 150. The RAMD 1 126 is coupled to the first service provider's core network 150 via communications link 149. The WBS 1 102 is coupled and/or connected to the RAMD 1 126 via communications link 190. WBSD 2 112 is coupled and/or connected to RAMS 1 128 via communications link 192.

WBS 1 102 is coupled and/or connected to cable modem 104 via communications link 160. The cable modem 1 104 is coupled and/or connected to the cable modem termination system 1 122 via communications link 168. The cable modem termination system 1 122 is coupled and/or connected to the first service provider core network 150 via communications link 156. The WBS 1 102 communicates with the devices in the first service provider core network 150 via cable modem 104 and CMTS 1 122.

WBS Y 112 is coupled and/or connected to cable modem CM Y 114 via communications link 170. Cable Modem Y 114 is coupled and/or connected to the cable modem termination system 1 122 via communications link 148. The cable modem termination system 1 122 is coupled and/or connected to the first service provider core network 150 via communications link 156. The WBS Y 112 communicates with the devices in the first service provider core network 150 via the cable modem Y 114 and CMTS 1 122.

WBS 1 102, WBS Y 112, CM 1 104, CM Y 114, CMTS 1 122 and CMTS 2 124 are owned and/or operated by the first service provider.

The nodes, devices and elements of the first service providers core network 150 are interconnected via a communications network including communications links which allow the various nodes, devices and elements of the first service providers core network 150 to communicate and exchange information and data.

The first service provider's core network 150 in this exemplary embodiment is a 5G network including a cable modem termination system power management device 152 and a policy control function device 154. The 5G network core typically also includes a session management function device or node, security gateway function device or node, an access and mobility management function (AMF) device and a user plane function (UPF) device. The cable modem termination system power management device 152 is connected and/or coupled to a power plant system 155 via communications link 159. The cable modem termination system power management device 152 controls the management, supply and/or distribution of power for the cable modem system. The cable modem termination system power management device 152 instructs the CMTS devices in specific regions on whether it needs to reduce power and/or have the cable modems connected to the CMTS devices enter a power savings mode of operation as will be explained herein. In some embodiments, the CMTS power management device 152 is not located in the core network of the first service provider but is instead coupled and/or connected to the core network of the first service provider. In some embodiments, the CMTS power management device 152 is located at the service provider's power plant 155. The service provider's power plant 155 supplies power to the cable modem termination system devices in the cable modem system. In this example, the service provider's power plant 155 supplies power to the cable modem termination system 1 122 and cable modem termination system 2 124 via power cables 151 and 153 respectively as in this example CMTS 1 122 and CMTS 2 124 are located at different locations. In some embodiments the power plant also supplies power to the service providers data center and/or location at which the core network devices are located so that the power plant can provide power to one, some or all of the service providers equipment located in the data center, e.g., CMTS devices, and/or core network, e.g., CMTS power management device, etc.

CMTS 2 124 is coupled to the core network via communications link 158. CMTS 1 and CMTS 2 may be, and in some embodiments are, included in a cable head end system of first service provider.

The cable modems 1 104 and cable modem Y 114 may be, and in some embodiments are DOCSIS compliant cable modems, e.g., DOCSIS compliant 3.0, 3.1, 4.0 cable modems. The particular release/version of DOCSIS is not important to the invention as the messages exchanged between the cable modem and the CMTS devices may be, and in some embodiments are, text messages which can be sent between any CMTS and cable modem.

The communications links 148, 149, 156, 158, 159, 160, 168, 170, 178, 180, 181, 182, 183, 190, and 192 as well as the communications links coupling together the elements of the core network 150 are typically wired communications links or fiber optic cables. The communications links 162, 164, . . . , 166, 172, 174, . . . , 176 are wireless or over the air communications links. It is to be understood that the communication links shown in system 100 are only exemplary and other network configurations and communications links may be employed that couple together the devices, servers, nodes, entities, databases and controllers of the system. Elements or steps with the same reference numbers used in different figures are the same or similar and those elements or steps will not be described in detail again.

While for the sake of simplicity in explaining the invention system 100 only illustrates two active wireless base stations (e.g., CBSD devices), two cable modems, two CMTS devices, two Resource Allocation Management Devices (e.g., SAS devices) and a few UE devices, it will be appreciated that system 100 typically includes a large plurality of active wireless base stations (e.g., CBSDs) in the wireless network supporting a large plurality of UE devices with a large number of the plurality of active wireless base stations being coupled to the core network via a cable modem and CMTS. The cable system includes a large plurality of cable modem termination systems each coupled to a large plurality of cable modems which may be either connected to a single wireless base station, e.g., CBSD, or another device or devices. As previously discussed, the CMTS devices are typically located in the service provider's data center or cable head end and provide high speed data service connections.

The Cable Modem Termination System powers up the cable modems connected to it through the communications link which connects the cable modem termination system to the cable modem. The communications link for example may be, and in some embodiments is, an Ethernet cable. The Cable Modem Termination System also powers the wireless base station, e.g., CBSD, which is connected to the cable modem termination system via the cable modem. That is the Cable Modem Termination System first powers up the cable modem which in turn provides and/or supplies power to the wireless base station, e.g., CBSD. The power passing through the cable modem and communications link connecting the wireless base station and the cable modem. In some embodiments, the communications link coupling the cable modem to the wireless base station is an Ethernet cable.

The cable modems are located on the cable strands to provide the connection to the wireless base stations, e.g., a DOCSIS connection to CBSDs in a CBRS system.

The first service provider will also operate one or more power plants, e.g., power plant 155 in system 100. Each power plant is the power house which provides power for all Cable Modem Termination Systems in the network. Power plants are local power resources that are responsible for the provisioning and distribution of power for all Cable Modem Termination Systems and Cable Modems (through the CMTSs) running in the local region for which the power plant is supplying power. Cables through which power is supplied run from the power plant to Cable Modem Termination Systems.

Figure 2:
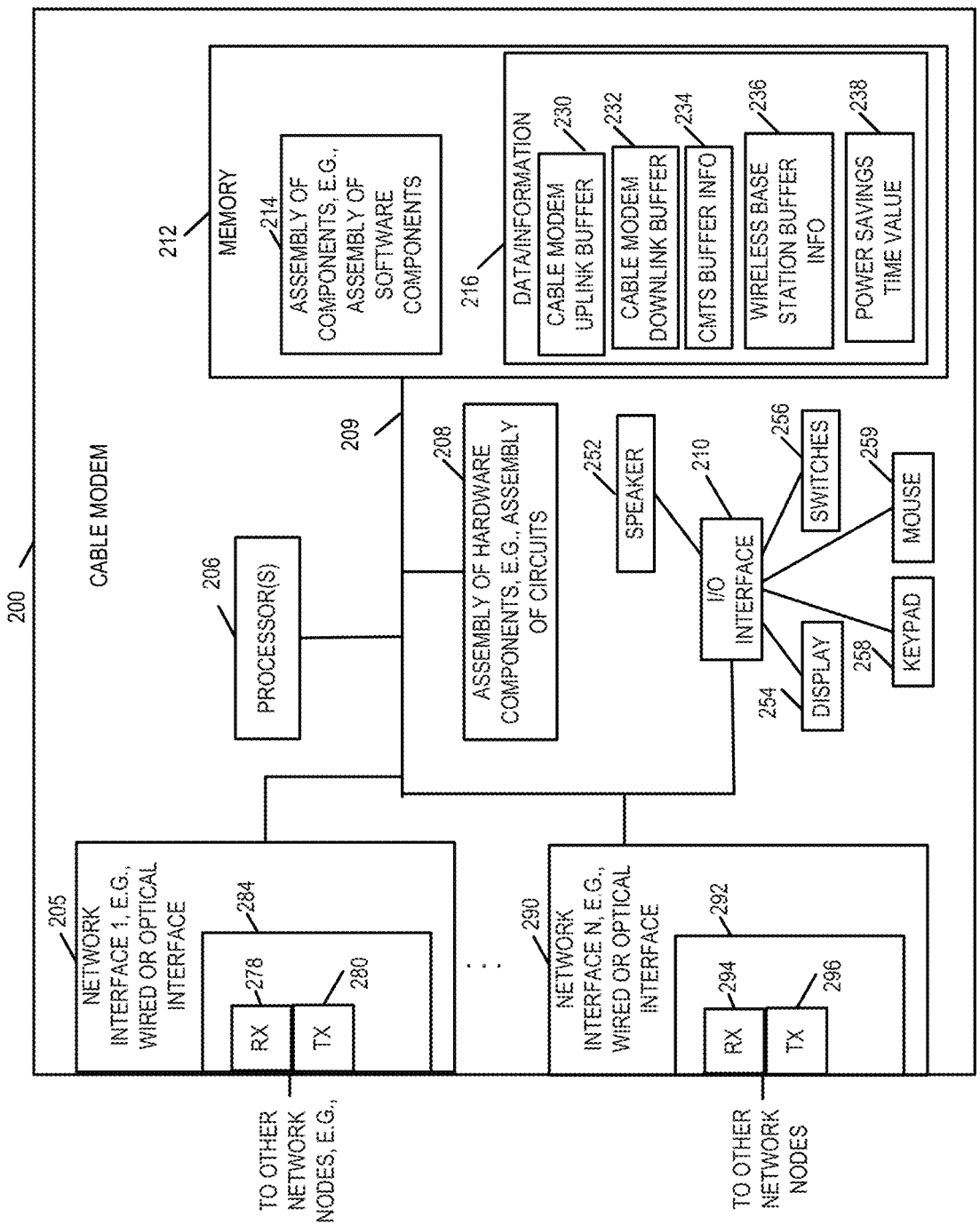
FIG. 2 illustrates details of an exemplary cable modem in accordance with one embodiment of the present invention.

FIG. 2 is a drawing of an exemplary cable modem such as a cable modem 1 104 of system 100. The cable modem 200 includes a plurality of network interfaces 1 205, . . . , network interface N 290, e.g., each being a wired or optical interface, a processor(s) 206 (e.g., one or more processors), e.g., a CPU, an assembly of hardware components 208, e.g., an assembly of circuits, and I/O interface 210 and memory 212 coupled together via a bus 209 over which the various elements may interchange data and information. Th cable modem 200 further includes a speaker 252, a display 254, switches 256, keypad 258 and mouse 259 coupled to I/O interface 210, via which the various I/O devices (252, 254, 256, 258, 259) may communicate with other elements (206, 208, 212) of the cable modem 200. Network interface 205 includes a receiver 278 and a transmitter 280. Network interface 290 includes receiver 299 and transmitter 296. In some embodiments, network interfaces 205 and/or 290 includes multiple receivers and transmitters. The network interfaces 205 and 290 are used to communicate with other devices, e.g., wireless base station and/or cable modem termination system. In some embodiments, receiver 278 and transmitter 280 are part of a transceiver 284. In some embodiments, receiver 294 and transmitter 296 are part of a transceiver 292. Memory 212 includes an assembly of component 214, e.g., an assembly of software components, and data/information 216. Data/information 216 typically includes, among other things, cable modem uplink buffer 230, cable modem downlink buffer 232, cable modem termination system buffer information 234, wireless base station buffer information 236 and power savings time value 238. In some embodiments, the cable modems disclosed in the figures and/or discussed in connection with the various embodiments of the invention are implemented in accordance with cable modem 200. For example, cable modem 1 (e.g., CM 1 104), . . . , cable modem Y (CM Y 114) of FIG. 1 are implemented in accordance with cable modem 200.

The steps of an exemplary method in accordance with an embodiment of the present invention will now be discussed. A wireless base station (e.g., CBSD 1 102 of system 100) turns on and connects with a cable modem (e.g., CM 1 104 of system 100). The cable modem is connected to and powered by a cable modem termination system (e.g., CMTS 1 122 of system 100). The cable modem is positioned between the wireless base station and the cable modem termination system. The wireless base station connects to its service providers core network via the cable modem and cable modem termination system. The cable modem termination system being connected to the core network. The CBSD connects with a Spectrum Access System (e.g., SAS 1 126 of system 100). The Spectrum Access System grants spectrum to the CBSD for use in communicating with and providing services to user equipment devices (e.g., UE 1A 106, UE 1B 108, . . . , UE 1N 110 of system 100). The user equipment devices connect to the CBSD and begin requesting downlink data and also start sending data uplink. The cable modem creates a downlink data buffer for the traffic that will be sent to the CBSD and an uplink data buffer for the traffic that will be sent to the CMTS. The cable modem checks the cable modem buffer size in the created cable modem downlink buffer and the buffer size in the created cable modem uplink buffer and calculates the amount of power consumed to send data when the downlink buffer is fully occupied. The CM also calculates the amount of power consumed to send its data when the created cable modem uplink buffer is fully occupied.

The cable modem receives uplink data from the CBSD and downlink data from the cable modem termination system. Before sending packets, e.g., data packets, one by one over the communications links to the cable modem termination system and the CBSD, the cable modem waits for an opportunity to send data when its uplink and downlink buffers are both full are nearly full. For example, the cable modem will keep buffering traffic sent in the uplink by the CBSD and the cable modem will keep buffering traffic sent in the downlink by the cable modem termination system. The cable modem will not send any data to the CBSD in the downlink and will not send any data to the CMTS in the uplink till the cable modem downlink and cable modem uplink buffers are full, or nearly full. The cable modem will compare the amount of data in the downlink and uplink data buffers and if the buffers are full, the cable modem will send "Do not send data" message to CBSD and CMTS. When the CBSD receives this "Do not send data" message, the CBSD will keep buffering data in its own uplink data buffer and will not send additional data to the cable modem. Similarly, when the CMTS receives the "Do not send data" message, the CMTS will continue to buffer data in its own downlink data buffer and will not send additional data to the cable modem. The cable modem at this time will flush out, i.e., transmit, all the data in the downlink buffer towards the CBSD and the cable modem will flush out all of data in its uplink buffer towards the cable modem termination system. The cable modem will then turn itself off for a time duration of "T". For example, the cable modem will turn off power to various circuits on the cable modem including its transmitter(s) and receiver(s) for a time duration "T". The cable modem provides power to the CBSD. The cable modem even when it turns itself "off" will continue to provide power to the CBSD throughout the time period "T". The CBSD's power will be uninterrupted. After the time duration "T" has passed, the cable modem will turn itself on again powering up the various circuits it had turned off including its transmitters and receivers.

Once the transmitters and receivers have been powered up, the cable modem sends a "Send Data" message to both the CBSD and the cable modem termination system. Upon receiving this message, the CBSD will flush out all the uplink data in its own uplink data buffer to the cable modem and the cable modem termination system will also flush out the data it has in its downlink data buffer to the cable modem. The cable modem then repeats the process.

The amount of time "T" that the cable modem will power down for is determined by the cable modem based on buffer information provided by the cable modem termination system and the CBSD. The "T" depends on how large the uplink data buffer of the CBSD is in terms of time. If the CBSD can buffer or keep 200 msec worth of data in its uplink buffer, then the cable modem has to power up before this time is over so "T" needs to smaller than 200 msec. Similarly, if the cable modem termination system can buffer or keep 500 msec worth of data in its downlink buffer, the cable modem has to power up before this time is over. The cable modem will take into account both the CBSD uplink buffer time and the cable modem termination system downlink buffer time and will select a time "T" which is less than the lowest of the cable modem termination system downlink buffer time and the CBSD uplink buffer time. The cable modem receives this buffer information from the CBSD and the cable modem termination system, e.g., when a connection is established between the cable modem and each of these devices. The cable modem can use any kind of "Buffer Size Information" message sent from the CBSD to the cable modem and from the cable modem termination system to the cable modem to obtain this information. In some embodiments, the cable modem may send a request to the cable modem termination system and/or the CBSD to obtain the buffer information.

For example with respect to power savings, if the cable modem can turn itself off for approximately 200 msec 10 times in an hour, that is approximately, 5 hours of power savings per year. If that is multiplied by 10,000 cable modems, then the service provider will have 6 years worth of electricity savings in one year of operation.

The steps of an exemplary method embodiment in which the amount of a cable modem's power savings is dynamically adjusted by adjusting the cable modem uplink and/or downlink buffers will now be described. It should be understood that while only one cable modem is discussed the method is applicable to multiple cable modems in the cable system and that implementation of the method with multiple cable modems, e.g., 1000s of cable modems, provides a large amount of power savings. Furthermore, the method provides for a dynamic method of managing the power usage in the cable network. The method will be described in connection with system 100 of FIG. 1.

A CMTS, e.g., CMTS 1 122, turns on and is powered by the service provider's power plant, e.g., power plant 151. A cable modem, e.g., cable modem 1 104, which is connected to the CMTS and which receives its power from the CMTS, e.g., CMTS 1 122, turn on and establishes communications with the CMTS, e.g., CMTS 1 122, from which it receives its power. A wireless base station, e.g., wireless base station 1 102, which is connected to and powered by the cable modem turns on and establishes communications with the cable modem, e.g., cable mode 1 104. The wireless base station 1 102 in this example is a CSBD base station. The CBSD base station connects with the Resource Access Management Device 1 126 which in this example is a Spectrum Access System which grants the CBSD wireless spectrum to use for communicating with user equipment devices. User devices, e.g., UE 1A 106, UE 1B 108, . . . , UE 1N 110, connect to the CBSD and request downlink data and also begin sending uplink data to the CBSD. The cable modem creates a downlink data buffer for the downlink traffic that will be sent by the CMTS to the CBSD. The cable modem also creates an uplink data buffer for the uplink traffic that will be sent by the CBSD to the CMTS. The cable modem being positioned between the CBSD and the CMTS. The cable modem checks the buffer size in the downlink buffer and the buffer size in the uplink buffer and calculates the amount of power consumed when the cable modem sends all the data in a fully occupied downlink buffer of the size created. The cable modem also calculates the amount of power consumed to send data in a fully occupied uplink buffer of the size created. The cable modem reports this information to the CMTS power management device, e.g., CMTS power management device 152, which in some instances uses this statistical information in determining whether to request power reductions by adjusting the cable modem uplink and/or downlink cable mode buffer sizes.

The cable modem starts with a default buffer size in terms of time. That is, the cable modem can have a cable modem downlink buffer size with 500 msec duration and the cable modem can have a cable modem uplink buffer size with 1200 msec duration. The cable modem will send uplink data and downlink data when the downlink and uplink buffers are full. After sending the uplink and downlink data, the cable modem will enter into a power saving mode of operation in which it turns off one or more of its transmitters and one or more of its receivers to save power. The amount of time the cable modem remains in the power savings mode of operation depends on the following: (1) the uplink buffer size of the CBSD since the CBSD sends uplink data when the CBSD's uplink data buffer is full. The cable modem can turn itself off, e.g., turn off its transmitters and receivers, for the CBSD's uplink data buffer duration. That is the amount of time it takes for the CBSD's uplink data buffer to fill up. If there is too much power being drawn from the power plan, then the CMTS power management device will send the CMTS a message indicating that a power reduction is required, e.g., a "Power Saving ON" message.

Upon receiving this message indicating that a power reduction is required, the CMTS will then send a message to one or more and in most cases all of the cable modems that are connected to the CMTS indicating a power reduction is required, e.g., a "Power Savings On" message. One CMTS can manage multiple cable modems at the same time (e.g., CMTS 1 122 manages and provides power to cable modem 1 104 and cable modem 2 114 in system 100).

Once the cable modem receives the CMTS message indicating a power reduction is required, the cable modem will increase its uplink data buffer and then instruct the CBSD to increase its uplink and downlink buffer sizes. The CBSD buffer increase should be equal to or greater than the cable modem uplink data buffer increase in size. With increasing buffer sizes, the cable modem will be able to turn itself off for a longer period of time for the CBSD has a longer period of time before its uplink data buffer will fill up as the CBSD increased its data buffer size.

With the new buffer settings, the cable modem will be able to save more power. The CMTS power management device will monitor and calculate the new power consumption. If the power consumption is under certain limits, the current buffer settings will be utilized. If not, then the CMTS power management device will send another message indicating that additional power reduction is required to the CMTS, e.g., another "Power Saving On" message. The cable modem and CBSD will then increase their buffer sizes again thereby increasing the amount of time the cable modem can remain in the power savings mode of operation with its transmitters and receivers off thereby increasing the amount of power savings. This process is continued until the CMTS power management device has determined the power consumption is under a power consumption threshold value. While the method has been described in connection with the CBSD buffer sizes the same process may be used with respect to the CMTS downlink buffer and the cable modem downlink buffer if the CMTS buffer fills up faster than the CBSD uplink buffer. In this example, it has been assumed that the CBSD buffer fills up faster than the CMTS buffer.

Figure 3A:
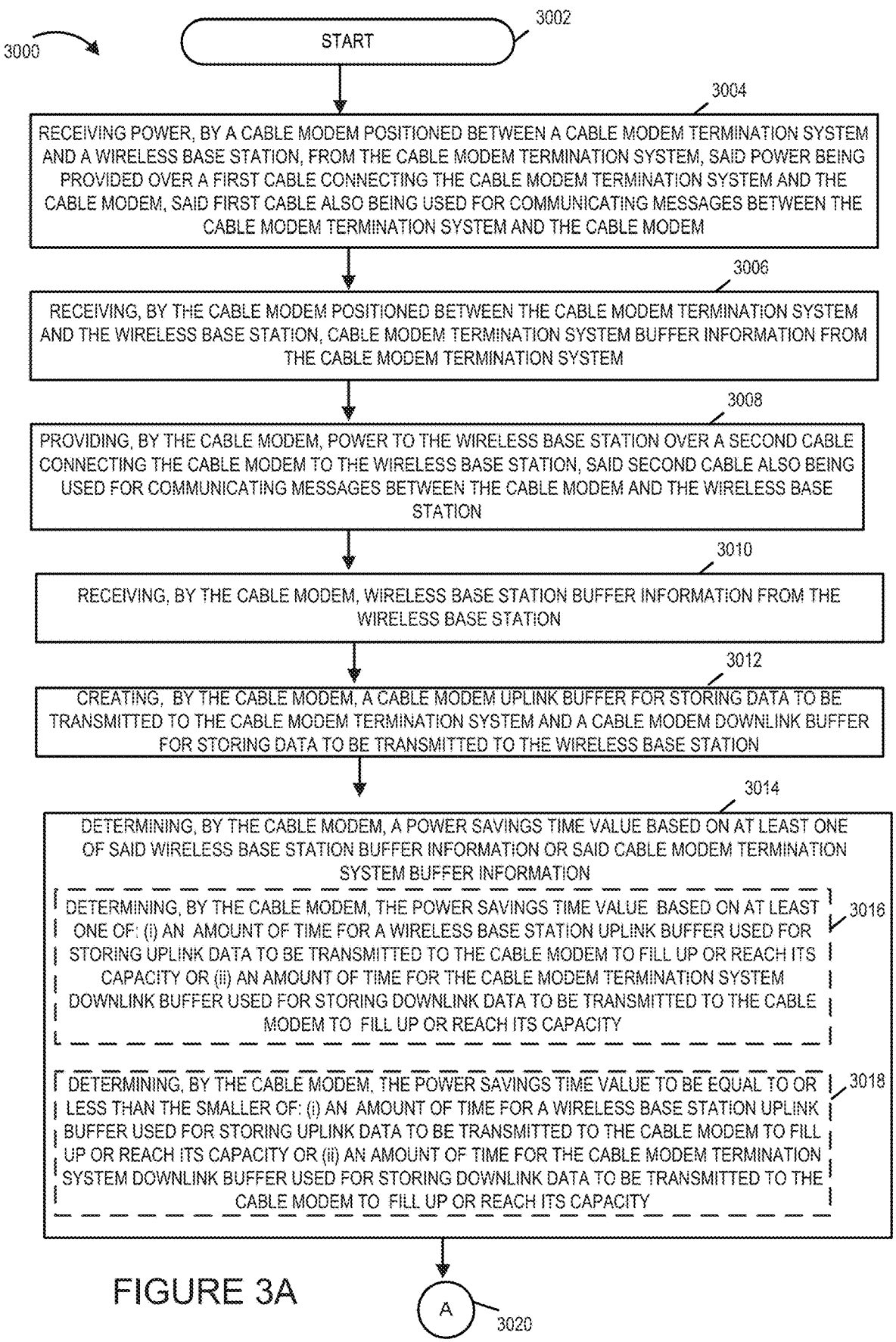
FIG. 3A illustrates the steps of the first part of an exemplary method in accordance with one embodiment of the present invention.
Figure 3B:
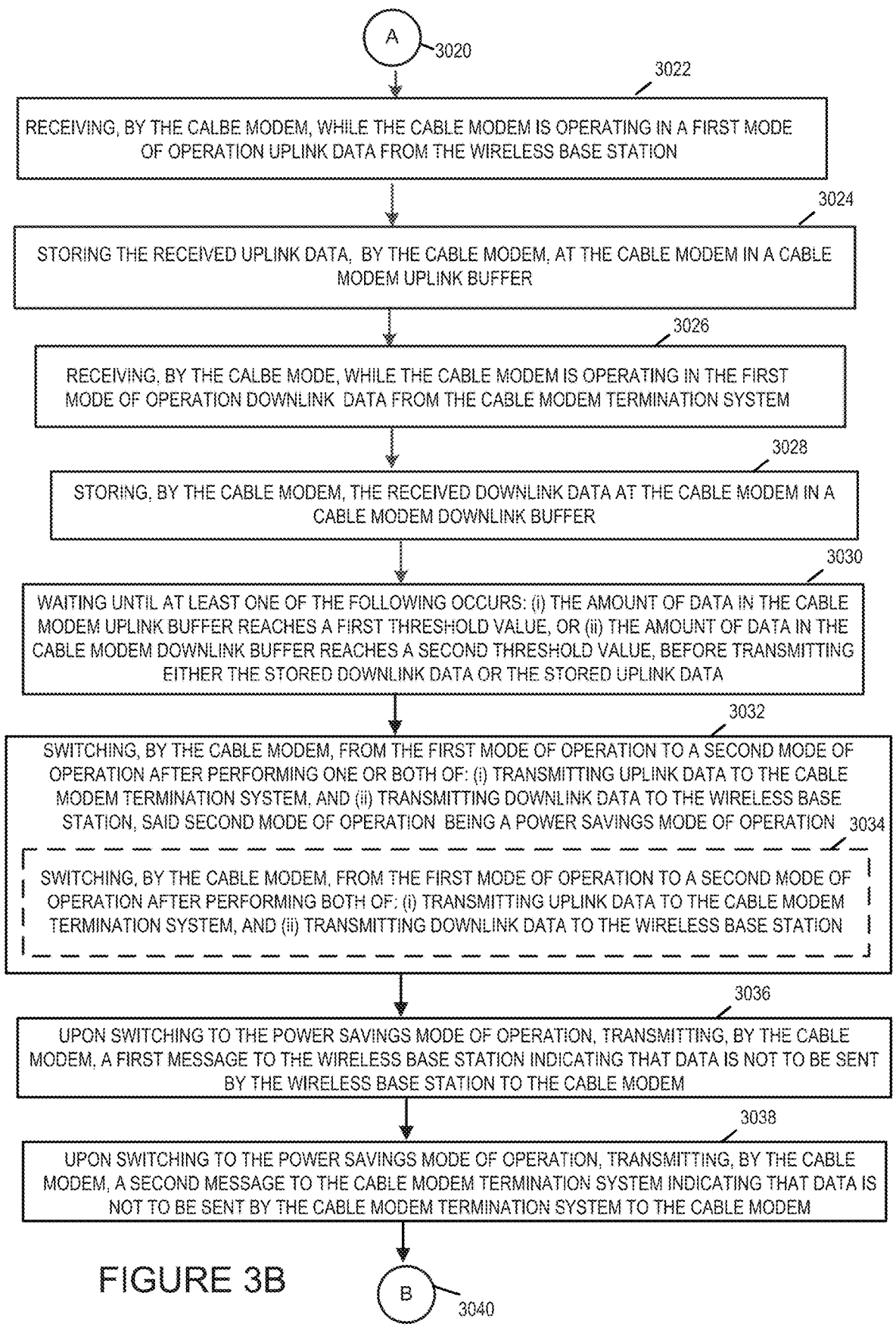
FIG. 3B illustrates the steps of the second part of an exemplary method in accordance with one embodiment of the present invention.
Figure 3C:
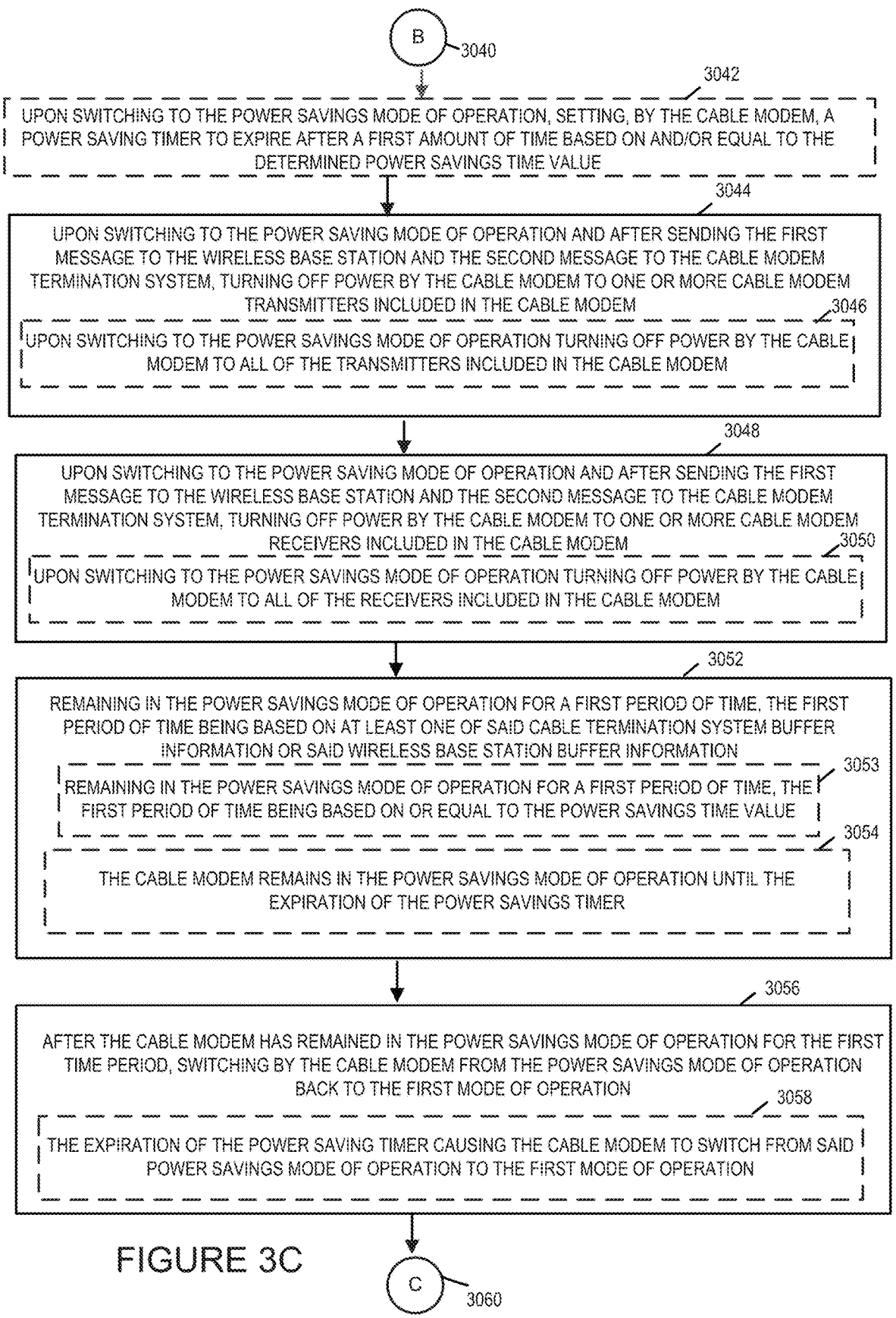
FIG. 3C illustrates the steps of the third part of an exemplary method in accordance with one embodiment of the present
Figure 3D:
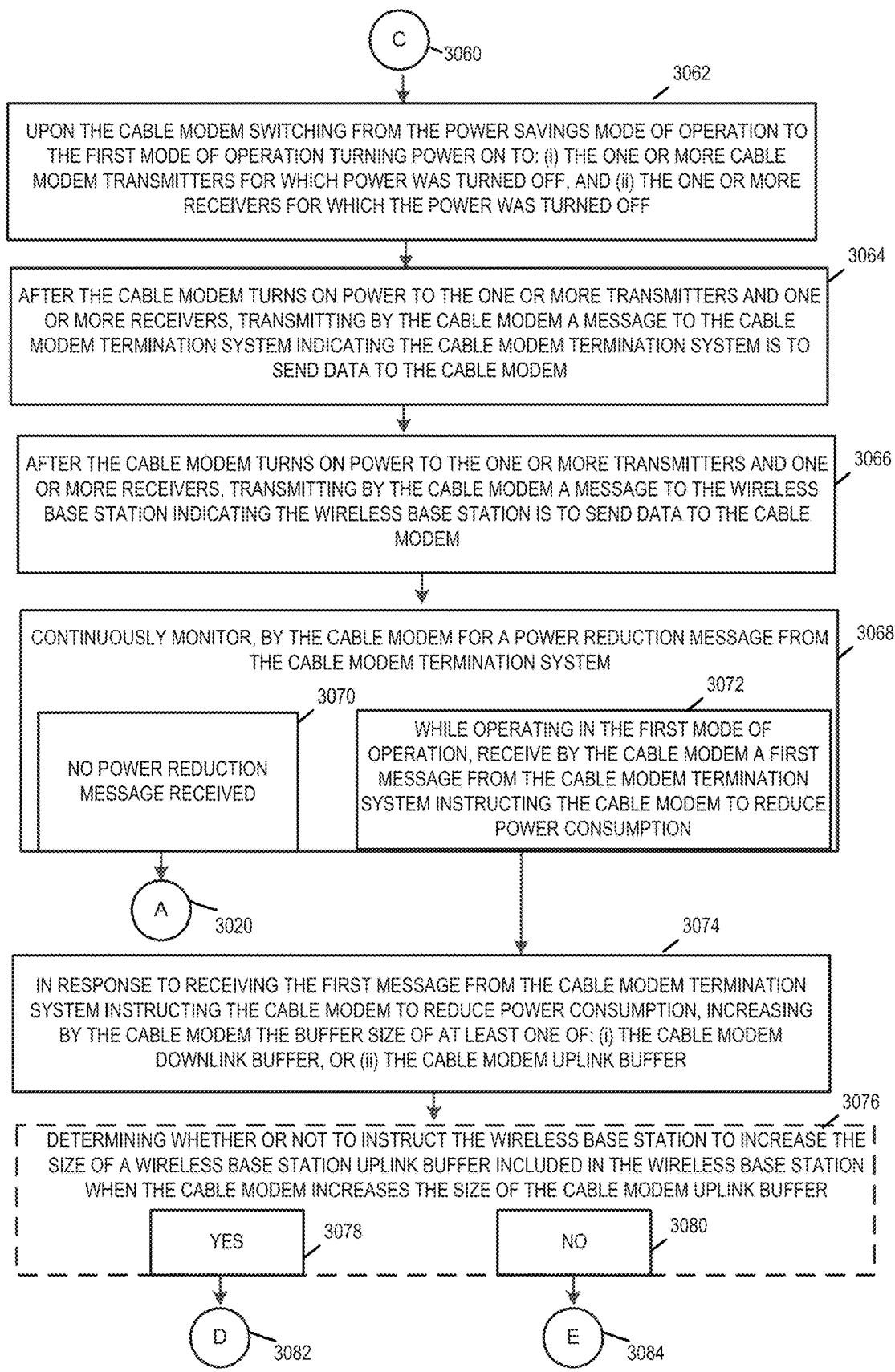
FIG. 3D illustrates the steps of the fourth part of an exemplary method in accordance with one embodiment of the present invention.
Figure 3E:
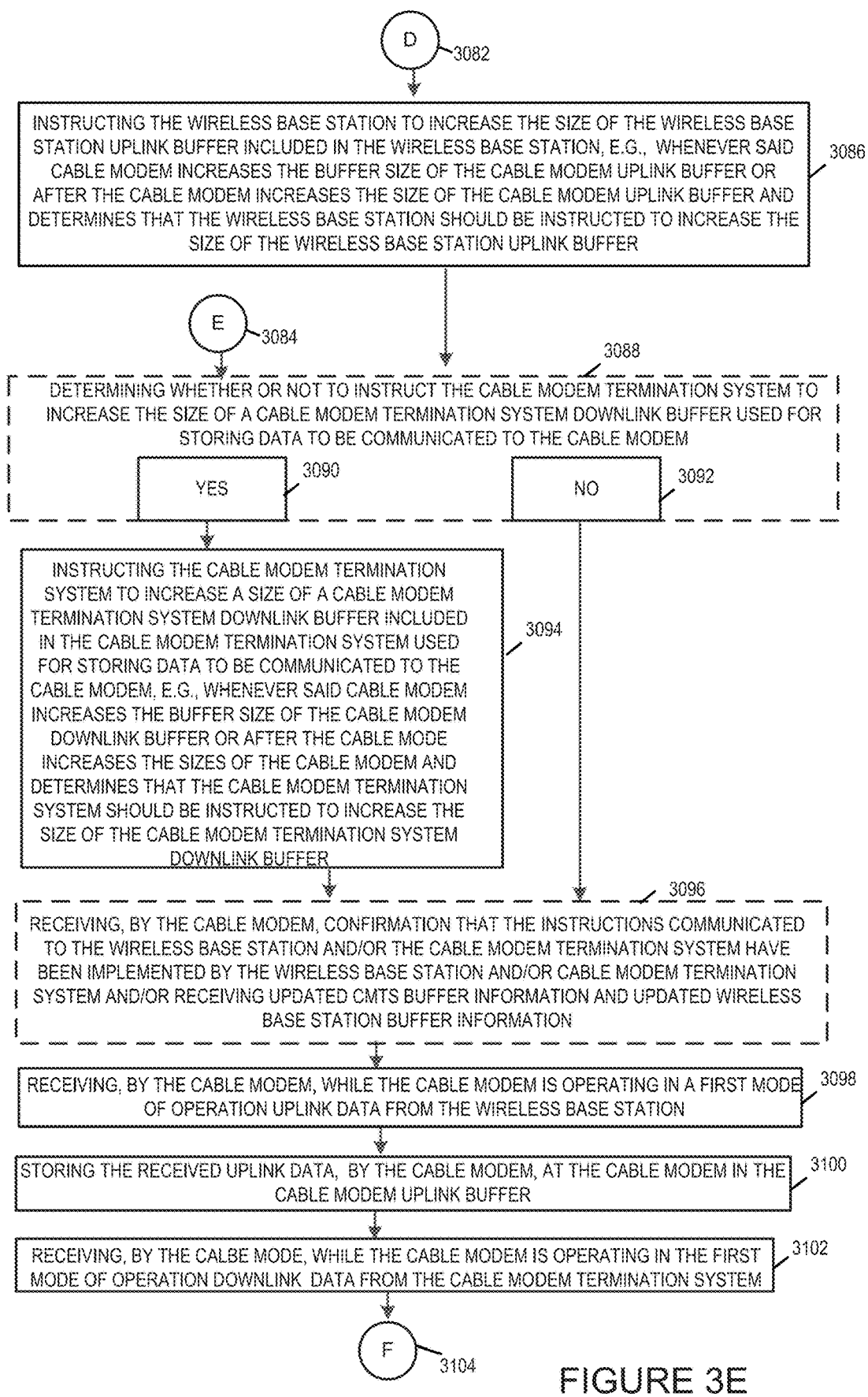
FIG. 3E illustrates the steps of the fifth part of an exemplary method in accordance with one embodiment of the present invention.
Figure 3F:
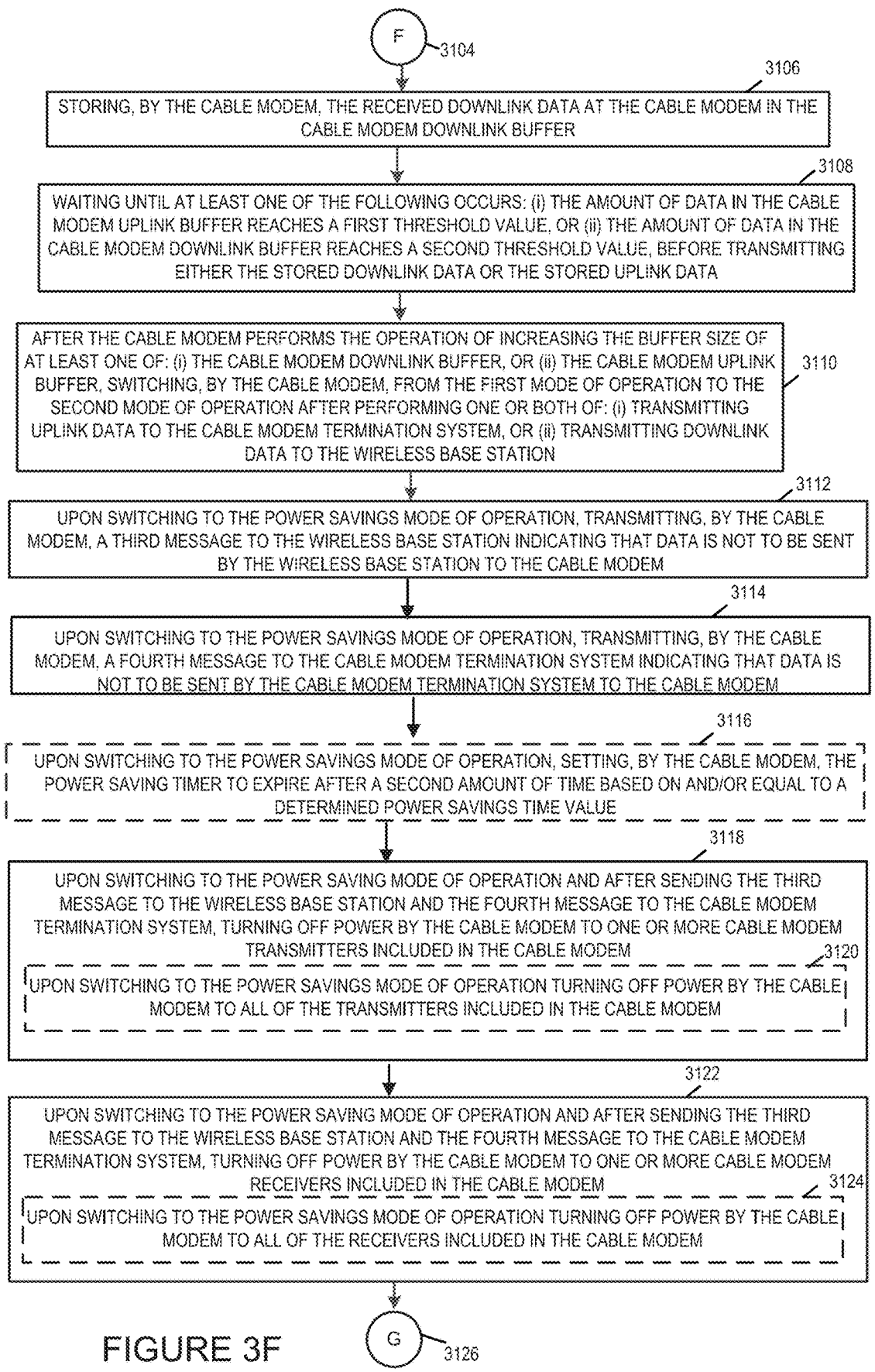
FIG. 3F illustrates the steps of the sixth part of an exemplary method in accordance with one embodiment of the present invention.

FIG. 3, which comprises the combination of FIGS. 3A, 3B, 3C, 3D, 3E, 3F, and 3G illustrates an exemplary method 3000. FIG. 3A illustrates the steps of the first part of an exemplary method 3000 in accordance with one embodiment of the present invention. FIG. 3B illustrates the steps of the second part of an exemplary method 3000 in accordance with one embodiment of the present invention. FIG. 3C illustrates the steps of the third part of an exemplary method 3000 in accordance with one embodiment of the present invention. FIG. 3D illustrates the steps of the fourth part of an exemplary method 3000 in accordance with one embodiment of the present invention. FIG. 3E illustrates the steps of the fifth part of an exemplary method 3000 in accordance with one embodiment of the present invention. FIG. 3F illustrates the steps of the sixth part of an exemplary method 3000 in accordance with one embodiment of the present invention. FIG. 3G illustrates the steps of the seventh part of an exemplary method 3000 in accordance with one embodiment of the present invention.

For explanatory purposes the exemplary method 3000 will be explained in connection with the exemplary system 100 illustrated in FIG. 1 wherein the wireless network is a CBRS network, wireless base stations are CBSD devices, the resource allocation management devices are SAS devices, the core network is a 5G network, the cable network is a DOCSIS cable network. However, it should be understood that the method may be implemented using other system configurations then those illustrated in FIG. 1. While it will be readily understood that additional steps and signaling are performed in connection with communicating information, messages, and packets between devices, the method 3000 focuses on and discusses the steps and signaling for understanding the invention.

The method 3000 starts in start step 3002 shown on FIG. 3A. Operation proceds from start step 3002 and proceeds to step 3004.

In step 3004, a cable modem, e.g., cable modem 1 104 of system 100, positioned between a cable modem termination system, e.g., CMTS 1 122, and a wireless base station, e.g., WBS 1 102 of system, receives power from the cable modem termination system. The power is provided in this example via a first cable connecting the cable modem termination system and the cable modem. This first cable in this example is also used for communicating messages, e.g., message including data packets and/or control messages, between the cable modem termination system and the cable modem. In some embodiments, the power is provided using Power over Ethernet. Operation proceeds from step 3004 to step 3006.

In step 3006, the cable modem which is positioned the cable modem termination system and the wireless base station receives cable modem termination system buffer information from the cable modem termination system, e.g., the amount of time it takes for the cable modem termination system downlink buffer used to store downlink messages for the cable modem to fill up to its capacity. In some embodiments, the cable modem termination system buffer information includes the sizes of its downlink and uplink buffers used for storing data to be sent to the cable modem and for storing data received from the cable modem respectively. In some embodiments, the cable modem termination system buffer information also includes the buffer fill rates for the cable modem termination system uplink buffer and downlink buffer. Operation proceeds from step 3006 to step 3008.

In step 3008, the cable modem provides power to the wireless base station over a second cable. The second cable connects the cable modem to the wireless base station. In this example, the second cable is also used to communicating messages, e.g., messages including data packets and/or control messages, between the cable modem and the wireless base station. In some embodiments, the power is provided using Power over Ethernet. Operation proceeds from step 3008 to step 3010.

In step 3010, the cable modem receives wireless base station buffer information from the wireless base station e.g., the amount of time it takes for the wireless base station buffer used to store uplink messages for the cable modem to fill up to its capacity. In some embodiments, the wireless base station buffer information includes the sizes of its uplink and downlink buffers used for storing data to be sent to the cable modem and for storing data received from the cable modem respectively. In some embodiments, the wireless base station buffer information also includes the buffer fill rates for the wireless base station uplink and downlink buffers used for storing data to be sent to the cable modem and for storing data received from the cable modem. Operation proceeds from step 3010 to step 3012.

In step 3012, the cable modem creates a cable modem uplink buffer and a cable modem downlink buffer. The cable modem uplink buffer is used for storing data received from the wireless base station and to be transmitted to the cable modem termination system. The cable modem downlink buffer is used for storing data received from the cable modem termination system and to be transmitted to the wireless base station. In various embodiments, the size of the cable modem uplink buffer and/or the cable modem downlink buffer is based on the cable modem termination system buffer information and the wireless base station buffer information. In some embodiments, the cable modem uplink buffer size is equal to or greater than the wireless base station uplink buffer size so that the wireless base station can transmit all of its stored data to the cable modem at one time, e.g., as a transmission burst. This can avoid the loss of data. In some embodiments, the cable modem downlink buffer size is equal to or grater than the wireless base station downlink buffer In most embodiments, the buffer size of the cable modem termination system is not an issue as it has a lot more capacity than the cable modem or the wireless base station and will not lose data received due to a buffer overload issue. In some embodiments, once the cable modem has created its uplink and downlink buffers it determines the amount of power the cable modem consumes to transmit a full downlink buffer and a full uplink buffer and reports this information to the CMTS power management device, e.g., CMTS power management device 152 of system 100.

In step 3014, the cable modem determines a power savings time value based on at least one of said wireless base station buffer information or said cable modem termination system buffer information. In some embodiments, step 3014 includes one or more sub-steps 3016 and 3018.

In sub-step 3016, the cable modem determines the power savings time value based on at least one of: (i) an amount of time for a wireless base station uplink buffer used for storing uplink data to be transmitted to the cable modem to fill up or reach its capacity, or (ii) an amount of time for the cable modem termination system downlink buffer used for storing downlink data to be transmitted to the cable mode to fill up or reach its capacity. The buffer information provided in steps 3006 and 3008 providing this information or information from which these amounts of times may be derived by the cable modem.

In sub-step 3018, the cable modem determines the power saving time value to be a value equal to or less than the smaller of: (i) an amount of time for a wireless base station uplink buffer used for storing uplink data to be transmitted to the cable modem to fill up or reach its capacity, or (ii) an amount of time for the cable modem termination system downlink buffer used for storing downlink data to be transmitted to the cable mode to fill up or reach its capacity. The buffer information provided in steps 3006 and 3008 providing this information or information from which these amounts of times may be derived by the cable modem. Operation proceeds from step 3014 via connection node A 3020 to step 3022 shown on FIG. 3B.

In step 3022, the cable modem while operating in a first mode of operation receives uplink data from the wireless base station. Operation proceeds from step 3022 to step 3024.

In step 3024, the cable modem stores the received uplink data at the cable modem in a cable modem uplink buffer. Operation proceeds from step 3024 to step 3026.

In step 3026, the cable modem while operating in the first mode of operation receives downlink data from the cable modem termination system. The downlink data having a destination of user equipment devices connected to the wireless base station. The downlink data being sent to the cable modem for transmission to the wireless base station. Operation proceeds from step 3026 to step 3028.

In step 3028, the cable modem stores the received downlink data at the cable modem in a cable modem downlink buffer. Operation proceeds from step 3028 to step 3030.

In step 3030, the cable modem waits until at least one of the following occurs: (i) the amount of data in the cable modem uplink buffer reaches a first threshold value, or (ii) the amount of data in the cable modem downlink buffer reaches a second threshold value, before transmitting either the stored downlink data or the stored uplink data. Operation proceeds from step 3030 to step 3032.

In step 3032, the cable modem switches from the first mode of operation to a second mode of operation after performing one or both of: (i) transmitting uplink data to the cable modem termination system, and (ii) transmitting downlink data to the wireless base station. The second mode of operation is a power savings mode of operation. In some embodiments step 3032 includes sub-step 3034. In sub-step 3034, the cable modem switches from the first mode of operation to the second mode of operation after performing both of: (i) transmitting uplink data to the cable modem termination system, and (ii) transmitting downlink data to the wireless base station. In most, but not all embodiments, the cable modem transmits all of the data in both its uplink and downlink before switching from the first mode of operation to the second mode of operation, i.e., it empties the uplink and downlink buffers. Operation proceeds from step 3032 to step 3036.

In step 3036, upon switching to the second mode of operation also referred to as the power savings mode of operation, the cable modem sends a first message to the wireless base station. The first message includes information indicating that the wireless base station is not to send data to the cable modem. This information may be indicated in a bit setting, e.g., a bit set to a 1 or a bit which is cleared, i.e., set to zero. Operation proceeds from step 3036 to step 3038.

In step 3038, upon switching to the second mode of operation also referred to as the power savings mode of operation, the cable modem sends a send message to the cable modem termination system. The second message includes information indicating that the cable modem termination system is not to send data to the cable modem. This information may be indicated in a bit setting, e.g., a bit set to a 1 or a bit which is cleared, i.e., set to zero. Operation proceeds from step 3038 to step 3042 shown on FIG. 3C via connection node B 3040.

In step 3042, upon switching to the power savings mode of operation, the cable modem sets a power saving timer to expire after a first amount of time based on an/or equal to determined power savings time value. In most embodiments, the cable modem will use a first amount of time slightly less than the determined power savings time value so as to ensure that the cable modem termination system downlink buffer and/or wireless base station uplink buffer do not overflow, e.g., to avoid the loss of data. Step 3042 is optional. If step 3042 is not implemented operation proceeds to step 3044 from step 3038.

In step 3044, upon switching to the power savings mode of operation and after sending the first message to the wireless base station and the second message to the cable modem termination system, the cable modem turns off power to one or more cable modem transmitters included in the cable modem. In some embodiments, step 3044 includes sub-step 3046. In sub-step 3046, upon switching to the power savings mode of operation, the cable modem turns off power to all of the transmitters included in the cable modem. Turning off power to the transmitter(s) saves power and makes the cable modem more power efficient. Operation proceeds from step 3044 to step 3048.

In step 3048, upon switching to the power savings mode of operation and after sending the first message to the wireless base station and the second message to the cable modem termination system, the cable modem turns off power to one or more cable modem receivers included in the cable modem. In some embodiments, step 3048 includes sub-step 3050. In sub-step 3050, upon switching to the power savings mode of operation, the cable modem turns off power to all of the receivers included in the cable modem. Turning off power to the receiver(s) saves power and makes the cable modem more power efficient. Operation proceeds from step 3048 to step 3052.

In step 3052, the cable modem remains in the power savings mode of operation for a first period of time. The first period of time being based on at least one of the cable modem termination system buffer information or the wireless base station buffer information. In some embodiments, step 3052 includes one or more sub-steps 3053 and 3054. In sub-step 3053, the cable modem remains in the power savings mode of operation for a first period of time. The first period of time being based on or equal to the power savings time value. In sub-step 3054, the cable modem remains in the power savings mode of operation until the expiration of the power saving timer. Operation proceeds from step 3052 to step 3056.

In step 3056, after the cable modem has remained in the power savings mode of operation for the first time period, the cable mode switches from the power saving mode of operation back to the first mode of operation. In some embodiments, step 3056 includes sub-step 3058. In sub-step 3058, the expiration of the power savings timer causes the cable modem to switch from the power savings mode of operation to the first mode of operation. Operation proceeds from step 3056 via connection node C 3060 to step 3062 shown on FIG. 3D.

In step 3062, upon the cable modem switching from the power savings mode of operation to the first mode of operation, the cable modem turns power on to (i) the one or more cable modem transmitters for which power had been turned off by the cable modem, and (ii) the one or more receivers for which the power had been turned off by the cable modem. Operation proceeds from step 3062 to step 3064.

In step 3064, after the cable modem turns on power to the one or more transmitters and one or more receivers, the cable modem transmits a message to the cable modem termination system including information indicating the cable modem termination system is to send data to the cable modem. This information may be indicated in a bit setting, e.g., a bit set to a 1 or a bit which is cleared, i.e., set to zero. Operation proceeds from step 3064 to step 3066.

In step 3066, after the cable modem turns on power to the one or more transmitters and one or more receivers, the cable modem transmits a message to the wireless base station including information indicating the wireless base station is to send data to the cable modem. This information may be indicated in a bit setting, e.g., a bit set to a 1 or a bit which is cleared, i.e., set to zero. Operation proceeds from step 3066 to step 3068.

In step 3068, the cable modem performs the operation of continuously monitoring for a power reduction message from the cable mode termination system. This continuous monitoring step 3068 is performed whenever the cable modem is receiving messages from the cable modem termination system, e.g., when operating in the first mode of operation.

When the cable modem determines that it has not received a no power reduction message operation proceeds from sub-step 3070 of step 3068 via connection node A 3020 to step 3022 shown on FIG. 3B where the method continues as previously described.

When the cable modem determines that it has received a first message from the cable modem termination system instructing the cable modem to reduce power consumption, operation proceeds from sub-step 3072 of step 3068 to step 3074.

In step 3074, in response to receiving the first message from the cable modem termination system instructing the cable modem to reduce power consumption, the cable modem increases the cable modem buffer size of at least one of: (i) the cable modem downlink buffer, or (ii) the cable modem uplink buffer. Operation proceeds from step 3074 to optional step 3076. If optional step 3076 is not implemented operation proceeds to step 3086 via connection node 3082 shown on FIG. 3E.

In step 3076 the cable modem determines whether or not to instruct the wireless base station to increase the size of the wireless base station uplink buffer included in the wireless base station when the cable modem increases the size of the cable modem uplink buffer in response to the message received instructing the cable modem to reduce its power consumption. The wireless base station uplink buffer is used for storing data to be communicated to the cable modem. When the cable modem makes the determination to instruct the wireless base station to increase the size of uplink buffer included in the wireless base station operation proceeds from sub-step 3078 of step 3076 via connection node D 3082 to step 3086 shown on FIG. 3E. When the determination made by the cable modem that the cable modem will not instruct the wireless base station to increase the size of the wireless base station uplink buffer included in the wireless base station operation proceeds from sub-step 3080 of step 3076 via connection node E 3084 to optional step 3088 shown on FIG. 3E. If optional step 3088 is not implemented operation proceeds to step 3094 shown on FIG. 3E.

The cable modem in some embodiments makes the determination of whether or not to instruct the wireless base station to increase the wireless base station uplink buffer size based on the wireless base station buffer information the cable modem received from the wireless base station. For example, when the wireless base station buffer information includes the wireless base station uplink buffer size, the cable modem can determine if the increase in the cable modem uplink buffer size will result in the cable modem having a buffer size which is greater than the wireless base station uplink buffer size. When that is the case the cable modem, will determine to instruct the wireless base station to increase its uplink buffer size so that it is at least the same size as the cable modem uplink buffer size. When that is not the case, and the wireless base station already has an uplink buffer size greater than the increased cable modem uplink buffer size then the cable modem will determine that the cable modem will not instruct the wireless base station to increase its uplink buffer size. In some embodiments, the cable modem will make this determination based on whether the wireless base station uplink buffer size is a threshold percentage larger than the cable modem uplink buffer size so as to avoid any buffer overflow conditions should there be any processing delay in uplink buffer traffic at the cable modem. In some embodiments, the cable modem uplink buffer is created to be the same size as the wireless base station uplink buffer. In this case, optional step 3076 is omitted and processing proceeds directly to step 3086.

In step 3086, the cable modem instructs the wireless base station to increase the size of the wireless base station uplink buffer included in the wireless base station, e.g., whenever the cable modem increases the buffer size of the cable modem uplink buffer in response to the power reduction instruction and the cable modem uplink buffer has been created to have a size which matches or is equal to the wireless base station uplink buffer or after the cable modem increases the size of the cable modem uplink buffer and determines that the wireless base station is to be instructed to increase the size of the wireless base station uplink buffer as discussed in step 3076. Operation proceeds from step 3086 to optional step 3088. If optional step 3088 is not implemented operation proceeds to step 3094.

In step 3088 the cable modem determines whether or not to instruct the cable modem termination system to increase the size of the cable modem termination system downlink buffer used for storing data to be communicated to the cable modem when the cable modem increases the size of the cable modem downlink buffer in response to the message received instructing the cable modem to reduce its power consumption. When the cable modem makes the determination to instruct the cable modem termination system to increase the size of cable modem termination system downlink buffer operation proceeds from sub-step 3090 of step 3088 to step 3094. When the determination made by the cable modem that the cable modem will not instruct the cable modem termination system to increase the size of the cable modem termination system downlink buffer used for storing data to be communicated to the cable modem operation proceeds from sub-step 3092 of step 3088 to step 3096.

The cable modem in some embodiments makes the determination of whether or not to instruct the cable modem termination to increase the cable modem termination system downlink buffer size based on the cable modem termination system buffer information the cable modem received from the cable modem termination system. For example, when the cable modem termination system information includes the cable modem termination system downlink buffer size, the cable modem can determine if the increase in the cable modem downlink buffer size will result in the cable modem having a buffer size which is greater than the cable modem termination system downlink buffer size. When that is the case the cable modem, will determine to instruct the cable modem termination system to increase its downlink buffer size for the downlink buffer that is used to communicate data to the cable modem so that it is at least the same size as the cable modem downlink buffer size. When that is not the case, and the cable modem termination system already has a downlink buffer size greater than the increased cable modem downlink buffer size then the cable modem will determine that the cable modem will not instruct the cable modem termination system to increase its downlink buffer size. In some embodiments, the cable modem will make this determination based on whether the cable modem termination system downlink buffer size is a threshold percentage larger than the cable modem downlink buffer size so as to avoid any buffer overflow conditions should there be any processing delay in downlink buffer traffic at the cable modem. In some embodiments, the cable modem downlink buffer is created to be the same size as the cable modem termination system downlink buffer used for storing data to be communicated to the cable modem. In this case, optional step 3088 is omitted and processing proceeds directly to step 3094.

In step 3094, the cable modem instructs the cable modem termination system to increase the size of the cable modem termination system downlink buffer used for storing data to be communicated to the cable modem, e.g., whenever the cable modem increases the buffer size of the cable modem downlink buffer in response to the power reduction instruction and the cable modem downlink buffer has been created to have a size which matches or is equal to the cable modem termination system downlink buffer used for storing data to be communicated to the cable modem or after the cable modem increases the size of the cable modem downlink buffer and determines that the cable modem termination system downlink buffer is to be instructed to increase the size of the cable modem termination system downlink buffer as discussed in step 3088. Operation proceeds from step 3094 to step 3096.

In optional step 3096, the cable modem receives confirmation that the instructions communicated to the wireless bas station and/or cable modem termination system have been implemented by the wireless base station and/or cable modem termination system and/or the cable modem receives updated CMTS buffer information and updated wireless base buffer information from the CMTS and/or wireless base station providing updated information on the CMTS and/or wireless base station buffers including for example buffer sizes after the increases have been implemented. In some embodiments, step 3096 is not implemented and the cable modem proceeds under the assumption that its instructions to the CMTS and/or wireless base station have been implemented. Operation proceeds from step 3096 to step 3098.

In step 3098, the cable modem while operating in the first mode of operation receives uplink data from the wireless base station. This uplink data is different than the uplink data previously received. It some instances it may be referred to herein as additional uplink data. Operation proceeds from step 3098 to step 3100.

In step 3100, the cable modem stores at the cable modem in the cable modem uplink buffer the received additional uplink data. Operation proceeds from step 3100 to step 3102.

In step 3102, while the cable modem is operating in the first mode of operation, the cable modem receives downlink data from the cable modem termination system. This received downlink data is different from the previously received downlink data and is sometimes referred to herein as additional downlink data. Operation proceeds from step 3102 via connection node F 3104 to step 3106 shown on FIG. 3F.

In step 3106, the cable modem stores the received additional downlink data in the cable modem downlink buffer. Operation proceeds from step 3106 to step 3108.

In step 3108, the cable modem, waits until at least one of the following occurs: (i) the amount of data in the cable modem uplink buffer reaches a first threshold value, or (ii) the amount of data in the cable modem downlink buffer reaches a second threshold value, before transmitting either the stored downlink data to the wireless base station or the stored uplink data to the CMTS. Operation proceeds from step 3108 to step 3110.

In step 3110, after the cable modem performs the operation of increasing the buffer size of at least one of: (i) the cable modem downlink buffer, or (ii) the cable modem uplink buffer, switching from the first mode of operation to the second mode of operation after the cable modem performs one or both of: (i) transmitting uplink data to the cable modem termination system (e.g., emptying or flushing its uplink buffer), or (ii) transmitting downlink data to the wireless base station (e.g., emptying or flushing its downlink buffer). Operation proceeds from step 3110 to step 3112.

In step 3112, upon switching to the second mode of operation which is the power savings mode of operation, transmitting by the cable modem a message (e.g., a third message) to the wireless base station indicating that data is not to be sent by the wireless base station to the cable modem. Operation proceeds from step 3112 to step 3114.

In step 3114, upon switching to the second mode of operation which is the power savings mode of operation, transmitting, by the cable modem, a message, e.g., a fourth message, to the cable modem termination system indicating that data is not to be sent by the cable modem termination system to the cable modem. Operation proceeds from step 3114 to optional step 3116. If step 3116 is not implemented operation proceeds from step 3114 to step 3118.

In step 3116, upon switching to the second mode of operation, setting by the cable modem, the power saving timer to expire after a second amount of time based on and/or equal to a determined power saving time value. The power saving time value being determined based at least in part on the size of one or more of the following the CMTS downlink buffer size, the wireless base station uplink buffer size, the previously determined power saving time value and the increased uplink buffer size, the previously determined power saving time value and the increased downlink buffer size, the latency introduced by the cable modem having one or more of its transmitters and/or one or more of its receivers turned off for the powers saving time value. Operation proceeds from step 3116 to step 3118.

In step 3118, upon switching to the power savings mode of operation and after sending the message (e.g., third message) to the wireless base station indicating that the wireless base station is not to send data to the cable modem and after sending the message (e.g., fourth message) to the CMTS indicating that the CMTS is not to send data to the cable modem, the cable modem turns off power to one or more cable modem transmitters included in the cable modem. Step 3118 in some embodiments includes sub-step 3120. In step 3120 upon switching to the power saving mode of operation, the cable modem turns off power to all of the transmitters included in the cable modem. This is done to conserve power. Operation proceeds from step 3118 to step 3122.

In step 3122, upon switching to the power savings mode of operation and after sending the message (e.g., third message) to the wireless base station indicating that the wireless base station is not to send data to the cable modem and after sending the message (e.g., fourth message) to the CMTS indicating that the CMTS is not to send data to the cable modem, the cable modem turns off power to one or more cable modem receivers included in the cable modem. Step 3122 in some embodiments includes sub-step 3124. In step 3124 upon switching to the power saving mode of operation, the cable modem turns off power to all of the receivers included in the cable modem. This is done to conserve power. Operation proceeds from step 3122 via connection node G 3126 to step 3128.

In step 3128, the cable modem remains in the power savings mode of operation for a second time period. The second time period is based on at least one of: (i) the size of the cable modem termination system downlink buffer or (ii) the size of the wireless base station uplink buffer. The second time period is longer than the first time period. In some embodiments, the second time period is also based on the amount of delay which will be introduced into the upstream and/or downstream data streams by the cable modem being in the power saving mode of operation with one or more transmitters turned off and/or one or more receivers turned off. In some embodiments, step 3128 includes one or more sub-steps 3130 and 3132. In sub-step 3130, the cable modem remains in the power savings mode of operation for a second period of time, the second period of time being based on or equal to the power savings time value. In sub-step 3132, the cable modem remains in the power savings mode of operation until the expiration of the power saving timer. Operation proceeds from step 3128 to step 3134.

In step 3134, after the cable modem has remained in the power savings mode of operation for the second period of time, switching by the cable modem form the power savings mode of operation back to the first mode of operation. In some embodiments, step 3134 includes sub-step 3136. In sub-step 3136, the expiration of the power savings timer causes the cable modem to switch from the power savings mode of operation to the first mode of operation. It is to be understood that the terms first period of time and first time period have been used interchangeable herein. It is to be further understood that the terms second period of time and second time period have also been used interchangeable herein. Operation proceeds from step 3134 via connection node 3060 to step 3062 wherein the method continues with the steps of the method continuing to be executed. It is to be understood that the first time period is now replaced by the second time period regarding the amount of time the cable modem will remain in the power savings mode of operation and that the power savings timer will be set to the second time period and not the first time period. It is also to be understood that the continuous monitoring of step 3068 continues and when an additional power reduction command is detected as being received by the cable modem from the cable modem termination system, the process will repeat with the cable modem once again increasing the size of the cable modem uplink buffer and/or cable modem downlink buffer as well as the other steps of the process so that additional power savings are obtained when the cable modem remains in the power savings mode of operation for longer period of time. The cable modem remaining in the power savings mode of operation for a longer period of time resulting from the increased sizes of the one or more buffers in the cable modem and at least one of the wireless base station and/or the CMTS.

Figure 4:
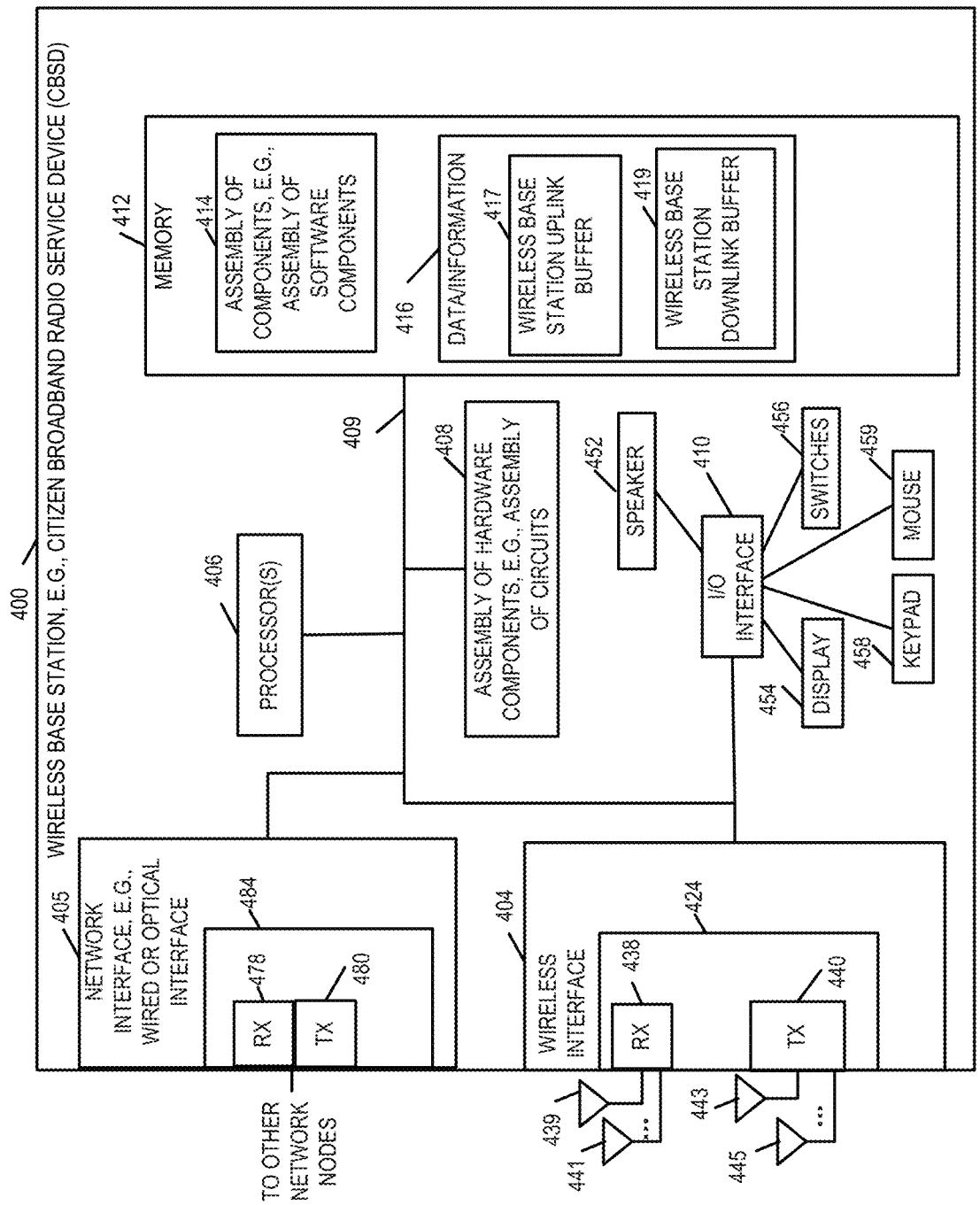
FIG. 4 illustrates details of an exemplary wireless base station (e.g., Citizens Broadband Radio Service Device (CBSD)) in accordance with one embodiment of the present invention.

FIG. 4 is a drawing of an exemplary wireless base station (WBS) (e.g., Citizens Broadband Radio Service Device (CBSD), LTE base station, 4G base station, 5G base station) 400 in accordance with an exemplary embodiment. The wireless base station device (e.g., CBSD device) 400. In some embodiments, the wireless base station (e.g., CBSD device) 400 also includes the capabilities of a CBSD as defined by the Federal Communications Commission's Rules with Regard to Commercial Operations in the 3550-3650 MHz Band. Exemplary wireless base station (e.g., CBSD device) 400 includes a wireless interface 404, a network interface 405, e.g., a wired or optical interface, processor(s) 406 (one or more processors), e.g., a CPU, an assembly of hardware components 408, e.g., an assembly of circuits, and I/O interface 410 and memory 412 coupled together via a bus 409 over which the various elements may interchange data and information. Wireless base station 400 further includes a speaker 452, a display 454, switches 456, keypad 458 and mouse 459 coupled to I/O interface 410, via which the various I/O devices (452, 454, 456, 458, 459) may communicate with other elements (404, 405, 406, 408, 412) of the wireless base station 400. Network interface 405 includes a receiver 478 and a transmitter 480. In some embodiments, receiver 478 and transmitter 480 are part of a transceiver 484. Wireless interface 404 includes a wireless receiver 438 and a wireless transmitter 440. In some embodiments, receiver 438 and transmitter 440 are part of a transceiver 442. In various embodiments, wireless interface 404 includes a plurality of wireless receivers and a plurality of wireless transmitters. Wireless receiver 438 is coupled to a plurality of receive antennas (receive antenna 1 439, . . . , receive antenna M 441), via which wireless base station 400 can receive wireless signals from other wireless communications devices including a second wireless communications device, e.g., a UE device. Wireless transmitter 440 is coupled to a plurality of wireless transmit antennas (transmit antenna 1 443, . . . , transmit antenna N 445) via which the wireless base station 400 can transmit signals to other wireless communications devices including a second wireless communications device, e.g., a UE device. Memory 412 includes an assembly of component 414, e.g., an assembly of software components, and data/information 416. Data/information 416 includes wireless base station uplink buffer 417 and wireless base station downlink buffer 419. In some embodiments, the wireless base stations discussed in the Figures and/or in connection with the embodiments of the present invention described are implemented in accordance with wireless base station 400. For example, WBS 1

(e.g., CBSD 1) 102 and/or WBS 2 (e.g., CBSD 2) 112 of system 100, may be, and in some embodiments are, implemented in accordance with wireless base station 400.

Figure 5:
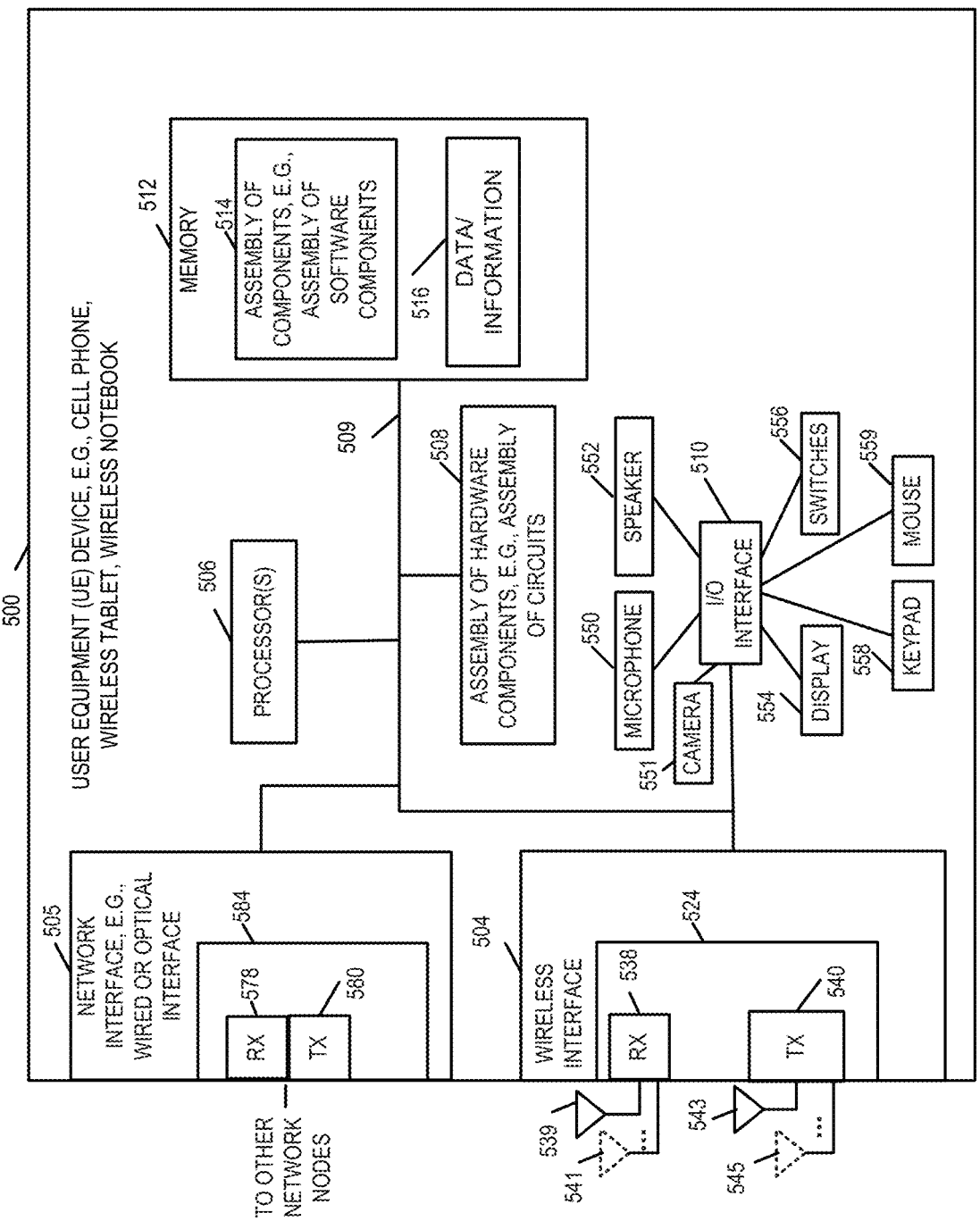
FIG. 5 illustrates details of an exemplary User Equipment (UE) device in accordance with one embodiment of the present invention.

FIG. 5 is a drawing of an exemplary user equipment (UE) device 500 in accordance with an exemplary embodiment. UE device 500 is, e.g., a mobile device such as a cell phone, a smart phone, wireless tablet or wireless notebook. UE device 500, in some embodiments, includes CBRS, 5G, Long Term Evolution (LTE), e.g., 4G LTE, mobile device capabilities. Exemplary UE device 500 includes a wireless interface 504, a network interface 505, a processor(s) 506, e.g., a CPU, an assembly of hardware components 508, e.g., an assembly of circuits, and I/O interface 510 and memory 512 coupled together via a bus 509 over which the various elements may interchange data and information. UE device 500 further includes a microphone 550, camera 551, speaker 552, a display 554, e.g., a touch screen display, switches 556, keypad 558 and mouse 559 coupled to I/O interface 510, via which the various I/O devices (550, 551, 552, 554, 556, 558, 559) may communicate with other elements (504, 505, 506, 508, 512) of the UE device. Network interface 505 includes a receiver 578 and a transmitter 580. In some embodiments, receiver 578 and transmitter 580 are part of a transceiver 584. Wireless interface 504 includes a wireless receiver 538 and a wireless transmitter 540. In some embodiments, receiver 538 and transmitter 540 are part of a transceiver 524. In various embodiments, wireless interface 504 includes a plurality of wireless receivers and a plurality of wireless transmitters. Wireless receiver 538 is coupled to one or more receive antennas (receive antenna 1 539, ..., receive antenna M 541), via which UE device 500 can receive wireless signals from other wireless communications devices including, e.g., a wireless base station such as wireless base station 400. Wireless transmitter 540 is coupled to one or more wireless transmit antennas (transmit antenna 1 543, ..., transmit antenna N 545) via which the UE device 500 can transmit signals to other wireless communications device including a first wireless communications device, e.g., a wireless base station 400. Memory 512 includes an assembly of components 514, e.g., an assembly of software components, and data/information 516. The user equipment devices illustrated in FIG. 1 may be, and in some embodiments are, implemented in accordance with user equipment device 500.

Figure 6:
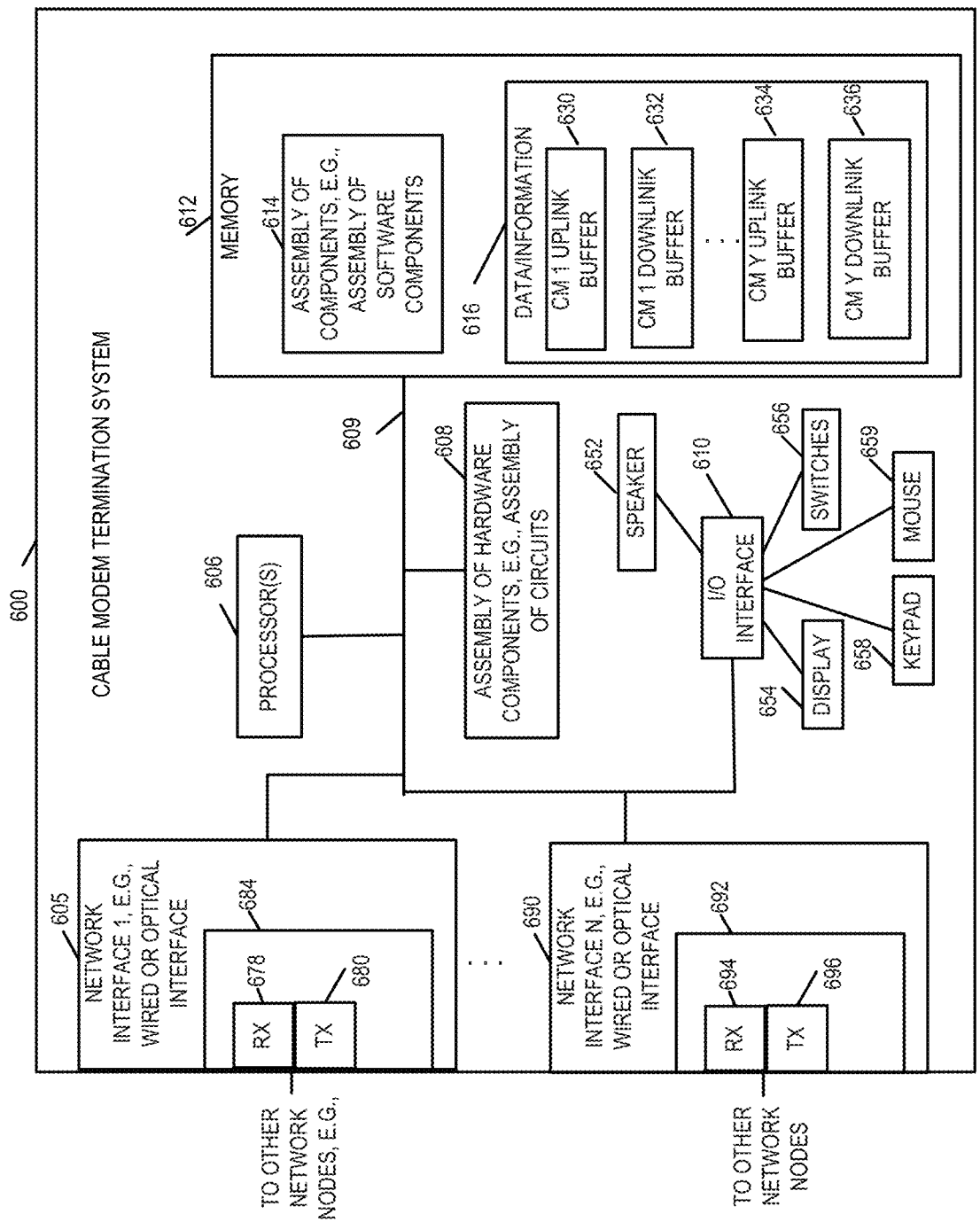
FIG. 6 illustrates details of an exemplary cable modem termination system in accordance with one embodiment of the present invention.

FIG. 6 is a drawing of an exemplary cable modem termination system in accordance with an exemplary embodiment. The cable modem termination system in some embodiments is implemented in accordance with DOCSIS standards. The cable modem termination system 600 includes a plurality of network interfaces 605, ..., 690, e.g., a wired or optical interface, a processor(s) 606 (e.g., one or more processors), e.g., a CPU, an assembly of hardware components 608, e.g., an assembly of circuits, and I/O interface 610 and memory 612 coupled together via a bus 609 over which the various elements may interchange data and information. The computing device 600 further includes a speaker 652, a display 654, switches 656, keypad 658 and mouse 659 coupled to I/O interface 610, via which the various I/O devices (652, 654, 656, 658, 659) may communicate with other elements (605, ..., 690, 606, 608, 612) of the cable modem termination system 600. Network interface 605 includes a receiver 678 and a transmitter 680. The network interface 605 is typically used to communicate with other devices, e.g., cable modems, CMTS power management device, other devices in the network core. In some embodiments, receiver 678 and transmitter 680 are part of a transceiver 684. Memory 612 includes an assembly of component 614, e.g., an assembly of software components, and data/information 616. Data/information 616 includes, among other things, uplink and downlink buffers for each cable modem to which it is connected. In this example, it includes cable modem termination system cable modem (CM) 1 uplink buffer 630, cable modem termination system CM 1 downlink buffer 632, ..., cable modem termination system CM Y uplink buffer 634, and cable modem termination system CM Y downlink buffer 636. In some embodiments, cable modem termination systems disclosed in the figures and/or discussed in connection with the various embodiments of the invention are implemented in accordance with cable modem termination system 600. For example, cable modem termination system 1 122 and cable modem termination system 2 124 of system 100 of FIG. 1 are implemented in accordance with cable modem termination system 600.

Figure 7:
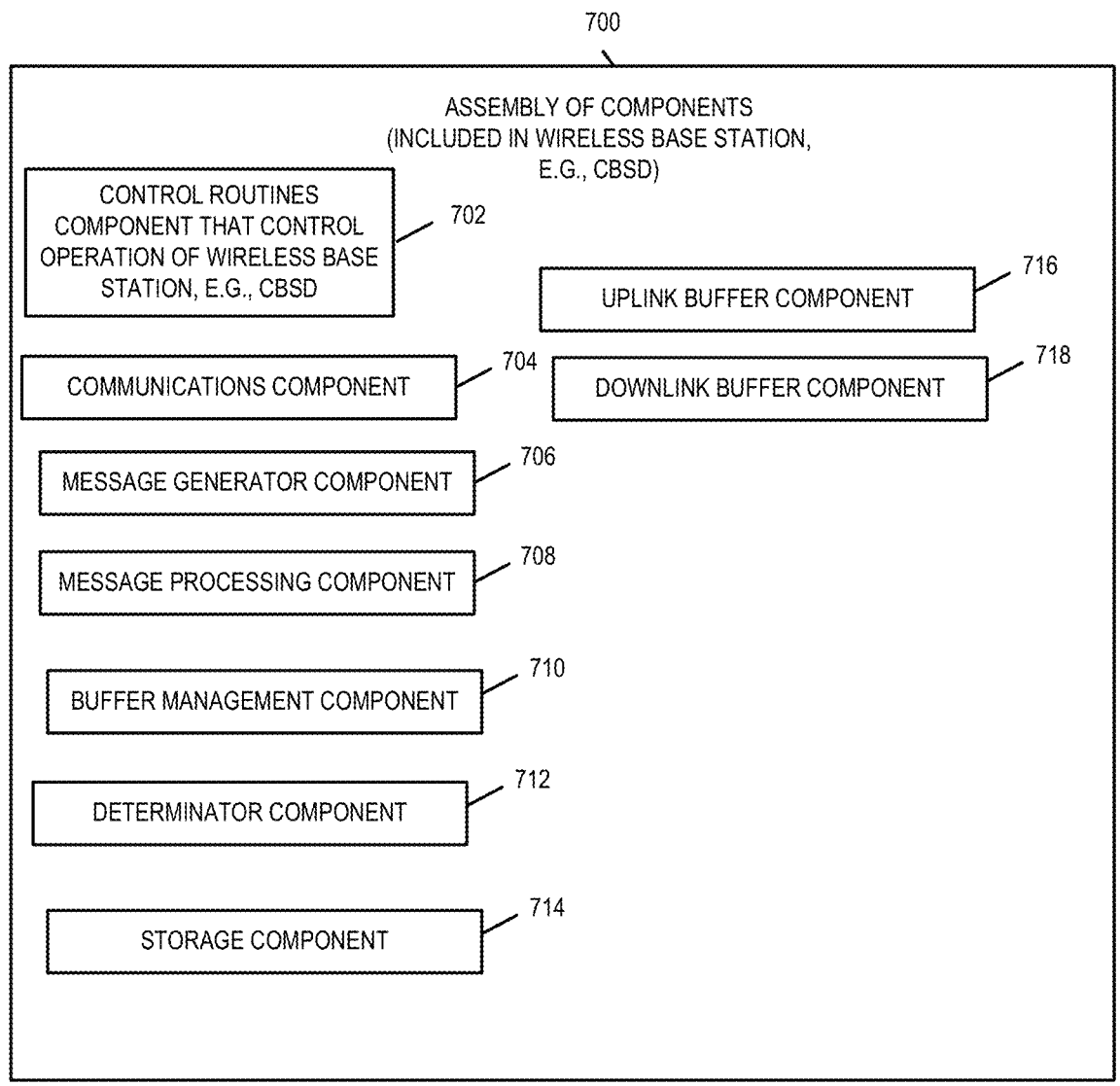
FIG. 7 illustrates an exemplary assembly of components for a wireless base station (e.g., CBSD) in accordance with an embodiment of the present invention.

FIG. 7 is a drawing of an exemplary assembly of components 700 which may be included in an exemplary wireless base station (e.g., exemplary wireless base station 400 of FIG. 4), in accordance with an exemplary embodiment. The components in the assembly of components 700 can, and in some embodiments are, implemented fully in hardware within a processor, e.g., processor 406, e.g., as individual circuits. The components in the assembly of components 700 can, and in some embodiments are, implemented fully in hardware within the assembly of hardware components 408, e.g., as individual circuits corresponding to the different components. In other embodiments some of the components are implemented, e.g., as circuits, within processor 406 with other components being implemented, e.g., as circuits within assembly of components 408, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 412 of the wireless base station 400, with the components controlling operation of wireless base station device 400 to implement the functions corresponding to the components when the components are executed by a processor e.g., processor 406. In some such embodiments, the assembly of components 700 is included in the memory 412 as assembly of software components 414. In still other embodiments, various components in assembly of components 700 are implemented as a combination of hardware and software, e.g., with another circuit external to the processor providing input to the processor which then under software control operates to perform a portion of a component's function.

When implemented in software the components include code, which when executed by a processor, e.g., processor 406, configure the processor to implement the function corresponding to the component. In embodiments where the assembly of components 700 is stored in the memory 412, the memory 412 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the wireless base station 400 or elements therein such as the processor 406, to perform the functions of corresponding steps illustrated and/or described in the method of one or more of the flowcharts, signaling diagrams and/or described with respect to any of the Figures. Thus the assembly of components 700 includes various components that perform functions of corresponding one or more described and/or illustrated steps of an exemplary method.

Assembly of components 700 includes a control routines component 702, a communications component 704, a message generator component 706, a message processing component 708, a buffer management component 710, a determinator component 712, a storage component 714, an uplink buffer component 716, and a downlink buffer component 718.

The control routines component 702 is configured to control operation of the wireless base station (e.g., CBSD). The communication component 704 is configured to handle communications, e.g., transmission and reception of messages, and protocol signaling for the wireless base station (e.g., CBSD). The message generator component 706 is configured to generate messages for transmission to other devices. The message processing component 708 is configured to process messages received from other devices, e.g., messages from user equipment devices, messages from a cable modem, messages from an Spectrum Access System, and policy control function devices.

The buffer management component 710 is configured to implement all aspects related to buffer management including creation and management of uplink data buffer(s) for storing data from user equipment devices to be transmitted to the cable modem, creation of downlink buffer(s) for storing data received from the cable modem, providing wireless base station buffer information to the cable modem including uplink and downlink buffer size and fill rates, uplink and downlink buffer sizes in terms of time to receive and store data to fully occupy the uplink buffer and the downlink buffer.

The determinator component 712 is configured to make determinations and decisions for the wireless base station including for example: buffer size as an amount of time for the buffer to become full, buffer size as number of bytes of storage capacity, buffer fill rate, and when to send data to the cable modem and when not to send data to the cable modem, e.g., send data after receiving a send data message and do not send data after receiving a do not send data message, when to store data received from user equipment devices in the uplink buffer as opposed to sending the data immediately to the cable modem (e.g., store data in the uplink buffer after receiving a do not send data message is received from the cable modem).

The storage component 714 is configured to manage the storage, and retrieval of data and/or instructions to/and from memory, buffers in memory, hardware buffers and/or storage device coupled and/or connected to the wireless base station.

The uplink buffer component 716 is configured to handle uplink buffer creation and modification, e.g., increase and decrease in buffer size, management, storage and retrieval of data to the uplink buffer, flushing and/or transmittal of data from the uplink buffer to the cable modem, provide notifications when thresholds have been exceeded with respect to buffer storage, provide notifications when the uplink buffer is full, determine the uplink buffer size, increase uplink buffer size, determine uplink buffer fill rate, determine amount of time it takes for the uplink buffer to become full, respond to queries and/or requests from the cable modem to provide uplink buffer information, provide confirmation that cable modem instructions have been carried out, such as for example increasing a buffer size, performing operations to implement instructions received from a cable modem. In some embodiments, uplink buffer component 716 is a sub-component of buffer management component 710 or storage component 714.

The downlink buffer component 718 is configured to handle downlink buffer creation and modification, e.g., increase and decrease in buffer size, management, storage and retrieval of data to the downlink buffer, increase downlink buffer size, flushing and/or transmittal of data from the downlink buffer to the user equipment devices, provide notifications when thresholds have been exceeded with respect to buffer storage, provide notifications when the downlink buffer is full, determine the downlink buffer size, determine downlink buffer fill rate, determine amount of time it takes for the downlink buffer to become full, respond to queries and/or requests from the cable modem to provide downlink buffer information, provide confirmation that cable modem instructions have been carried out, such as for example, increasing a buffer size, performing operations to implement instructions received from a cable modem. In some embodiments, downlink buffer component 718 is a sub-component of buffer management component 710 or storage component 714.

Figure 8:
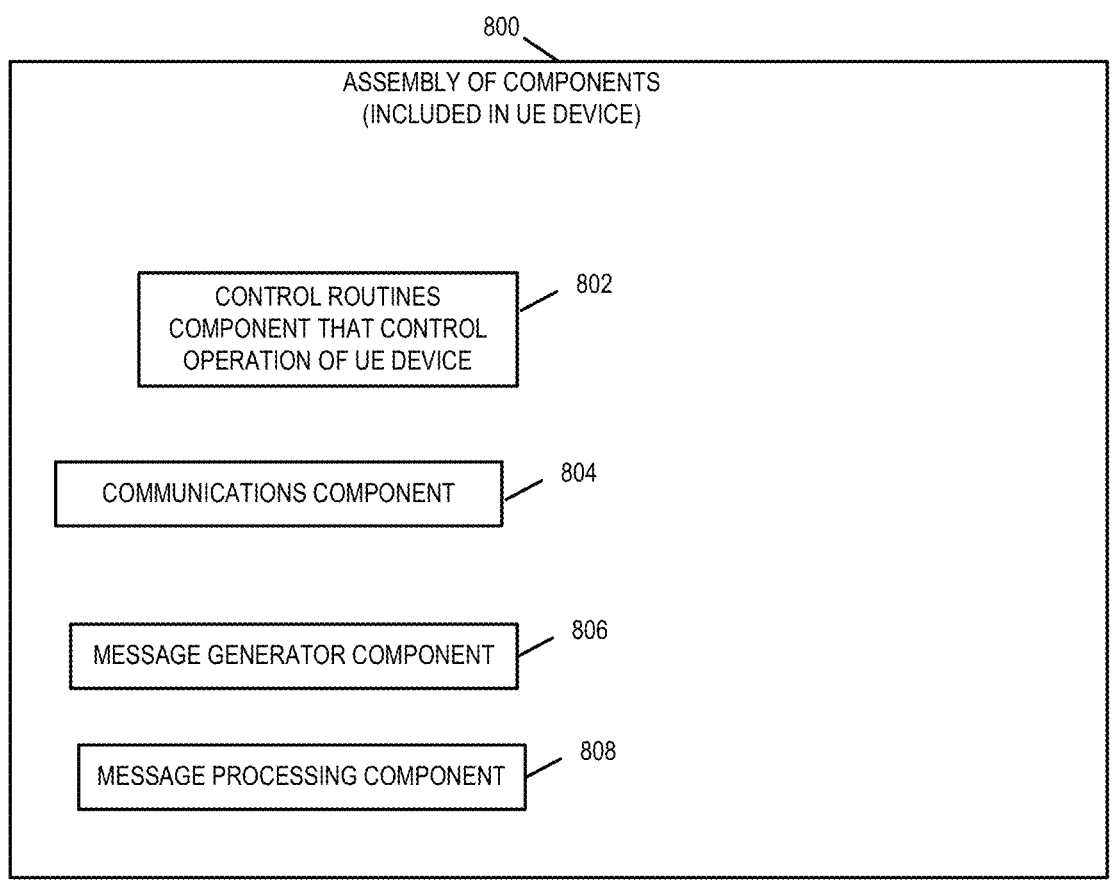
FIG. 8 illustrates an exemplary assembly of components for a user equipment device in accordance with an embodiment of the present invention.

FIG. 8 is a drawing of an exemplary assembly of components 800 which may be included in an exemplary user equipment (UE) device, e.g., UE device 500 of FIG. 5, in accordance with an exemplary embodiment. The components in the assembly of components 800 can, and in some embodiments are, implemented fully in hardware within a processor, e.g., processor 506, e.g., as individual circuits. The components in the assembly of components 800 can, and in some embodiments are, implemented fully in hardware within the assembly of hardware components 508, e.g., as individual circuits corresponding to the different components. In other embodiments some of the components are implemented, e.g., as circuits, within processor 506 with other components being implemented, e.g., as circuits within assembly of components 508, external to and coupled to the processor 506. As should be appreciated the level of integration of components on the processor and/or with some components being external to the processor may be one of design choice. Alternatively, rather than being implemented as circuits, all or some of the components may be implemented in software and stored in the memory 512 of the UE device 500, with the components controlling operation of UE device 500 to implement the functions corresponding to the components when the components are executed by a processor e.g., processor 506. In some such embodiments, the assembly of components 800 is included in the memory 512 as assembly of software components 514. In still other embodiments, various components in assembly of components 800 are implemented as a combination of hardware and software, e.g., with another circuit external to the processor providing input to the processor which then under software control operates to perform a portion of a component's function. When implemented in software the components include code, which when executed by a processor, e.g., processor 506, configure the processor to implement the function corresponding to the component. In embodiments where the assembly of components 800 is stored in the memory 512, the memory 512 is a computer program product comprising a computer readable medium comprising code, e.g., individual code for each component, for causing at least one computer, e.g., processor 506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the UE device 500 or elements therein such as the processor 506, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method.

Assembly of components 800 includes a control routines component 802, a communications component 804, a message generator component 806, a message processing component 808.

The control routines component 802 is configured to control operation of the UE. The communication component 804 is configured to handle communications, e.g., receipt and transmission of signals and provide protocol signal processing for one or protocols for the UE. The message generator component 806 is configured to generate messages for transmission to the wireless base stations (e.g., CBSD devices) such as messages including user data and/or user data requests, control messages, etc. In some embodiments, the message generator component 806 is a sub-component of the communications component 804. The message processing component 808 processes received messages, e.g., requests for information. In some embodiments, the message processing component is a sub-component of the communications component 808.

Figure 9:
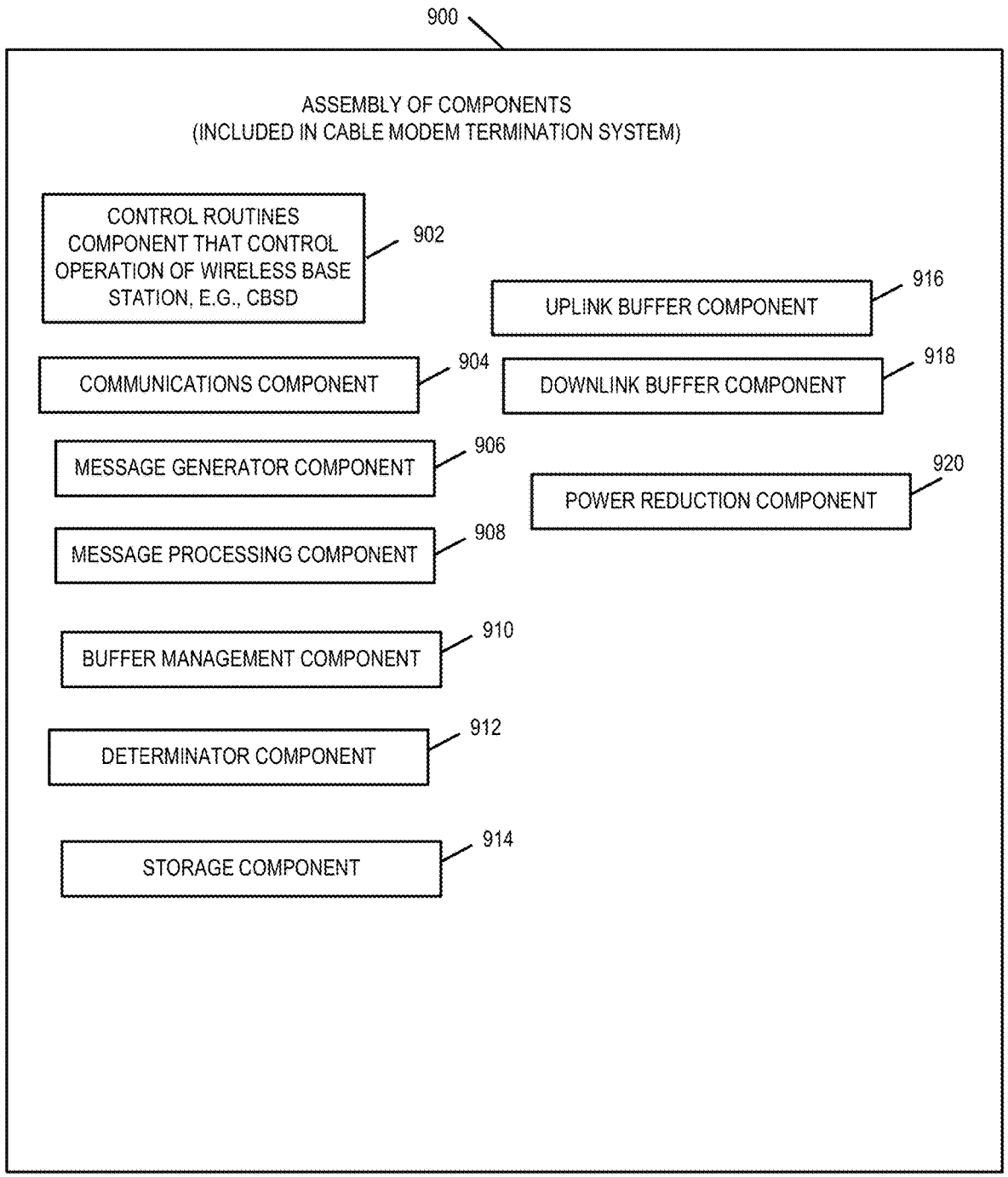
FIG. 9 illustrates an exemplary assembly of components for a cable modem termination system in accordance with an embodiment of the present invention.

FIG. 9 is a drawing of an exemplary assembly of components 900 which may be included in a cable modem termination system, e.g., cable modem termination system 600 of FIG. 6, in accordance with an exemplary embodiment. The components in the assembly of components 900 can, and in some embodiments are, implemented fully in hardware within a processor or one or more processors, e.g., processor(s) 606, e.g., as individual circuits. The components in the assembly of components 900 can, and in some embodiments are, implemented fully in hardware within the assembly of hardware components 608, e.g., as individual circuits corresponding to the different components. In other embodiments some of the components are implemented, e.g., as circuits, within processor(s) 606 with other components being implemented, e.g., as circuits within assembly of components 608, external to and coupled to the processor(s) 606. As should be appreciated the level of integration of components on the processor and/or with some components being external to the processor may be one of design choice. Alternatively, rather than being implemented as circuits, all or some of the components may be implemented in software and stored in the memory 612 of the cable modem termination system 600, with the components controlling operation of the cable modem termination system 600 to implement the functions corresponding to the components when the components are executed by a processor e.g., processor 606. In some such embodiments, the assembly of components 900 is included in the memory 612 as assembly of software components 614. In still other embodiments, various components in assembly of components 900 are implemented as a combination of hardware and software, e.g., with another circuit external to the processor providing input to the processor which then under software control operates to perform a portion of a component's function.

When implemented in software the components include code, which when executed by a processor or one or more processors, e.g., processor(s) 606, configure the processor(s) to implement the function corresponding to the component. In embodiments where the assembly of components 900 is stored in the memory 612, the memory 612 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the cable modem termination system 600 or elements therein such as the processor(s) 606, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method.

Assembly of components 900 includes a control routines component 902, a communications component 904, a message generator component 906, a message processing component 908, a buffer management component 910, a determinator component 912, a storage component 914, an uplink buffer component 916, a downlink buffer component 918, and a power reduction component 920.

The control routines component 902 is configured to control operation of the cable modem termination system. The communication component 904 is configured to handle communications, e.g., transmission and reception of messages, and protocol signaling for the cable modem termination system. The message generator component 906 is configured to generate messages for transmission to other devices. The message processing component 908 is configured to process messages received from other devices, e.g., messages from cable modems, messages from core network, and messages from CMTS power management devices.

The buffer management component 910 is configured to implement all aspects related to buffer management including creation and management of uplink data buffer(s) for storing data from cable modem devices to be transmitted to the core network devices, creation of downlink buffer(s) for storing data received from devices, e.g., core network devices for transmission to the cable modem, providing cable modem termination system buffer information to cable modems including uplink and downlink buffer size and fill rates, uplink and downlink buffer sizes in terms of time to receive and store data to fully occupy the uplink buffer and the downlink buffer corresponding to a particular cable modem.

The determinator component 912 is configured to make determinations and decisions for the cable modem including for example: buffer size as an amount of time for the buffer to become full, buffer size as number of bytes of storage capacity, buffer fill rate, and when to send data to the cable modem and when not to send data to the cable modem, e.g., send data after receiving a send data message and do not send data after receiving a do not send data message, when to store data received from other devices for a cable in the downlink buffer for the cable modem as opposed to sending the data immediately to the cable modem (e.g., store data in the downlink buffer after receiving a do not send data message is received from the cable modem).

The storage component 914 is configured to manage the storage, and retrieval of data and/or instructions to/and from memory, buffers in memory, hardware buffers and/or storage device coupled and/or connected to the wireless base station.

The uplink buffer component 916 is configured to handle uplink buffer creation and modification, e.g., increases and decreases in buffer size, management, storage and retrieval of data to the uplink buffer, flushing and/or transmittal of data from the uplink buffer to the other devices, e.g., devices in the core network, provide notifications when thresholds have been exceeded with respect to buffer storage, provide notifications when the uplink buffer is full, determine the uplink buffer size, increase uplink buffer size, determine uplink buffer fill rate, determine amount of time it takes for the uplink buffer to become full, respond to queries and/or requests from the cable modem to provide uplink buffer information, implement instructions from the cable modem, e.g., to increase the buffer size, provide confirmations that instructions received regarding changes to the buffer have been implemented. In some embodiments, uplink buffer component 916 is a sub-component of buffer management component 910 or storage component 914.

The downlink buffer component 918 is configured to handle downlink buffer creation and modification, e.g., increases and/or decreases to buffer size, management, storage and retrieval of data to the downlink buffer, flushing and/or transmittal of data from the downlink buffer to the cable modem, provide notifications when thresholds have been exceeded with respect to buffer storage, provide notifications when the downlink buffer is full, determine the downlink buffer size, determine downlink buffer fill rate, increase downlink buffer size, determine amount of time it takes for the downlink buffer to become full, respond to queries and/or requests from the cable modem to provide downlink buffer information, determine when the downlink buffer should not send data to the cable modem but should instead store the data (e.g., after receiving a do not send data message), determine when to send data/flush the downlink buffer to the cable modem (e.g., after receiving a send data message), implement instructions to modify the downlink buffer, e.g., implement instructions to increase the buffer size received from a cable modem, provide confirmations to devices that provided instructions to make modifications to the buffer that the instructions have been implemented. In some embodiments, downlink buffer component 718 is a sub-component of buffer management component 910 or storage component 914.

The power reduction component 920 monitors for a power reduction messages from a CMTS power management device instructing the CMTS to reduce power consumption and in response to the detection of receipt of a reduce power consumption message generates and sends reduce power consumption messages to one or more cable modems coupled to the CMTS.

Figure 11:
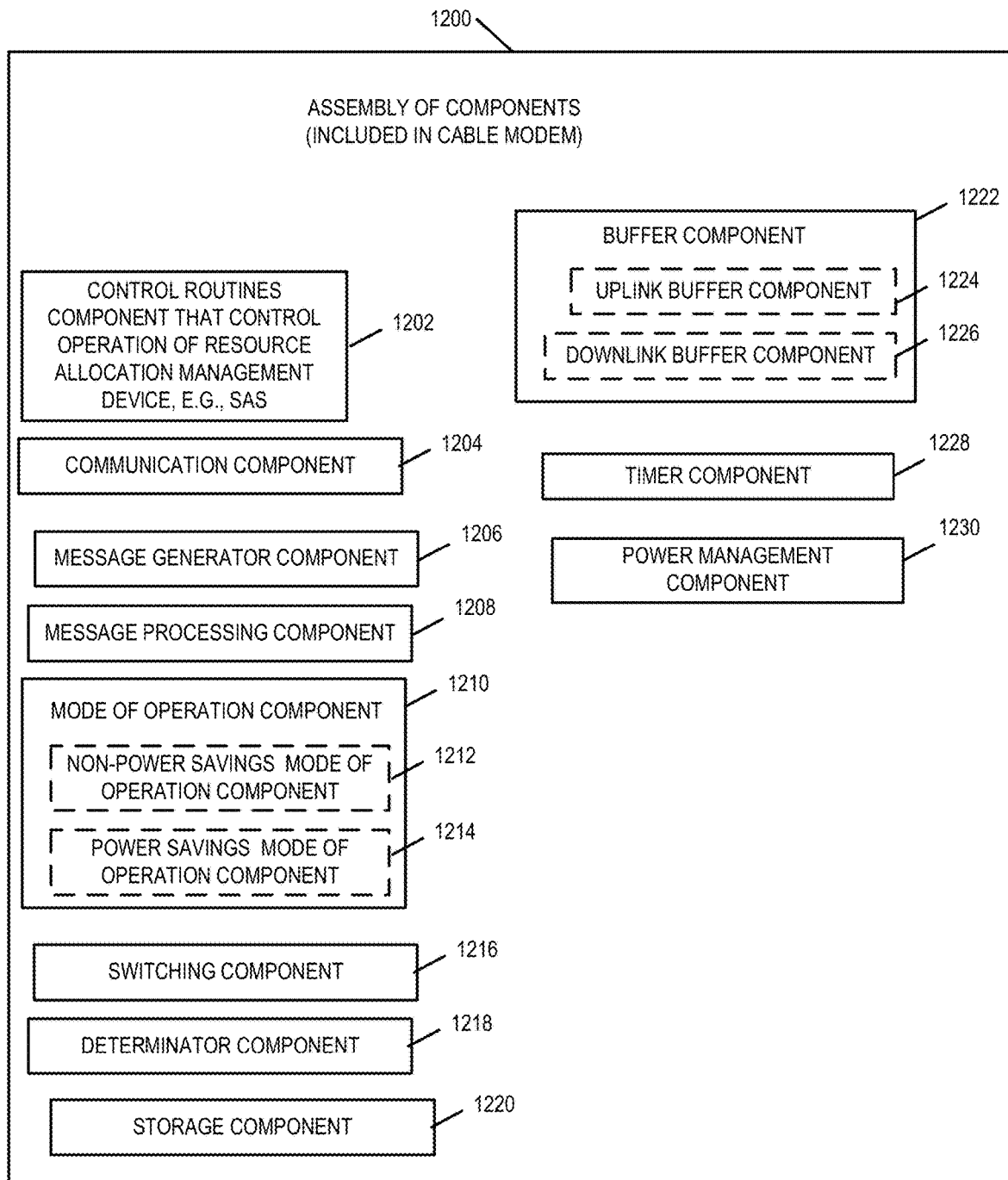
FIG. 11 illustrates details of an exemplary assembly of components for a cable modem in accordance with an embodiment of the present invention.

FIG. 11 is a drawing of an exemplary assembly of components 1200 which may be included in an exemplary cable modem (e.g., exemplary cable modem 200 of FIG. 2), in accordance with an exemplary embodiment. The components in the assembly of components 200 can, and in some embodiments are, implemented fully in hardware within a processor, e.g., processor 206, e.g., as individual circuits. The components in the assembly of components 200 can, and in some embodiments are, implemented fully in hardware within the assembly of hardware components 208, e.g., as individual circuits corresponding to the different components. In other embodiments some of the components are implemented, e.g., as circuits, within processor 206 with other components being implemented, e.g., as circuits within assembly of components 208, external to and coupled to the processor 206. As should be appreciated the level of integration of components on the processor and/or with some components being external to the processor may be one of design choice. Alternatively, rather than being implemented as circuits, all or some of the components may be implemented in software and stored in the memory 212 of the cable modem 200, with the components controlling operation of cable modem 200 to implement the functions corresponding to the components when the components are executed by a processor e.g., processor 206. In some such embodiments, the assembly of components 1200 is included in the memory 212 as assembly of software components 214. In still other embodiments, various components in assembly of components 1200 are implemented as a combination of hardware and software, e.g., with another circuit external to the processor providing input to the processor which then under software control operates to perform a portion of a component's function.

When implemented in software the components include code, which when executed by a processor, e.g., processor 206, configure the processor to implement the function corresponding to the component. In embodiments where the assembly of components 200 is stored in the memory 212, the memory 212 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 2 control and/or configure the cable modem 200 or elements therein such as the processor 206, to perform the functions of corresponding steps illustrated and/or described in the method of one or more of the flowcharts, signaling diagrams and/or described with respect to any of the Figures. Thus the assembly of components 1200 includes various components that perform functions of corresponding one or more described and/or illustrated steps of an exemplary method.

Assembly of components 1200 includes a control routines component 1202, a communications component 1204, a message generator component 1206, a message processing component 1208, a mode of operation component 1210, a switching component 1216, a determinator component 1218, a storage component 1220, a buffer component 1222, a timer component 1228, and a power management component 1230. In some embodiments, the mode of operation component 1210 includes one or more of the following sub-components: a non-power savings mode of operation component 1212 and a power savings mode of operation component 1214. In some embodiments, the buffer component 1222 includes one or more of the following sub-components: an uplink buffer component 1224 and a downlink buffer component 1226.

The control routines component 1202 is configured to control operation of the cable modem. The communication component 1104 is configured to handle communications, e.g., transmission and reception of messages, data packets, and protocol signaling for the cable modem. The message generator component 1206 is configured to generate messages for transmission to other devices such as for example messages indicating that data is not to be sent to the cable modem, messages indicating that data is to be sent to the data modem, messages including data packets for uplink transmission to a CMTS and messages including data packets for downlink transmission to a wireless base station, messages requesting buffer information, e.g., CMTS buffer information and wireless base station buffer information. The message processing component 1208 is configured to process messages received from other devices, e.g., messages such as messages including buffer information and/or data packets from a wireless base station, messages including buffer information and/or data packets from a cable modem termination system.

The mode of operation component 1210 is configured to control the cable mode to perform operations and steps of the methods disclosed herein while operating in the power savings mode of operation and the non-power savings mode of operation. In some embodiments, the mode of operation component 1210 is also makes determinations as to when the cable modem is to enter or exit either the power savings mode of operation or the non-power savings mode of operation. In some embodiments, the mode of operation component 1210 controls the cable modem to switch from the power savings mode of operation to the non-power savings mode of operation. In some embodiments, the mode of operation component 1210 controls the cable modem to switch from the non-power savings mode of operation to the power savings mode of operation.

In some embodiments, the mode of operation component includes a non-power savings mode of operation sub-component 1212. The non-power savings mode of operation sub-component 1212 is configured to control the cable modem to perform one or more of the various method steps described herein and/or attributed to the cable modem while it is operating in the non-power savings mode of operation including for example turning on transmitter(s) and receiver(s) which were turned off turning the power savings mode of operation, notifying the wireless base station and cable modem termination system that data should be sent to the cable modem via controlling the cable modem to transmit "Send data messages" to the cable modem termination system and the wireless base station, storing data which is received from the wireless base station in the uplink data buffer until a determination is made to send the data to CMTS (e.g., when the uplink and downlink buffer have reached a fullness threshold), storing data which is received from the CMTS in a downlink buffer until a determination is made to send the data to the wireless base station.

In some embodiments, the mode of operation component includes a power savings mode of operation sub-component 1214. The power savings mode of operation sub-component 1214 is configured to control the cable modem to perform one or more of the various method steps described herein and/or attributed to the cable modem while it is operating in the power savings mode of operation including for example, sending do The switching component 1216 is configured to control the cable modem to: (i) switch from a first mode of operation to a second mode of operation, and (ii) switch from a second mode of operation to a first mode of operation. The first mode of operation may be and typically is a non-power savings mode of operation and the second mode of operation is typically a power savings mode of operation. In some embodiments, the switching component is also configured to make the determination of when the cable modem is to switch: (i) from the first mode of operation to the second mode of operation, and (ii) from the second mode of operation to the first mode of operation. In some embodiments, the switching component 1216 is a sub-component of the mode of operation component 1214.

The determinator component 1218 is configured to make determinations and decisions for the cable modem including for example: whether an amount of data in a buffer has reached or exceeded a threshold, whether the cable modem is to switch from one mode of operation to another mode of operation, whether the cable modem is to store data in its uplink or downlink buffer or transmit the uplink and downlink data, whether the cable modem is to transmit it data or continue to wait until at least one of the following occurs: (i) the amount of data in the cable modem uplink buffer reaches a first threshold value, or (ii) the amount of data in the cable modem downlink buffer reaches a second threshold value to transmit the data in uplink or downlink before transmitting data, when to store data received from wireless base station in the uplink buffer as opposed to sending the data to the CMTS; when to transmit data, when to send a message indicating data is not to be sent to the cable modem by the wireless base station, when to send a message indicating data is not to be sent to the cable modem by the cable modem termination system, when to send a message indicating data is to be sent to the cable modem from the wireless base station, when to send a message indicating data is to be sent to the cable modem from the CMTS, when to start a power savings timer, when to enter power savings mode of operation, when to enter non-power savings mode of operation, when to turn off the cable modem transmitter(s), receiver(s), and/or transceiver(s), when to turn on the cable modem transmitter(s), receiver(s), and/or transceiver(s), when to flush the uplink and downlink cable modem buffers transmitting the data in a burst to the CMTS and the wireless base station, the expiration of the first period of time, the size to create the cable modem uplink buffer, the size to create the cable modem downlink buffer.

The storage component 1220 is configured to manage the storage, and retrieval of data and/or instructions to/and from memory, buffers in memory, hardware buffers and/or storage devices coupled and/or connected to the cable modem.

The buffer t component 1222 is configured to control the cable modem to implement all aspects related to buffer management including creation and management of an uplink data buffer for storing data from wireless base station to be transmitted to the cable modem termination system, creation of downlink buffer for storing data received from the cable modem termination system, receiving wireless base station buffer information including uplink and downlink buffer size and fill rates, uplink and downlink buffer sizes in terms of time to receive and store data to fully occupy the uplink buffer and the downlink buffer of the wireless base station, receiving cable modem termination system buffer information including uplink and downlink buffer size and fill rates, uplink and downlink buffer sizes in terms of time to receive and store data to fully occupy the uplink buffer and the downlink buffer of the cable modem termination system, determination of cable modem uplink and downlink buffer sizes, determination of when the amount of data stored in the cable modem uplink buffer has reached a first threshold, determination of when the amount of data stored in the cable modem downlink buffer has reached a second threshold, determination of when the cable modem uplink buffer data is to be transmitted to the cable modem termination system, determination of when the cable modem downlink buffer data is transmitted to the wireless base station, determination of when the uplink data is to be stored in the uplink buffer, determination of when the downlink data is to be stored in the downlink buffer. In some embodiments, the buffer component 1222 is a sub-component of the storage component 1220.

In some embodiments the buffer component 1222 includes uplink buffer component 1224. The uplink buffer component 1224 is a sub-component of the buffer component 1222 and is configured to perform operations relating to the uplink buffer including uplink buffer creation and modification, e.g., increase and decrease in buffer size, management, storage and retrieval of data to the uplink buffer, flushing and/or transmittal of data from the uplink buffer to the cable modem termination system, providing notifications when thresholds have been met or exceeded with respect to buffer storage, providing notifications when the uplink buffer is full, determine the uplink buffer size, determine uplink buffer fill rate, determine amount of time it takes for the uplink buffer to become full. In some embodiments, uplink buffer component 1224 is not a sub-component of buffer component 1222 but is a separate component. In some embodiments, the uplink buffer component 1224 is a sub-component of the storage component 1220.

In some embodiments the buffer component 1222 includes downlink buffer component 1226. The downlink buffer component 1226 is a sub-component of the buffer component 1222 and is configured to perform operations relating to the downlink buffer including downlink buffer creation and modification, e.g., increase and decrease in buffer size, management, storage and retrieval of data to the downlink buffer, flushing and/or transmittal of data from the downlink buffer to the wireless base station, providing notifications when thresholds have been met or exceeded with respect to buffer storage, providing notifications when the downlink buffer is full, determine the downlink buffer size, determine downlink buffer fill rate, determine amount of time it takes for the downlink buffer to become full. In some embodiments, downlink buffer component 1226 is not a sub-component of buffer component 1222 but is a separate component. In some embodiments, the downlink buffer component 1226 is a sub-component of the storage component 1220.

The timer component is configured to implement the power savings timer operations of the cable modem as well as setting of the power savings timer, causing the cable modem to switch modes of operation at the expiration or passage of the first period of time. In some embodiments, the timer components is a sub-component of the mode of operation component 1210 or the switching component 1216.

The power component 1228 is configured to receive and power supply and to control the management of the power usage by the cable modem including for example which elements, circuits, components, transceivers, receivers and transmitters are powered on and when (e.g., cable modem transmitters and receivers are powered on during non-power savings mode of operation) and powered off and when (e.g., turning off the cable modem transmitter(s) and receiver(s) after entering power savings mode of operation). The power component 1228 is also configured to receive power from the cable modem termination system, e.g., via Power over Ethernet. The power component 1228 is also configured to provide and/or supply power to the wireless base station, e.g., via Power over Ethernet, and to ensure that power to the wireless base station is not interrupted while the cable modem is in power savings mode of operation that is the cable modem.

Figure 10A:
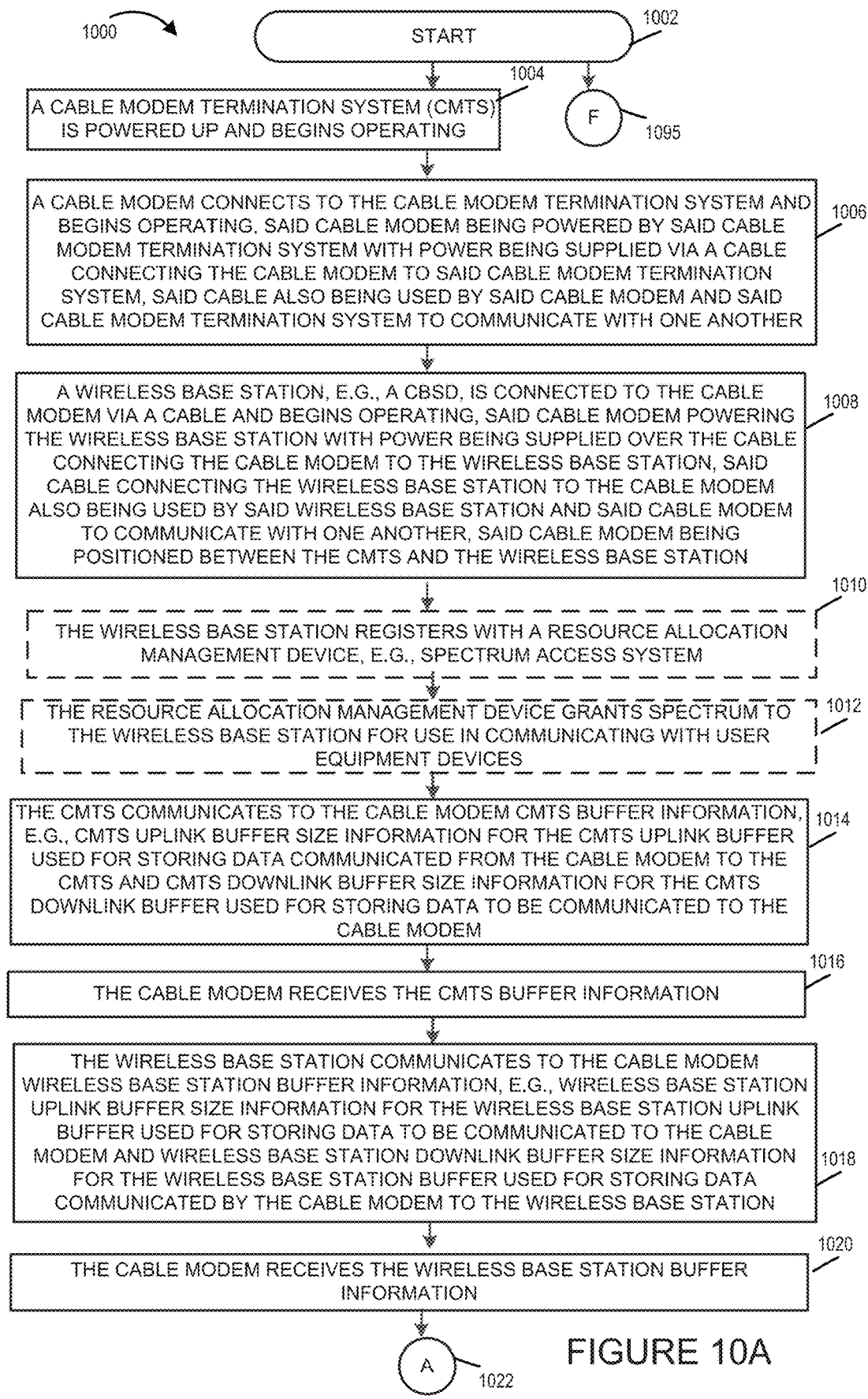
FIG. 10A illustrates the steps of the first part of an exemplary method in accordance with one embodiment of the present invention.
Figure 10B:
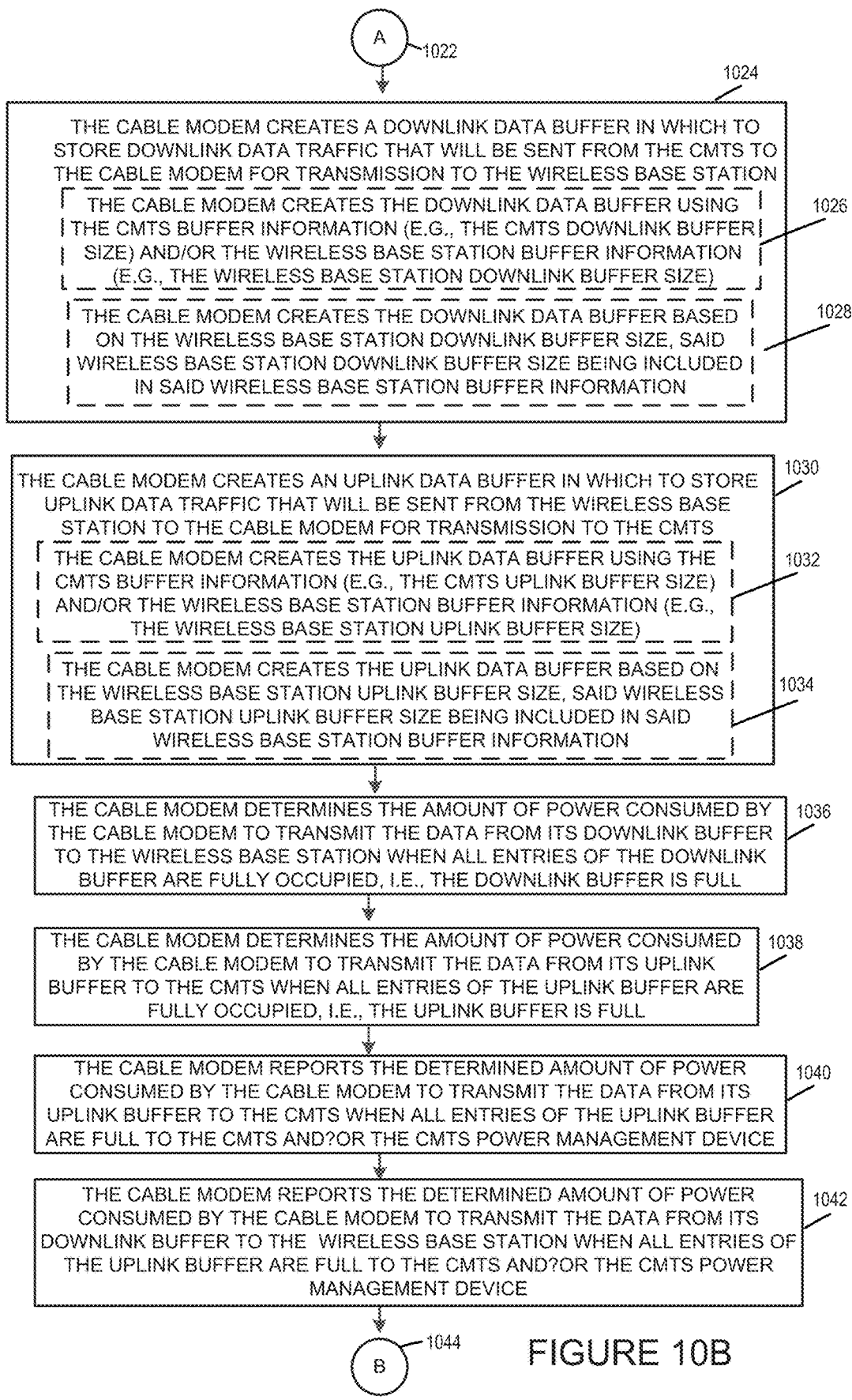
FIG. 10B illustrates the steps of the second part of an exemplary method in accordance with one embodiment of the present invention.
Figure 10C:
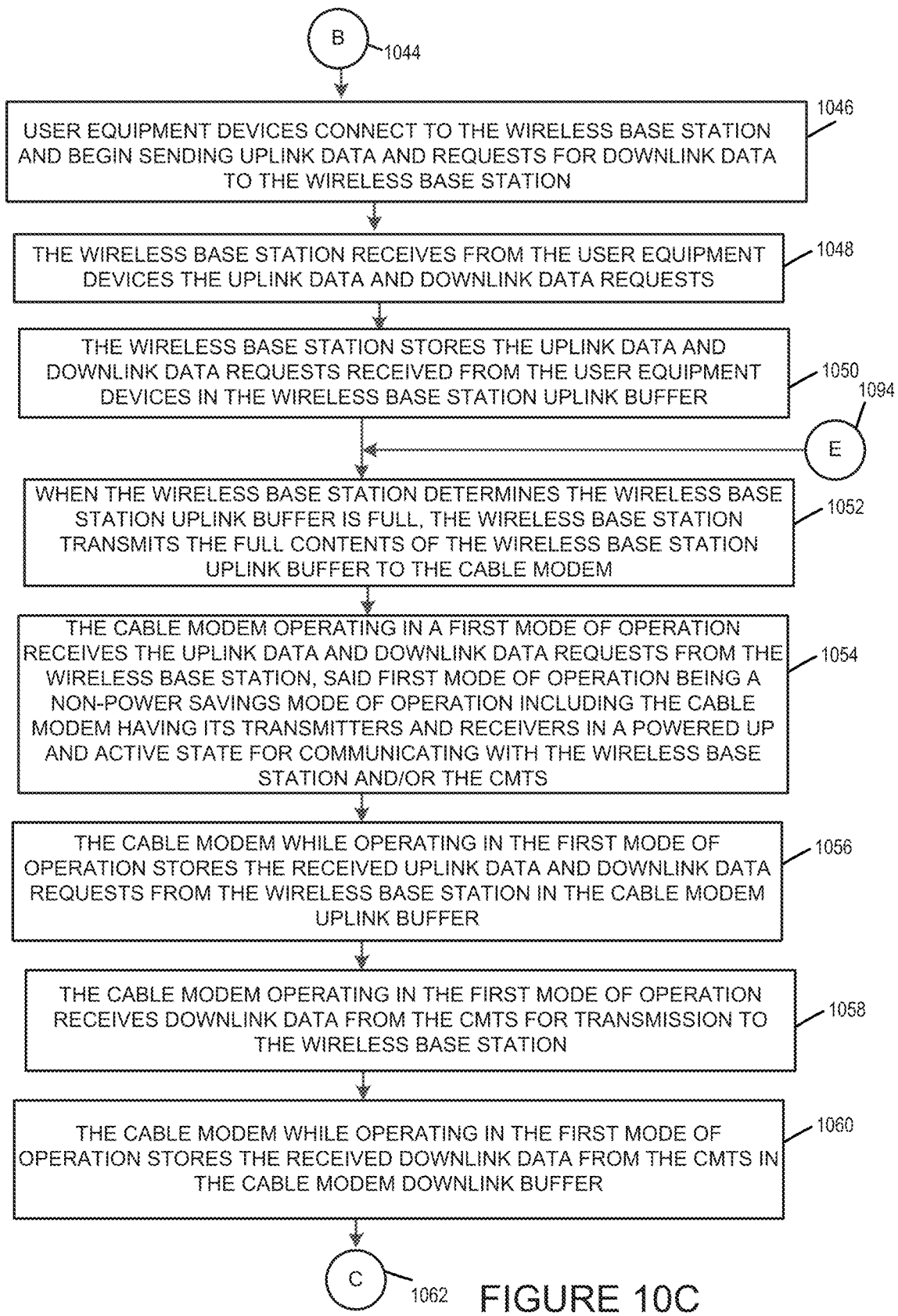
FIG. 10C illustrates the steps of the third part of an exemplary method in accordance with one embodiment of the present
Figure 10D:
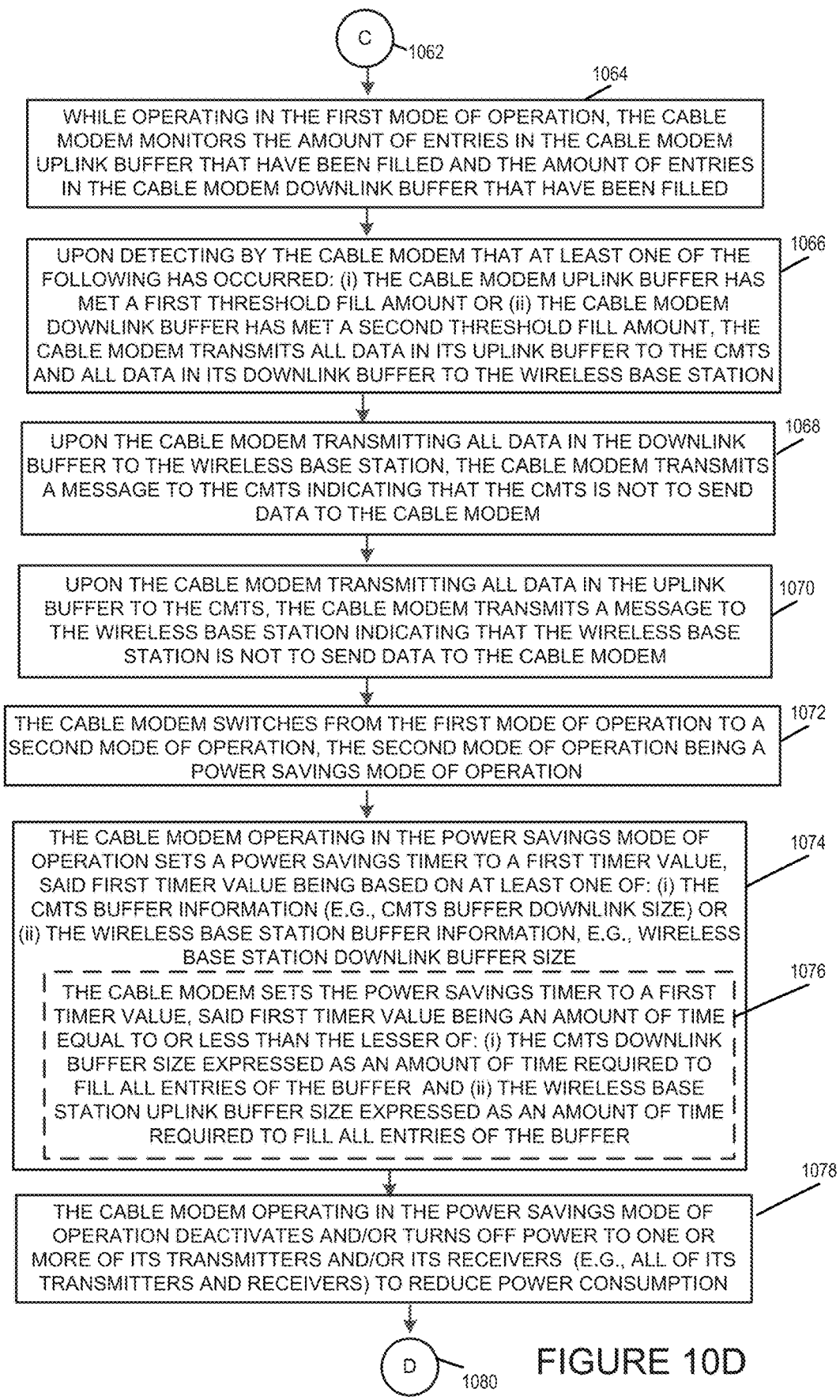
FIG. 10D illustrates the steps of the fourth part of an exemplary method in accordance with one embodiment of the present invention.
Figure 10E:
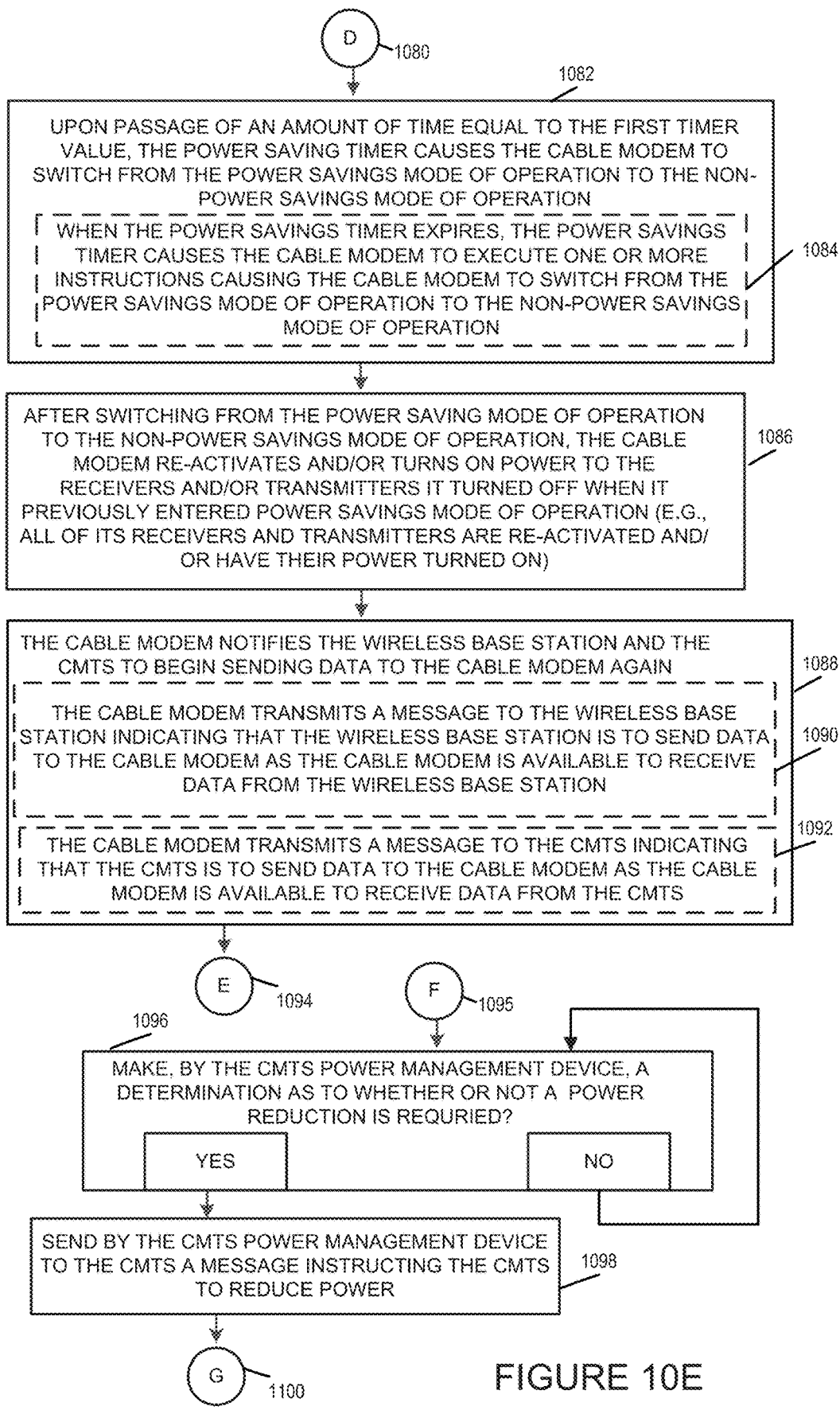
FIG. 10E illustrates the steps of the fifth part of an exemplary method in accordance with one embodiment of the present invention.
Figures 10, 10F:
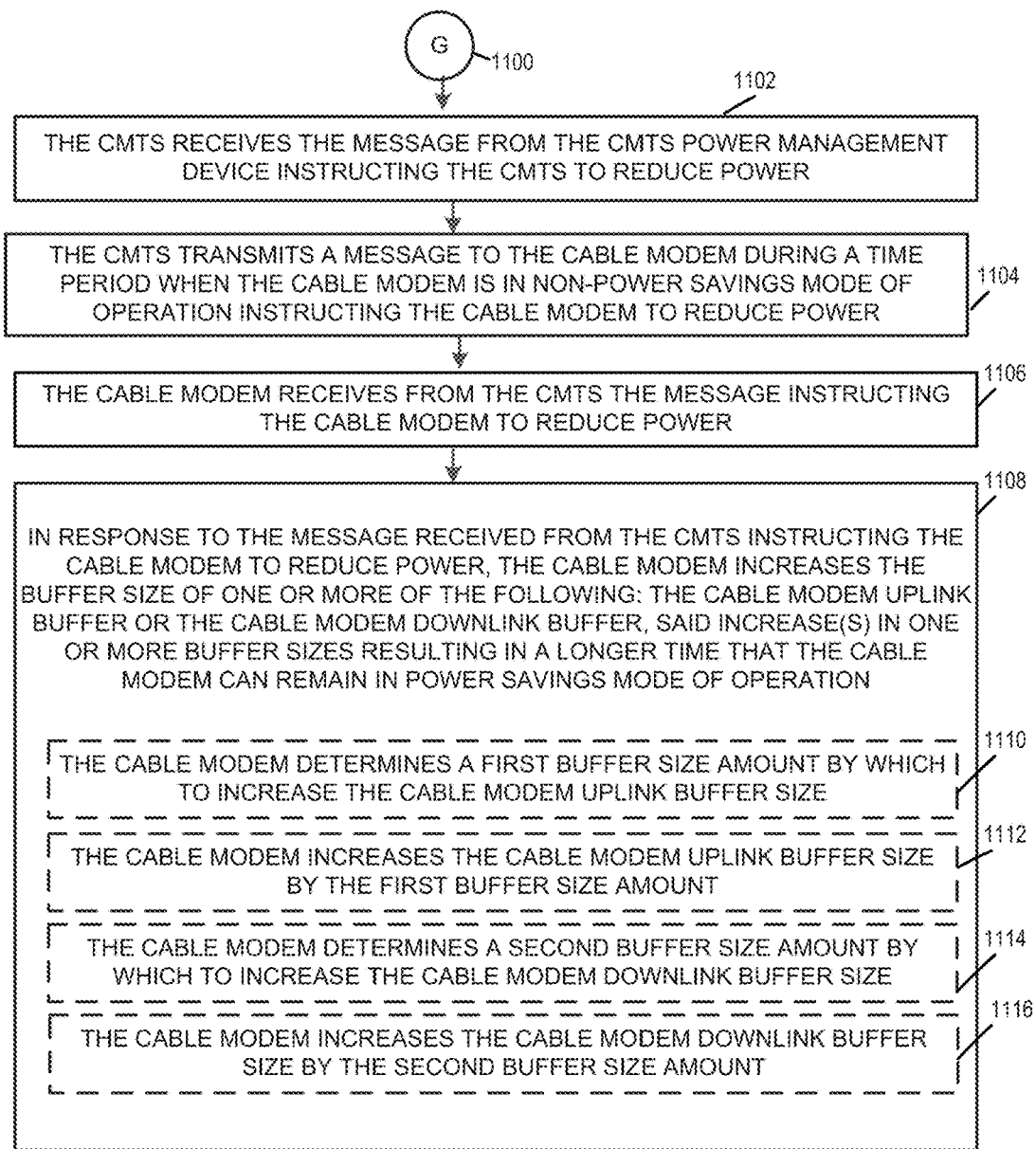
FIG. 10 illustrates the combination of FIGS. 10A, 10B, 10C, 10D, 10E, 10F, 10G, 10H, 10I, and 10J.
FIG. 10F illustrates the steps of the sixth part of an exemplary method in accordance with one embodiment of the present invention.
Figure 10G:
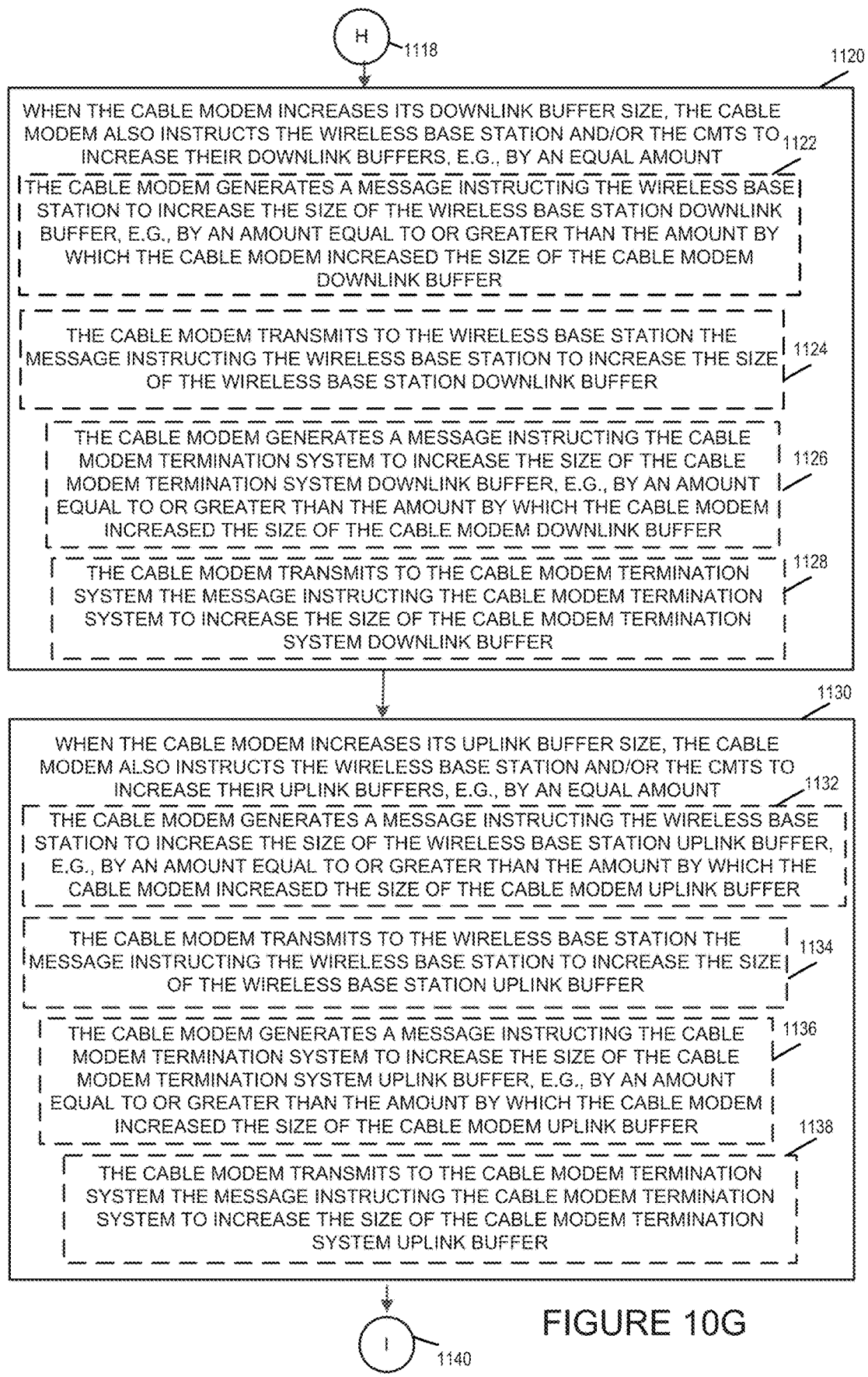
FIG. 10G illustrates the steps of the seventh part of an exemplary method in accordance with one embodiment of the present invention.
Figure 10H:
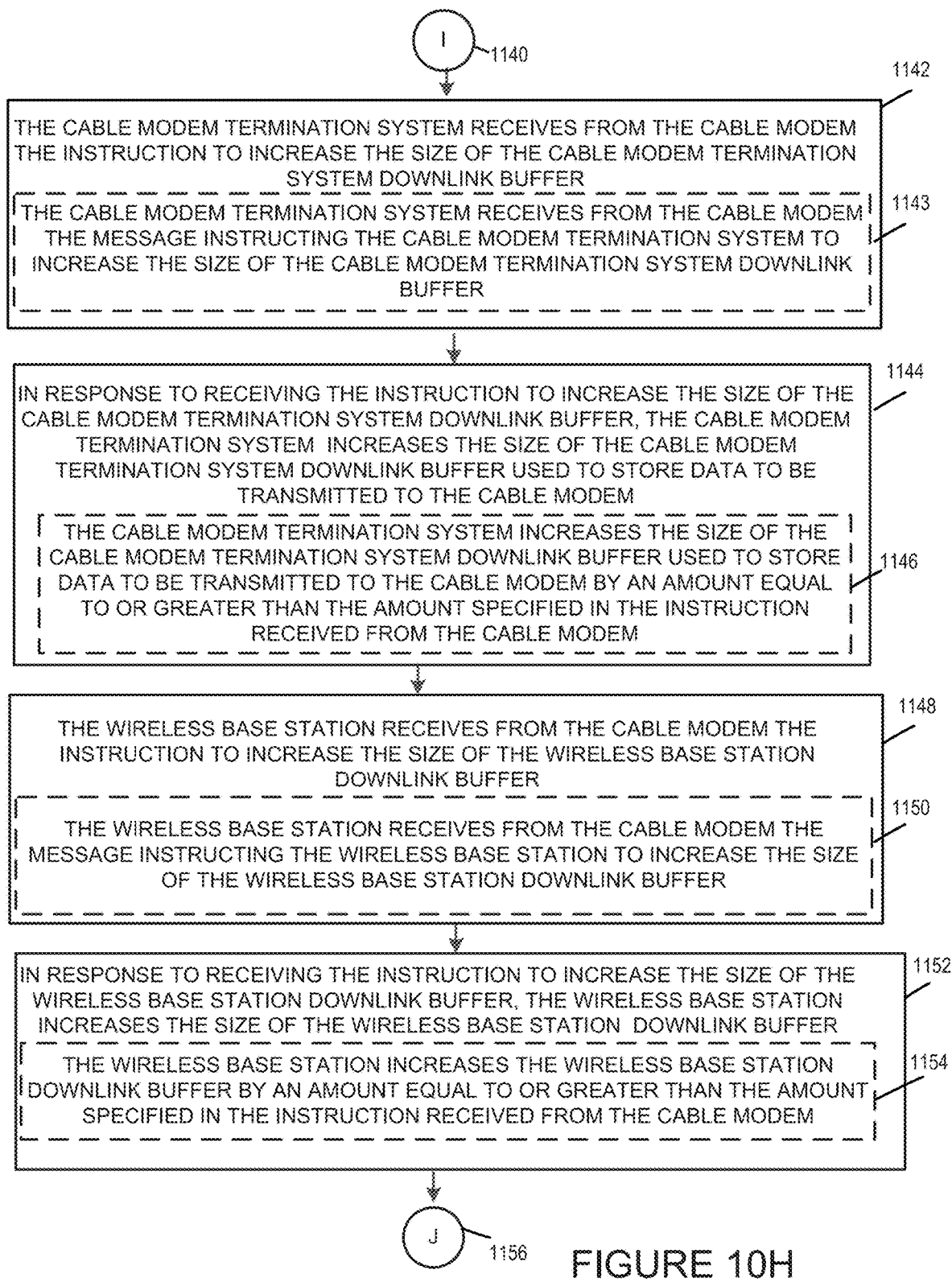
FIG. 10H illustrates the steps of the eighth part of an exemplary method in accordance with one embodiment of the present invention.
Figure 10I:
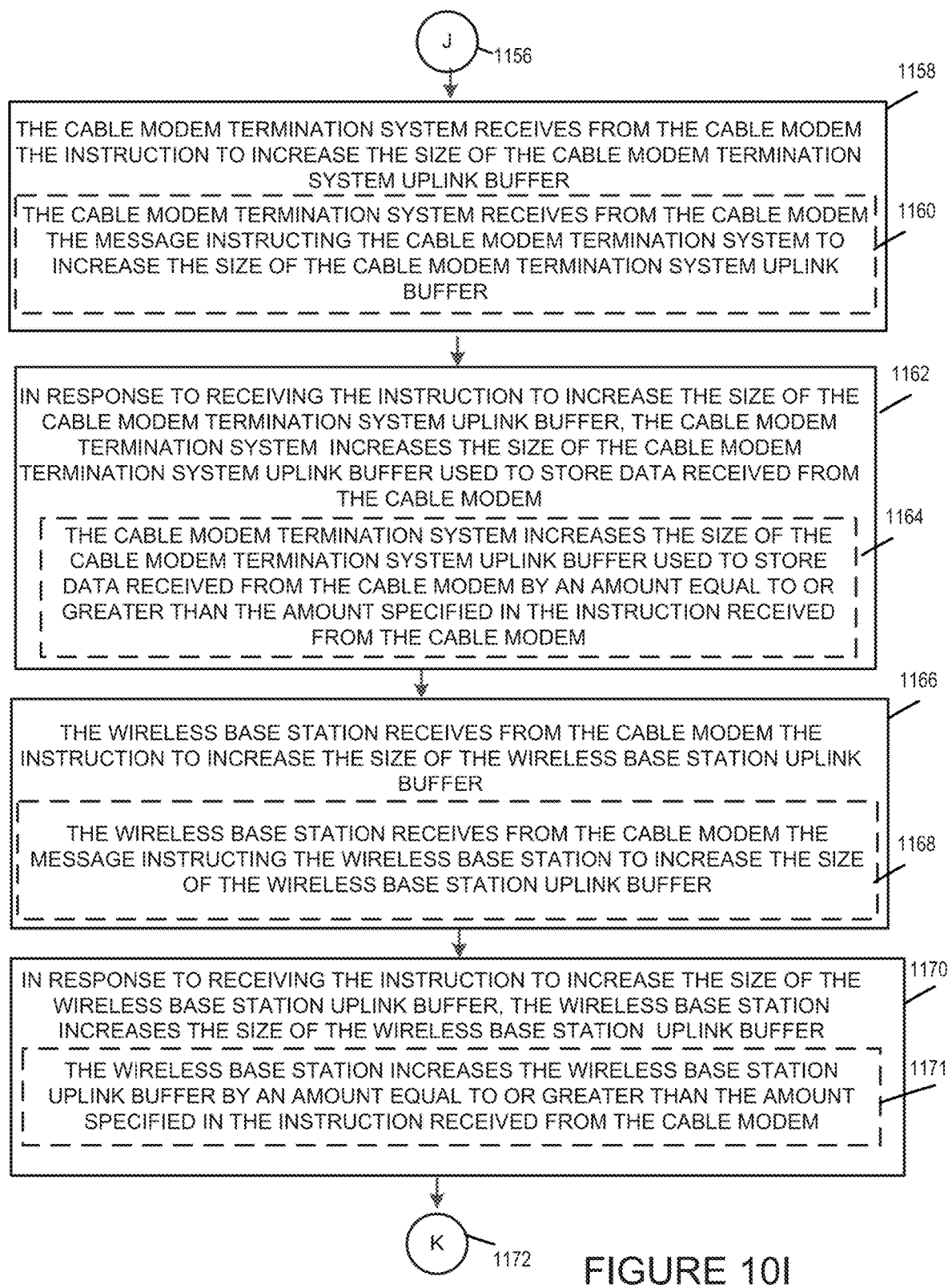
FIG. 10I illustrates the steps of the ninth part of an exemplary method in accordance with one embodiment of the present invention.
Figure 10J:
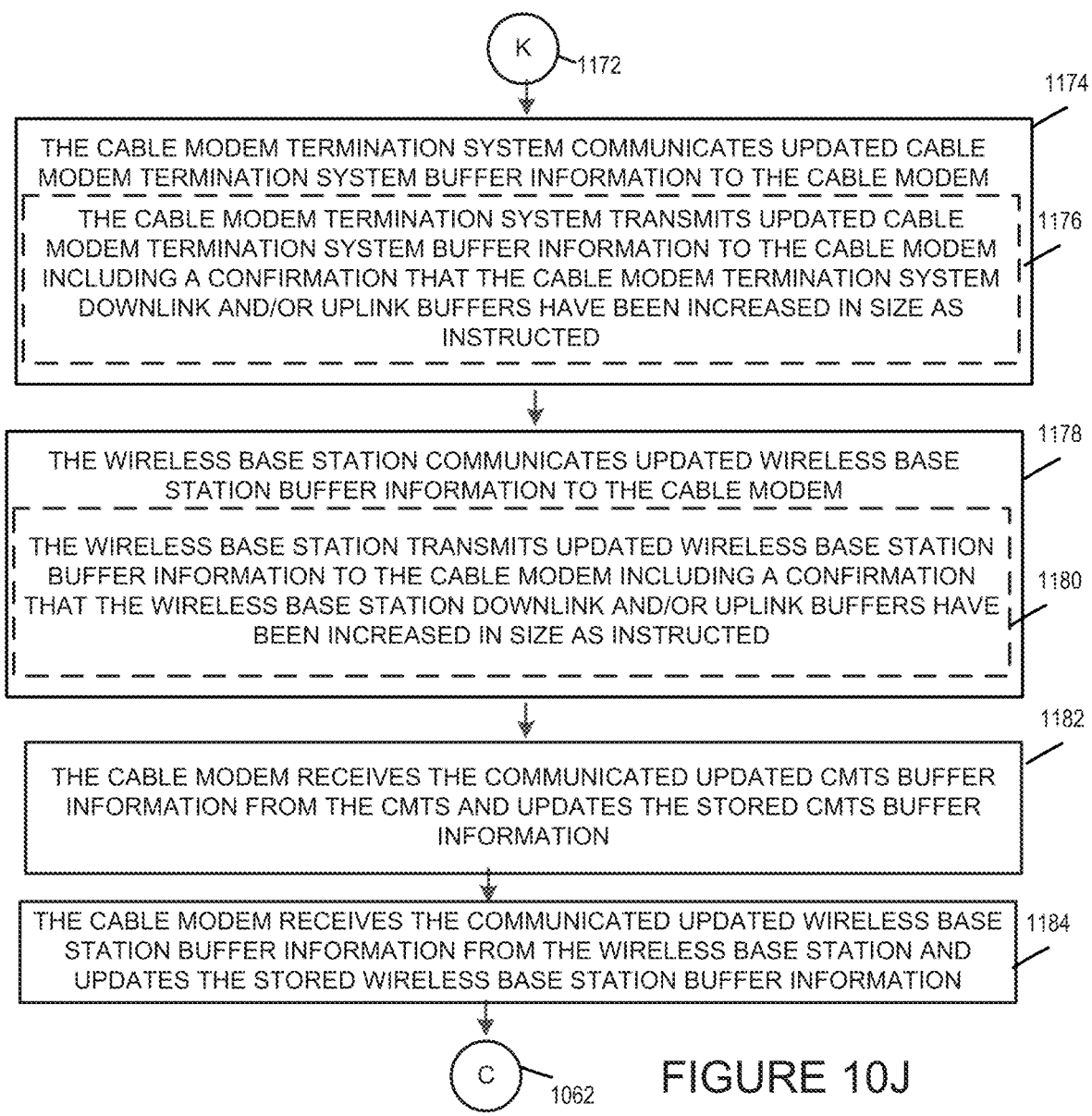
FIG. 10J illustrates the steps of the tenth part of an exemplary method in accordance with one embodiment of the present invention.

FIG. 10 which illustrates the steps of a flowchart of a method 1000 which illustrates another exemplary method embodiment for dynamically managing power usage by a cable modem. FIG. 10 shows the combination of FIGS. 10A, 10B, 10C, 10D, 10E, 10F, 10G, 10H, 10I, and 10J. FIG. 10A illustrates the steps of the first part of the exemplary method 1000 in accordance with one embodiment of the present invention. FIG. 10B illustrates the steps of the second part of the exemplary method 1000 in accordance with one embodiment of the present invention. FIG. 10C illustrates the steps of the third part of the exemplary method 1000 in accordance with one embodiment of the present. FIG. 10D illustrates the steps of the fourth part of the exemplary method 1000 in accordance with one embodiment of the present invention. FIG. 10E illustrates the steps of the fifth part of the exemplary method 1000 in accordance with one embodiment of the present invention. FIG. 10F illustrates the steps of the sixth part of the exemplary method 1000 in accordance with one embodiment of the present invention. FIG. 10G illustrates the steps of the seventh part of exemplary method 1000 in accordance with one embodiment of the present invention. FIG. 10H illustrates the steps of the eighth part of the exemplary method 1000 in accordance with one embodiment of the present invention. FIG. 10I illustrates the steps of the ninth part of the exemplary method 1000 in accordance with one embodiment of the present invention. FIG. 10J illustrates the steps of the tenth part of the exemplary method 1000 in accordance with one embodiment of the present invention.

For explanatory purposes the exemplary method 1000 will be explained in connection with the exemplary communications system 100 illustrated in FIG. 1 wherein the wireless network is a CBRS network, wireless base stations are CBSD devices, the resource allocation management devices are SAS devices, the user equipment devices are mobile terminals, and cables connect the cable modem 1 104, . . . , CM Y 114 to the cable modem termination system 1 122. The cable modem termination system 1 122 supplying power to the cable modems which in turn supplies power to the wireless base station 1 (CBSD 1) 102 and wireless base station 2 (CBSD 2) 112. However, it should be understood that the method may be implemented using other systems, e.g., other non-CBRS wireless systems as well as other system configurations then those illustrated in FIG. 1. While it will be readily understood that additional steps and signaling are performed in connection with communicating information, messages, and packets between devices, the method 1000 focuses on and discusses the steps and signaling for understanding the invention.

The method 1000 shown in FIG. 10 will now be discussed in detail. The method starts in start step 1002 shown on FIG. 10A.

Operation proceeds from start step 1002 to step 1004 shown on FIG. 10A and step 1096 shown on FIG. 10F via connection node F 1095.

In step 1004, a cable modem termination system (e.g., cable modem termination system 1 122 of system 100) is powered up and begins operating. Operation proceeds from step 1004 to step 1006.

In step 1006, a cable modem (e.g., cable modem 1 104 of system 100) connects to the cable modem termination system and begins operating. The cable modem is powered by the cable modem termination system with power being supplied via a cable connecting the cable modem to the cable modem termination system. The cable is also used by the cable modem termination system and the cable modem to communicate with one another. In at least some embodiments, the power is supplied using power over Ethernet protocols, technologies and/or connections. Operation proceeds from step 1006 to step 1008.

In step 1008, a wireless base station (e.g., wireless base station 102 (e.g., a CSBD) of system 100) is connected to the cable modem via a cable and begins operating. The cable modem supplies power to the wireless base station. The power is supplied by the cable modem to the wireless base station over the cable connecting the wireless base station to the cable modem. The cable connecting the wireless base station to the cable mode is also by the cable modem and the wireless base station to communicate with one another. The cable modem is positioned between the wireless base station and the cable modem termination system.

When the system is operating, the wireless base station provides services, e.g., broadband services, to user equipment devices, e.g., wireless devices such as laptops, smartphones, cellphones, tablets, cars, etc. which connect to the wireless base station. The user equipment device uplink data is sent to the core network (e.g., core network 150) of the service provider (e.g., service provider 1 in system 100) which operates both the wireless base station 1 102, the cable modem 104, the cable modem termination system 1 122 and the core network 150. The service provider provides both wireless and cable services. The user equipment device uplink data which is sent to the core network traverses the following path: user equipment device to wireless base station to cable modem to cable modem termination system to core network device. Downlink data sent via the core network to the user equipment device follows the reverse path: core network to cable modem termination system to cable modem to wireless base station to user equipment device.

Operation proceeds from step 1008 to optional step 1010. In optional step 1010. The wireless base station registers with a resource allocation management device, e.g., a spectrum access system (e.g., RAMD 1 126 of system 100). This optional step is typically implemented by wireless base stations such as for example CBSD base stations of CBRS systems wherein a Spectrum Access System allocates and manages spectrum, e.g., General Authorized Access spectrum, which a wireless base station is to utilize. Operation proceeds from optional step 1010 to optional step 1012.

In optional step 1012, the resource allocation management device grants spectrum to the wireless base station for use in communicating with user equipment devices. Operation proceeds from optional step 1012 to step 1014.

When optional steps 1010 and 1012 are not implemented, operation proceeds from step 1008 to step 1014.

In step 1014, the CMTS communicates to the cable modem CMTS buffer information, e.g., CMTS uplink buffer size information for the CMTS uplink buffer used for storing data communicated from the cable modem to the CMTS and CMTS downlink buffer size information for the CMTS downlink buffer used for storing data to be communicated to the cable modem. To the extent that the CMTS utilizes a common downlink buffer for multiple cable modems, the CMTS provides information corresponding to the size, amount or portion of the common buffer reserved for use for data to be transmitted to the cable modem (e.g., cable modem 1 104). To the extent that the CMTS utilizes a common uplink buffer for multiple cable modems, the CMTS provides information corresponding to the size, amount or portion of the common buffer reserved for use for data to be stored that received from the cable modem (e.g., cable modem 1 104). In some embodiments, the CMTS buffer information includes a first downlink buffer size value expressed as an amount of time (e.g., an amount of time it takes for the cable modem termination system downlink buffer for the cable modem to fill up to its capacity, e.g., so that all entries in the CMTS downlink buffer used for the cable modem are occupied). In some embodiments, the CMTS buffer information includes a first uplink buffer size value expressed as an amount of time (e.g., an amount of time it takes for the cable modem termination system uplink buffer for the cable modem to fill up to its capacity, e.g., so that all entries in the CMTS uplink buffer used for the cable modem are occupied). Operation proceeds from step 1014 to step 1016.

In step 1016, the cable modem receives the CMTS buffer information. The cable modem also stores the received CMTS buffer information in memory in the cable modem. Operation proceeds from step 1016 to step 1018.

In step 1018, the wireless base station, e.g., wireless base station 102 of system 100, communicates to the cable modem wireless base station buffer information, e.g., wireless base station downlink buffer size information for the wireless base station downlink buffer used for storing data communicated from the cable modem to the wireless base station and wireless base station uplink buffer size information for the wireless base station uplink buffer used for storing data to be communicated to the cable modem. To the extent that the wireless base station utilizes separate uplink buffers for different user equipment devices, the wireless base station provides information corresponding to the aggregate size of the uplink buffers reserved for use for storing data to be transmitted from the wireless base station to the cable modem (e.g., cable modem 1 104). To the extent that the wireless base station utilizes different downlink buffers for different user equipment devices, the wireless base station provides information corresponding to the aggregate size of the downlink buffers reserved for use for storing data that is received from the cable modem (e.g., cable modem 1 104). In some embodiments, the wireless base station buffer information includes a first downlink buffer size value expressed as an amount of time (e.g., an amount of time it takes for the wireless base station downlink buffer to fill up to its capacity, i.e., all entries in the wireless base station downlink become occupied). In some embodiments, the wireless base station buffer information includes a first uplink buffer size value expressed as an amount of time (e.g., an amount of time it takes for the wireless base station uplink buffer used for the cable modem to fill up to its capacity, i.e., all entries in the wireless base station uplink buffer become occupied). Operation proceeds from step 1018 to step 1020.

In step 1020, the cable modem receives the wireless base station buffer information. The cable modem stores the wireless base station buffer information in memory at the cable modem. Operation proceeds from step 1020 via connection node A 1022 to step 1024 shown on FIG. 10B.

In step 1024, the cable modem creates a downlink data buffer in which to store downlink data traffic that will be received from the CMTS by the cable modem for transmission to the wireless base station. Step 1024 in some embodiments includes one or more sub-steps 1026 and 1028.

In sub-step 1026, the cable modem creates the downlink data buffer using the CMTS buffer information (e.g., the CMTS downlink buffer size) and/or the wireless base station buffer information (e.g., the wireless base station downlink buffer size).

In sub-step 1028, the cable modem creates the downlink data buffer based on the wireless base station downlink buffer size. The wireless base station downlink buffer size information being included in the wireless base station buffer information.

Operation proceeds from step 1024 to step 1030. In step 1030, the cable modem creates an uplink data buffer in which to store uplink data traffic that will be received from the wireless base station by the cable modem for transmission to the cable modem termination system. Step 1030 in some embodiments includes one or more sub-steps 1032 and 1034.

In sub-step 1032, the cable modem creates the uplink data buffer using the CMTS buffer information (e.g., the CMTS uplink buffer size) and/or the wireless base station buffer information (e.g., the wireless base station uplink buffer size).

In sub-step 1034, the cable modem creates the uplink data buffer based on the wireless base station uplink buffer size. The wireless base station uplink buffer size information being included in the wireless base station buffer information.

The cable modem in some embodiments uses the wireless base station uplink buffer size to determine the cable modem uplink buffer size. The cable modem uplink buffer in some embodiments is created from memory of the cable modem and is created to have a size equal to or greater than the wireless base station uplink buffer size. This allows the wireless base station to flush its uplink buffer if it is full after a period of time when the cable modem has been in a power savings mode of operation and has not been accepting data. In various embodiments, the cable modem uplink buffer is also created to have a size that is smaller than the CMTS uplink buffer so that it can transmit all of its uplink data to the CMTS in a burst or at one time, i.e., flush the uplink buffer when the cable modem's uplink buffer is full.

The cable modem in some embodiments uses the CMTS downlink buffer size to determine the cable modem downlink buffer size. The cable modem downlink buffer in some embodiments is created from memory of the cable modem and is created to have a size equal to or greater than the CMTS downlink buffer size. This allows the CMTS to flush its downlink buffer if it is full after a period of time when the cable modem has been in a power savings mode of operation and has not been accepting data. In various embodiments, the cable modem downlink buffer is also created to have a size that is smaller than the wireless base station downlink buffer so that it can transmit all of its uplink data to the wireless base station in a burst or at one time, i.e., flush the downlink buffer when the cable modem's downlink buffer is full.

Operation proceeds from step 1030 to step 1036. In step 1036, the cable modem determines the amount of power consumed by the cable modem to transmit the data from its downlink buffer to the wireless base station when all entries of the downlink data buffer are fully occupied, i.e., the downlink data buffer is full. Operation proceeds from step 1036 to step 1038.

In step 1038, the cable modem determines the amount of power consumed by the cable modem to transmit the data from its uplink buffer to the wireless base station when all entries of the uplink data buffer are fully occupied, i.e., the uplink data buffer is full. Operation proceeds from step 1038 to step 1040.

In step 1040, the cable modem reports to the CMTS and/or to the CMTS power management device (e.g., CMTS power management device 152 of system 100) the determined amount of power consumed by the cable modem to transmit the data from its uplink buffer to the CMTS when all entries of the uplink buffer are full. In some embodiments, the CMTS power management device 152 functionality as it relates to CMTS 1 122 is incorporated into the CMTS 1 122 in which case the power consumption information is reported to the CMTS 1 122 by the cable modem 1 104. Operation proceeds from step 1040 to step 1042.

In step 1042, the cable modem reports to the CMTS and/or to the CMTS power management device (e.g., CMTS power management device 152 of system 100) the determined amount of power consumed by the cable modem to transmit the data from its downlink buffer to the wireless base station when all entries of the downlink buffer are full. In some embodiments, the CMTS power management device 152 functionality as it relates to CMTS 1 122 is incorporated into the CMTS 1 122 in which case the power consumption information is reported to the CMTS 1 122 by the cable modem 1 104. Operation proceeds from step 1042 to step 1046 shown on FIG. 10C via connection node 1044.

In step 1046, user equipment devices connect to the wireless base station and begin sending uplink data and requests for downlink data to the wireless base station. Operation proceeds from step 1046 to step 1048.

In step 1048, the wireless base station receives from the user equipment devices the uplink data and downlink data requests. Operation proceeds from step 1048 to step 1050.

In step 1050, the wireless base station stores the uplink data and downlink data requests received from the user equipment devices in the wireless base station uplink data buffer. Operation proceeds from step 1050 to step 1052.

In step 1052, when the wireless base station determines the wireless base station uplink buffer is full, the wireless base station transmits the full contents of the wireless base statin uplink buffer to the cable modem. Operation proceeds from step 1052 to step 1054.

In step 1054, the cable modem while operating in a first mode of operation receives the uplink data and downlink data requests from the wireless base station. The first mode of operation is a non-power savings mode of operation in which the cable modem has its transmitters and receivers in a powered up and active state for communicating with the wireless base station and/or the CMTS. Operation proceeds from step 1054 to step 1056.

In step 1056, the cable modem while operating in the first mode of operation receives stores the received uplink data and downlink data requests from the wireless base station in the cable modem uplink buffer. Operation proceeds from step 1056 to step 1058. In step 1058, the cable modem while operating in the first mode of operation receives downlink data from the CMTS for transmission to the wireless base station. Operation proceeds from step 1058 to step 1060.

In step 1060, the cable modem while operating in the first mode of operation stores the received downlink data from the CMTS in the cable modem downlink buffer. Operation proceeds from step 1060 via connection node C 1062 to step 1064 shown on FIG. 10D.

In step 1064, while operating in the first mode of operation, the cable modem monitors the amount of the entries in the cable modem uplink buffer which have been filled and the amount of entries in the cable modem downlink buffer that have been filled. Operation proceeds from step 1064 to step 1066.

In step 1066, upon detecting by the cable modem that at least one of the following has occurred: (i) the cable modem uplink buffer has met a first threshold fill amount, or (ii) the cable modem downlink buffer has met a second threshold fill amount, the cable modem transmits all data in its uplink buffer to the CMTS and all data in its downlink buffer to the wireless base station. Operation proceeds from step 1066 to step 1068.

In step 1068, upon the cable modem transmitting all data in the downlink buffer to the wireless base station, the cable modem transmits a message to the CMTS indicating that the CMTS is not to send data to the cable modem. Operation proceeds from step 1068 to step 1070.

In step 1070, upon the cable modem transmitting all data in the uplink buffer to the CMTS, the cable modem transmits a message to the wireless base station indicating that the wireless base station is not to send data to the cable modem. Operation proceeds from step 1070 to step 1072.

In step 1072, the cable modem switches from the first mode of operation to a second mode of operation. The second mode of operation is a power saving mode of operation. Operation proceeds from step 1072 to step 1074.

In step 1074, the cable modem while operating in the power savings mode of operation sets a power savings timer to a first timer value. The first timer value being based on at least one of: (i) the CMTS buffer information (e.g., the CMTS buffer downlink size) or (ii) the wireless base station buffer information (e.g., wireless base station buffer uplink buffer size). In some embodiments step 1074 includes sub-step 1076. In sub-step 1076, the cable modem sets the power savings timer to a first timer value. The first timer value being an amount of time equal to or less than the lesser of: (i) the CMTS downlink buffer size expressed as an amount of time required to fill all entries of the CMTS downlink buffer or portion of the CMTS downlink buffer reserved for use for storing data to be sent to the cable modem and (ii) the wireless base station uplink buffer size expressed as an amount of time required to fill all entries of the wireless base station uplink buffer. In various embodiments, the cable modem determines a first timer value which is less than the lesser of the CMTS downlink buffer size as expressed as an amount of time to fill the CMTS downlink buffer and the wireless base station uplink buffer size expressed as an amount of time to fill the wireless base station uplink buffer. In this way, neither the CMTS downlink buffer or the wireless base station uplink buffer will overflow. Operation proceeds from step 1074 to step 1078.

In step 1078, the cable modem while operating in the power savings mode of operation deactivates and/or turns off power to one or more of its transmitters and/or its receivers to reduce the cable modem's power consumption. In many embodiments, the cable modem turns off power to all of its transmitters and receivers to minimize power consumption. Operation proceeds from step 1078 to step 1082 shown on FIG. 10E via connection node D 1080.

In step 1082, upon passage of an amount of time equal to the first timer value, the power savings timer causes the cable modem to switch from the power savings mode of operation to the non-power savings mode of operation. In some embodiments, step 1082 includes sub-step 1084. In sub-step 1084, when the power savings timer expires, the power savings timer causes the cable modem or a processor in the cable modem to execute one or more instructions causing the cable modem to switch from the power saving mode of operation to the non-power savings mode of operation. Operation proceeds from step 1082 to step 1086.

In step 1086, after switching from the power saving mode of operation to the non-power savings mode of operation, the cable modem re-activates and/or turns on power to the receivers and/or transmitters it turned off and/or de-activated when the cable modem previously entered power savings mode of operation (e.g., all of its receivers and transmitters are re-activated and/or have their power turned on). Operation proceeds from step 1086 to step 1088.

In step 1088, the cable modem notifies the wireless base station and the CMTS to begin sending data to the cable modem again. In some embodiments step 1088 includes one or more sub-steps 1090 and 1092. In sub-step 1090, the cable modem transmits a message to the wireless base station indicating that the wireless base station is to send data to the cable modem as the cable modem is available to receive data from the wireless base station. In sub-step 1092, the cable modem transmits a message to the CMTS indicating that the CMTS is to send data to the cable modem as the cable modem is available to receive data from the CMTS. Operation proceeds from step 1088 via connection node E 1094 to step 1052 shown on FIG. 10C wherein the method continues on with the wireless base station determining its uplink buffer is once again full, the wireless base station transmits the full contents of the wireless base station uplink buffer to the cable modem.

Returning now to step 1096 shown on FIG. 10E. Concurrently with the steps of the method 1002 to 1088 being performed and repeated in an on-going manner or loop, the CMTS power management device, e.g., CMTS power management device 152 of system 100, monitors the power usage of the cable system or a portion of the cable system under its control and in step 1096 makes a determination as to whether or not a power reduction is required. In step 1096 when no power reduction is required the CMTS power management device continues to monitor and make a determination as to whether or not a power reduction is required. In step 1096, when the CMTS power management device determines that a power reduction is required, operation proceeds from step 1096 to step 1098.

In step 1098, the CMTS power management device sends to the CMTS a message instructing the CMTS to reduce power. In this example, the CMTS power management device manages the power usage for the CMTS 1 122 and CMTS 2 124. The CMTS power management device can send a message to one of or both of these CMTS devices to reduce power. In this example, the CMTS power management system sends a power reduction message to at least CMTS 1 122 which has been used as the exemplary CMTS in the discussion of the exemplary method 1000. Operation proceeds from step 1098 via connection node G 1100 to step 1102 shown on FIG. 10F.

In step 1102, the CMTS receives the message from the CMTS power management device instructing the CMTS to reduce power. Operation proceeds from step 1102 to step 1104.

In step 1104, the CMTS transmits a message to the cable modem (e.g., cable modem 104) during a time period when the cable modem is in the non-power savings mode of operation instructing the cable modem to reduce power. Operation proceeds from step 1104 to step 1106.

In step 1106, the cable modem receives from the CMTS the message instructing the cable modem to reduce power. Operation proceeds from step 1106 to step 1108.

In step 1108, in response to the message received from the cable modem termination system instructing the cable modem to reduce power, the cable modem increases the buffer size of one or more of the following: the cable modem uplink buffer or the cable modem downlink buffer. The increase(s) in the one or more buffer sizes resulting in a longer time/duration during which the cable modem can remain in power savings mode of operation. This in turn directly resulting in reducing the power consumed by the cable modem. In some embodiments, step 1108 includes one or more sub-steps 1110, 1112, 1114, and 1116. In sub-step 1110, the cable modem determines a first buffer size amount by which to increase the cable modem uplink buffer size. In sub-step 1112, the cable modem increases the cable modem uplink buffer size by the first buffer size amount. In sub-step 1114, the cable modem determines a second buffer size amount by which to increase the cable modem downlink buffer size. In sub-step 1116, the cable modem increases the cable modem downlink buffer size by the second buffer size amount. Operation proceeds from step 1108 to step 1120 shown on FIG. 10G via connection node H 1118.

In step 1120, when the cable modem increases its downlink buffer size, the cable modem also instructs the wireless base station and/or the CMTS to increase their downlink buffers, e.g., by an equal amount. In some embodiments step 1120 includes one or more sub-steps 1122, 1124, 1126 and 1128.

In sub-step 1122, the cable modem generates a message instructing the wireless base station to increase the size of the wireless base station downlink buffer, e.g., by an amount equal to or greater than the amount by which the cable modem increased the size of the cable modem downlink buffer.

In sub-step 1124, the cable modem transmits to the wireless base station the message instructing the wireless base station to increase the size of the wireless base station downlink buffer. In various embodiments, the message includes information from which the wireless base station determines the amount of buffer size increase which it will implement. In some embodiments, this message includes information specifying a minimum amount by which the wireless base station downlink buffer size is to be increased. In some embodiments, this message specifies an exact amount by which the wireless base station downlink buffer size is to be increased. The amount of the increase specified will be an amount such that the downlink buffer size will be equal to or greater than the cable modem downlink buffer size.

In sub-step 1126, the cable modem generates a message instructing the cable modem termination system to increase the size of the cable modem termination system downlink buffer, e.g., by an amount equal to or greater than the amount by which the cable modem increased the size of the cable modem downlink buffer.

In sub-step 1128, the cable modem transmits to the cable modem termination system the message instructing the cable modem termination system to increase the size of the cable modem termination system downlink buffer. In various embodiments, the message includes information from which the cable modem termination system determines the amount of buffer size increase which it will implement. In some embodiments, this message includes information specifying a minimum amount by which the cable modem termination system downlink buffer size is to be increased. In some embodiments, this message includes information specifying a requested amount by which the cable modem termination system downlink buffer size is to be increased. In some embodiments, this message specifies an exact amount by which the cable modem termination system downlink buffer size is to be increased. The amount of the increase specified will be an amount such that the downlink buffer size will be equal to or greater than the cable modem downlink buffer size.

Operation proceeds from step 1120 to step 1130.

In step 1130, when the cable modem increases its uplink buffer size, the cable modem also instructs the wireless base station and/or the CMTS to increase their uplink buffers, e.g., by an equal amount. In some embodiments step 1130 includes one or more sub-steps 1132, 1134, 1136, and 1138.

In sub-step 1132, the cable modem generates a message instructing the wireless base station to increase the size of the wireless base station uplink buffer, e.g., by an amount equal to or greater than the amount by which the cable modem increased the size of the cable modem uplink buffer.

In sub-step 1134, the cable modem transmits to the wireless base station the message instructing the wireless base station to increase the size of the wireless base station uplink buffer. In some embodiments, this message includes information specifying a minimum amount by which the wireless base station uplink buffer size is to be increased. In various embodiments, the message includes information from which the wireless base station determines the amount of buffer size increase which it will implement. In some embodiments, this message includes information specifying a requested amount by which the wireless base station uplink buffer size is to be increased. In some embodiments, this message specifies an exact amount by which the wireless base station uplink buffer size is to be increased. The amount of the increase specified will be an amount such that the uplink buffer size will be equal to or greater than the cable modem uplink buffer size.

In sub-step 1136, the cable modem generates a message instructing the cable modem termination system to increase the size of the cable modem termination system uplink buffer, e.g., by an amount equal to or greater than the amount by which the cable modem increased the size of the cable modem uplink buffer.

In sub-step 1138, the cable modem transmits to the cable modem termination system the message instructing the cable modem termination system to increase the size of the cable modem termination system uplink buffer. In various embodiments, the message includes information from which the cable modem termination system determines the amount of buffer size increase which it will implement. In some embodiments, this message includes information specifying a minimum amount by which the cable modem termination system uplink buffer size is to be increased. In some embodiments, this message includes information specifying a requested amount by which the cable modem termination system uplink buffer size is to be increased. In some embodiments, this message specifies an exact amount by which the cable modem termination system uplink buffer size is to be increased. The amount of the increase specified will be an amount such that the uplink buffer size will be equal to or greater than the cable modem uplink buffer size.

Operation proceeds from step 1130 via connection node 11140 to step 1142 shown on FIG. 10H.

In step 1142, the cable modem termination system receives from the cable modem the instruction to increase the size of the cable modem termination system downlink buffer. In some embodiments, step 1142 includes sub-step 1143. In sub-step 1143, the cable modem termination system receives from the cable modem the message instructing the cable modem termination system to increase the size of the cable modem termination system downlink buffer. Operation proceeds from step 1142 to step 1144.

In step 1144, in response to receiving the instruction to increase the size of the cable modem termination system downlink buffer, the cable modem termination system increases the size of the cable modem termination system downlink buffer used to store the data to be transmitted to the cable modem. In various embodiments, the amount by which cable modem termination system increases the size of the buffer is determined based on information included in the received message. In some embodiments, step 1144 includes sub-step 1146. In sub-step 1146, the cable modem termination system increases the size of the cable modem termination system downlink buffer used to store data to be transmitted to the cable modem by an amount equal to or greater than an amount specified in the instruction received from the cable modem. Operation proceeds from step 1144 to step 1148.

In step 1148, the wireless base station receives from the cable modem the instruction to increase the size of the wireless base station downlink buffer. In some embodiments, step 1148 includes sub-step 1150. In sub-step 1150, the wireless base station receives from the cable modem the message instructing the wireless base station to increase the size of the wireless base station downlink buffer. Operation proceeds from step 1148 to step 1152.

In step 1152, in response to receiving the instruction to increase the size of the wireless base station downlink buffer, the wireless base station increases the size of the wireless base station downlink buffer. In various embodiments, the amount by which wireless base station increases the size of the buffer is determined based on information included in the received message. In some embodiments, step 1152 includes sub-step 1154. In sub-step 1154, the wireless base station increases the size of the wireless base station downlink buffer by an amount equal to or greater than an amount specified in the instruction received from the cable modem. Operation proceeds from step 1152 to step 1158 shown on FIG. 10I via connection node J 1156.

In step 1158, the cable modem termination system receives from the cable modem the instruction to increase the size of the cable modem termination system uplink buffer. In some embodiments, step 1158 includes sub-step 1160. In sub-step 1160, the cable modem termination system receives from the cable modem the message instructing the cable modem termination system to increase the size of the cable modem termination system uplink buffer. Operation proceeds from step 1158 to step 1162.

In step 1162, in response to receiving the instruction to increase the size of the cable modem termination system uplink buffer, the cable modem termination system increases the size of the cable modem termination system uplink buffer used to store the data received from the cable modem. In various embodiments, the amount by which cable modem termination system increases the size of the buffer is determined based on information included in the received message. In some embodiments, step 1162 includes sub-step 1164. In sub-step 1164, the cable modem termination system increases the size of the cable modem termination system uplink buffer used to store data received from the cable modem by an amount equal to or greater than an amount specified in the instruction received from the cable modem. Operation proceeds from step 1162 to step 1166.

In step 1166, the wireless base station receives from the cable modem the instruction to increase the size of the wireless base station uplink buffer. In some embodiments, step 1166 includes sub-step 1168. In sub-step 1168, the wireless base station receives from the cable modem the message instructing the wireless base station to increase the size of the wireless base station uplink buffer. Operation proceeds from step 1166 to step 1170.

In step 1170, in response to receiving the instruction to increase the size of the wireless base station uplink buffer, the wireless base station increases the size of the wireless base station uplink buffer. In various embodiments, the amount by which wireless base station increases the size of the buffer is determined based on information included in the received message. In some embodiments, step 1170 includes sub-step 1171. In sub-step 1171, the wireless base station increases the size of the wireless base station uplink buffer by an amount equal to or greater than an amount specified in the instruction received from the cable modem. Operation proceeds from step 1170 to step 1174 shown on FIG. 10J via connection node K 1172.

In some embodiments, when the cable modem is sending instructions to increase both the cable modem termination system uplink and downlink buffer sizes, the cable modem may send the instructions as part of a single message. The message would include the information discussed above in connection with the separate messages sent to the cable modem termination system regarding increasing the cable modem termination system uplink and downlink buffer sizes. Similarly, in some embodiments, in some embodiments, when the cable modem is sending instructions to increase both the wireless base station uplink and downlink buffer sizes, the cable modem may send the instructions as part of a single message. The message would include the information discussed above in connection with the separate messages sent to the wireless base station regarding increasing the wireless base station uplink and downlink buffer sizes.

In step 1174, the cable modem termination system communicates updated cable modem termination system buffer information to the cable modem. In some embodiments, step 1174 includes sub-step 1176. In sub-step 1176, the cable modem termination system transmits updated cable modem termination system buffer information to the cable modem including a confirmation that the cable modem termination system downlink and/or uplink buffers have been increased in size as instructed. Operation proceeds from step 1174 to step 1178.

In step 1178, the wireless base station communicates updated wireless base station buffer information to the cable modem. In some embodiments, step 1178 includes sub-step 1180. In sub-step 1180, the wireless base station transmits updated wireless base station buffer information to the cable modem including a confirmation that the wireless base station downlink and/or uplink buffers have been increased in size as instructed. Operation proceeds from step 1178 to step 1182.

In step 1182, the cable modem receives the communicated updated CMTS buffer information from the CMTS and updates the stored CMTS buffer information. The updated buffer information may be the same type of buffer information previously discussed. For example, the updated CMTS buffer information may, and in some embodiments does, include CMTS downlink and/or uplink buffer size information expressed as an amount of time for the CMTS buffer to become full. Operation proceeds from step 1182 to step 1184.

In step, 1184, the cable modem receives the communicated updated wireless base station buffer information from the wireless base station and updates the stored wireless base station buffer information. The updated buffer information may be the same type of buffer information previously discussed. For example, the updated wireless base station buffer information may, and in some embodiments does, include wireless base station buffer downlink and/or uplink buffer size information expressed as an amount of time for the wireless base station buffer to become full.

Operation proceeds from step 1184 via connection node C 1062 to step 1064 shown on FIG. 10D wherein the cable modem monitors the amount of the entries in the cable modem uplink buffer which have been filled and the amount of entries in the cable modem downlink buffer that have been filled. Operation proceeds from step 1064 to step 1066.

In step 1066, upon detecting by the cable modem that at least one of the following has occurred: (i) the cable modem uplink buffer has met a first threshold fill amount, or (ii) the cable modem downlink buffer has met a second threshold fill amount, the cable modem transmits all data in its uplink buffer to the CMTS and all data in its downlink buffer to the wireless base station. Operation proceeds from step 1066 to step 1068.

In step 1068, upon the cable modem transmitting all data in the downlink buffer to the wireless base station, the cable modem transmits a message to the CMTS indicating that the CMTS is not to send data to the cable modem. Operation proceeds from step 1068 to step 1070.

In step 1070, upon the cable modem transmitting all data in the uplink buffer to the CMTS, the cable modem transmits a message to the wireless base station indicating that the wireless base station is not to send data to the cable modem. Operation proceeds from step 1070 to step 1072.

In step 1072, the cable modem switches from the first mode of operation to a second mode of operation. The second mode of operation is a power saving mode of operation. Operation proceeds from step 1072 to step 1074.

In step 1074, the cable modem while operating in the power savings mode of operation sets a power savings timer to a first timer value. The first timer value being based on at least one of: (i) the CMTS buffer information (e.g., the CMTS buffer downlink size) or (ii) the wireless base station buffer information (e.g., wireless base station buffer uplink buffer size). At this time, the buffer information, e.g., buffer sizes have been updated to reflect the increased buffer sizes which occurred in response to the instructions sent by the cable modem to the wireless base station and/or CMTS so that the cable modem can remain in the power savings mode of operation for a longer period of time. The method continues on with the cable modem reducing its power consumption because it remains in the power savings mode of operation for a longer period of time.

Meanwhile in step 1096, The CMTS power management device continues to continuously monitor and make determinations as to whether or not a power reduction is required. If the reduction in power is not adequate, the CMTS power management device will send an additional message to the CMTS to continue to reduce power and the process as described above will be repeated e.g., with the repeat of steps 1098, 1102, 1104, 1106, 1108, 1118, 1120, 1122 and 1124.

While the process of dynamic management and reduction of power with respect to a single cable modem has been described the process is implemented by numerous cable modems under the control of the numerous CMTS. For example, with respect to CMTS 1 122 of system 100 it can send power reduction messages, commands, and/or instructions to the cable modems 1 104, . . . , cable modem Y 114. Similarly, CMTS 2 can instruct each of the cable modems under its control to reduce their power. In some embodiments, the CMTS may select which cable modems to which it is providing power to send the power reduction command. The selection may be, and in some embodiments is, based on one or more of the following: (i) maximum power usage reported by the cable modem when the cable modem transmits and/or receives with its buffer(s) full, (ii) the hardware version of the cable modem, (iii) software version of the cable modem, (iv) the amount of delay introduced by increasing the size of the uplink buffer and/or downlink buffer of the cable modem, (v) an amount of traffic passing through the cable modem, and (vi) the type of traffic passing through the cable modem.

In some embodiments, for example when the cable modem traffic is predominately uplink traffic then the cable modem may only power down the receiver and transmitter (or transceiver) used for uplink traffic when in power savings mode of operation. In some embodiments, for example when the cable modem traffic is predominately downlink traffic then the cable modem may only power down the transmitter and receiver used for uplink traffic.

In various embodiments, the cable modem may operate in power savings mode independently for uplink traffic and downlink traffic. For example, when the cable modem uplink buffer is full the cable modem will transit all of its uplink data to the cable modem termination system and then send messages to the wireless base station to not send any data to the cable modem. Once this has been done it will enter a power savings mode of operation with respect to the uplink transmitter and receiver by turning them off for a period of time which is based on the wireless base station uplink buffer size, e.g., the amount of time it will take for the wireless base station uplink buffer to fill up. The period of time selected would be less than this amount so as not to introduce an overflow condition at the wireless base station. The period of time would also be based on the amount of delay being introduced by the period of time the cable modem uplink transmitter and receiver are turned off. The period of time would be less than a quality of service or delay threshold value. Once the time period has expired and the cable mode will turn power on to the uplink receiver and transmitter and then send a message to the wireless base station to send data to cable modem. The cable modem uplink receiver is the receiver which receives data from the wireless base station and the cable modem uplink transmitter is the transmitter which transmits data to the cable modem termination system.

Similarly, for example when the cable modem downlink buffer is full the cable modem will transit all of its downlink data to the wireless base station and then send messages to the cable modem termination system to not send any data to the cable modem. Once this has been done it will enter a power savings mode of operation with respect to the downlink transmitter and receiver by turning power to them off for a period of time which is based on the cable modem termination system downlink buffer size, e.g., the amount of time it will take for the cable modem termination system downlink buffer to fill up. The period of time selected would be less than this amount so as not to introduce an overflow condition at the cable modem termination system. The period of time would also be based on the amount of delay being introduced by the period of time the cable modem uplink transmitter and receiver are turned off. The period of time would be less than a quality of service or delay threshold value. Once the time period has expired the cable mode turns the power to its downlink transmitter and receiver back on and then send a message to the cable modem termination system to start sending it data again. The cable modem downlink receiver is the cable modem receiver which receives data from the cable modem termination system and the cable modem downlink transmitter is the transmitter which transmits data to the wireless base station.

Various implementations and optional features of the method 1000 will now be discussed. In various embodiments, the receiving and storage steps of the cable modem of data from the wireless base station and the CMTS are performed independently and may be done in parallel or simultaneously. The transmission of instructions to increase the buffer sizes of the uplink and/or downlink buffers sent to the CMTS and/or wireless base station by the cable modem may be, and in many embodiments are, performed independently and may be done in parallel or simultaneously.

While the process of management and reduction of power with respect to a single cable modem has been described the process is implemented by numerous cable modems under the control of the numerous CMTS. For example, cable modems 1 104, . . . , cable modem Y 114 of system 100 may implement the method 1000.

Various implementations and optional features of the invention will now be discussed. In various embodiments, the receiving and storage steps of the cable modem of data from the wireless base station and the CMTS are performed independently and may be done in parallel, concurrently or simultaneously. Similarly, the transmission of data from the cable modem to the wireless base station and CMTS may also be performed in parallel, concurrently or simultaneously.

In some embodiments, the wireless base station is part of a wireless network operated by a first service provider. In some embodiments, the cable modem is part of a cable network operated by the first service provider. In some embodiments, the cable modem termination system is part of the cable network operated by the first service provider. In some embodiments, the wireless base station is a Citizens Broadband Service Device (CBSD) and the wireless network is a Citizens Broadband Radio Service (CBRS) network. In most embodiments, the cable modem is powered by the cable modem termination system. In some embodiments, the wireless base station is powered by the cable modem termination system via the cable modem.

In various embodiments, the power is provided by the cable modem termination system to the cable modem using power over Ethernet; and wherein power is provided by the cable modem to the wireless base station using power over Ethernet.

In at least some embodiments, the cable modem termination system buffer information includes a first downlink buffer size value expressed as an amount of time (e.g., an amount of time it takes for the cable modem termination system downlink buffer for the cable modem to fill up to its capacity); and the wireless base station buffer information includes a first uplink buffer size value expressed as an amount of time (e.g., an amount of time it takes for the wireless base station uplink buffer to fill up to its capacity).

In some embodiments, the first threshold value is an amount wherein 100% of all buffer entries in the cable modem uplink buffer are occupied (i.e., the buffer is full). In some embodiments, the first threshold value is an amount less than 100% of all buffer entries in the cable modem uplink buffer being occupied. In some embodiments, the first threshold value is an amount wherein 95% of all buffer entries in the cable modem uplink buffer are occupied (i.e., 95% of the buffer's capacity has been utilized—this case allows for some spare capacity should it be necessary).

In some embodiments, the second threshold value is an amount wherein 100% of all buffer entries in the cable modem downlink buffer are occupied (i.e., the buffer is full). In some embodiments, the second threshold value is an amount less than 100% of all buffer entries in the cable modem uplink buffer being occupied (e.g., the buffer is full and receipt of additional data will cause it to overflow). In some embodiments, the second threshold value is an amount wherein 95% of all buffer entries in the cable modem uplink buffer are occupied (i.e., 95% of the buffer's capacity has been utilized—this case allows for some spare capacity should it be necessary).

In at least some embodiments, the first and second threshold values are determined by the cable modem through statistical analysis wherein the cable modem determines the first and second threshold value to optimize the amount of time that the cable modem can stay in power savings mode over the course of a time period, e.g., an hour, day or week.

In various embodiments, the process begins when the cable modem receives or detects through monitoring that it has received a power reduction message from the cable modem termination system. In the method 3000 this occurs in step 3068. In such embodiments, the second time period also referred to as the second period of time may be, and in some embodiments is, referred to as a first time period or first period of time. In various other embodiments, the process begins when the CMTS power management device makes the determination that a power reduction is required. In the method 1000, this occurs in step 1095. In such embodiments, the second time period also referred to as the second period of time may be, and in some embodiments is, referred to as a first time period or first period of time. Similarly in some such embodiments, the updated CMTS and wireless base station buffer information is referred to as just buffer information.

FIG. 12 illustrates the steps of a flowchart of a method 1300 which illustrates another exemplary method embodiment for dynamically managing power usage by a cable modem. FIG. 12 shows the combination of FIGS. 12A, 12B, 12C, 12D, and 12E. FIG. 12A illustrates the steps of the first part of the exemplary method 1300 in accordance with one embodiment of the present invention. FIG. 12B illustrates the steps of the second part of the exemplary method 1300 in accordance with one embodiment of the present invention. FIG. 12C illustrates the steps of the third part of the exemplary method 1300 in accordance with one embodiment of the present. FIG. 12D illustrates the steps of the fourth part of the exemplary method 1300 in accordance with one embodiment of the present invention. FIG. 12E illustrates the steps of the fifth part of the exemplary method 1300 in accordance with one embodiment of the present invention.

For explanatory purposes the exemplary method 1300 will be explained in connection with the exemplary communications system 100 illustrated in FIG. 1 wherein the wireless network is a CBRS network, wireless base stations are CBSD devices, the resource allocation management devices are SAS devices, the user equipment devices are mobile terminals, and cables connect the cable modem 1 104, . . . , CM Y 114 to the cable modem termination system 1 122. The cable modem termination system 1 122 supplying power to the cable modems which in turn supplies power to the wireless base station 1 (CBSD 1) 102 and wireless base station 2 (CBSD 2) 112. However, it should be understood that the method may be implemented using other systems, e.g., other non-CBRS wireless systems as well as other system configurations then those illustrated in FIG. 1. While it will be readily understood that additional steps and signaling are performed in connection with communicating information, messages, and packets between devices, the method 1300 focuses on and discusses the steps and signaling for understanding the invention.

The method 1300 shown in FIG. 12 will now be discussed in detail. The method starts in start step 1302 shown on FIG. 13A.

Operation proceeds from start step 1302 to step 1304 shown on FIG. 13A.

In step 1304, a cable modem termination system (e.g., cable modem termination system 1 122 of system 100) is powered up and begins operating. Operation proceeds from step 1304 to step 1306.

In step 1306, a cable modem (e.g., cable modem 1 104 of system 100) connects to the cable modem termination system and begins operating. The cable modem is powered by the cable modem termination system with power being supplied via a cable connecting the cable modem to the cable modem termination system. In some embodiments, the cable is also used by the cable modem termination system and the cable modem to communicate with one another. In at least some embodiments, the power is supplied using power over Ethernet protocols, technologies and/or connections. Operation proceeds from step 1306 to step 1308.

In step 1308, a wireless base station (e.g., wireless base station 102 (e.g., a CSBD) of system 100) is connected to the cable modem via a cable and begins operating. The cable modem supplies power to the wireless base station. The power is supplied by the cable modem to the wireless base station over the cable connecting the wireless base station to the cable modem. The cable modem is positioned between the wireless base station and the cable modem termination system. In some embodiments, the cable connecting the wireless base station to the cable mode is also by the cable modem and the wireless base station to communicate with one another.

When the system is operating, the wireless base station provides services, e.g., broadband services, to user equipment devices, e.g., wireless devices such as laptops, smartphones, cellphones, tablets, cars, etc. which connect to the wireless base station. The user equipment device uplink data is sent to the core network (e.g., core network 150) of the service provider (e.g., service provider 1 in system 100) which operates both the wireless base station 1 102, the cable modem 104, the cable modem termination system 1 122 and the core network 150. The service provider in this exemplary embodiment provides both wireless and cable services. The user equipment device uplink data which is sent to the core network traverses the following path: user equipment device to wireless base station to cable modem to cable modem termination system to core network device. Downlink data sent via the core network to the user equipment device follows the reverse path: core network to cable modem termination system to cable modem to wireless base station to user equipment device.

Operation proceeds from step 1308 to optional step 1310. In optional step 1310. The wireless base station registers with a resource allocation management device, e.g., a spectrum access system (e.g., RAMD 1 126 of system 100). This optional step is typically implemented by wireless base stations such as for example CBSD base stations of CBRS systems wherein a Spectrum Access System allocates and manages spectrum, e.g., General Authorized Access spectrum, which a wireless base station is to utilize. Operation proceeds from optional step 1310 to optional step 1312.

In optional step 1312, the resource allocation management device grants spectrum to the wireless base station for use in communicating with user equipment devices. Operation proceeds from optional step 1312 to step 1314.

When optional steps 1310 and 1312 are not implemented, operation proceeds from step 1308 to step 1314.

In step 1314, the CMTS communicates to the cable modem first CMTS buffer information, e.g., first CMTS uplink buffer size information for the CMTS uplink buffer used for storing data communicated from the cable modem to the CMTS and first CMTS downlink buffer size information for the CMTS downlink buffer used for storing data to be communicated to the cable modem. To the extent that the CMTS utilizes a common downlink buffer for multiple cable modems, the CMTS provides information corresponding to the size, amount or portion of the common buffer reserved for use for data to be transmitted to the cable modem (e.g., cable modem 1 104). To the extent that the CMTS utilizes a common uplink buffer for multiple cable modems, the CMTS provides information corresponding to the size, amount or portion of the common buffer reserved for use for data to be stored that is received from the cable modem (e.g., cable modem 1 104). In some embodiments, the first CMTS buffer information includes a first downlink buffer size value expressed as an amount of time (e.g., an amount of time it takes for the cable modem termination system downlink buffer for the cable modem to fill up to its capacity, e.g., so that all entries in the CMTS downlink buffer used for the cable modem are occupied). In some embodiments, the first CMTS buffer information includes a first uplink buffer size value expressed as an amount of time (e.g., an amount of time it takes for the cable modem termination system uplink buffer for the cable modem to fill up to its capacity, e.g., so that all entries in the CMTS uplink buffer used for the cable modem are occupied). Operation proceeds from step 1314 to step 1316.

In step 1316, the cable modem receives the first CMTS buffer information. The cable modem also stores the received first CMTS buffer information in memory in the cable modem. Operation proceeds from step 1316 to step 1318.

In step 1318, the wireless base station, e.g., wireless base station 102 of system 100, communicates to the cable modem first wireless base station buffer information, e.g., first wireless base station downlink buffer size information for the wireless base station downlink buffer used for storing data communicated from the cable modem to the wireless base station and first wireless base station uplink buffer size information for the wireless base station uplink buffer used for storing data to be communicated to the cable modem. To the extent that the wireless base station utilizes separate uplink buffers for different user equipment devices, the wireless base station provides information corresponding to the aggregate size of the uplink buffers reserved for use for storing data to be transmitted from the wireless base station to the cable modem (e.g., cable modem 1 104). To the extent that the wireless base station utilizes different downlink buffers for different user equipment devices, the wireless base station provides information corresponding to the aggregate size of the downlink buffers reserved for use for storing data that is received from the cable modem (e.g., cable modem 1 104). In some embodiments, the first wireless base station buffer information includes a first downlink buffer size value expressed as an amount of time (e.g., an amount of time it takes for the wireless base station downlink buffer to fill up to its capacity, i.e., all entries in the wireless base station downlink become occupied). In some embodiments, the first wireless base station buffer information includes a first uplink buffer size value expressed as an amount of time (e.g., an amount of time it takes for the wireless base station uplink buffer used for the cable modem to fill up to its capacity, i.e., all entries in the wireless base station uplink buffer become occupied). Operation proceeds from step 1318 to step 1320.

In step 1320, the cable modem receives the first wireless base station buffer information. The cable modem stores the first wireless base station buffer information in memory at the cable modem. Operation proceeds from step 1320 via connection node A 1322 to step 1324 shown on FIG. 13B.

In step 1324 shown on FIG. 13B, the CMTS power management device, e.g., CMTS power management device 152 of system 100, monitors the power usage of the cable system or a portion of the cable system under its control and in step 1324 makes a determination as to whether or not a power reduction is required. In step 1324 when no power reduction is required the CMTS power management device continues to monitor and make a determination as to whether or not a power reduction is required. In step 1324, when the CMTS power management device determines that a power reduction is required, operation proceeds from step 1324 to step 1326.

In step 1326, the CMTS power management device sends to the CMTS a message instructing the CMTS to reduce power. In this example, the CMTS power management device manages the power usage for the CMTS 1 122 and CMTS 2 124. The CMTS power management device can send a message to one of or both of these CMTS devices to reduce power. In this example, the CMTS power management system sends a power reduction message to at least CMTS 1 122 which has been used as the exemplary CMTS in the discussion of the exemplary method 1300. Operation proceeds from step 1326 to step 1328.

In step 1328, the CMTS receives the message from the CMTS power management device instructing the CMTS to reduce power. Operation proceeds from step 1328 to step 1330.

In step 1330, the CMTS transmits a message to the cable modem (e.g., cable modem 104) during a time period when the cable modem is in the non-power savings mode of operation instructing the cable modem to reduce power. Operation proceeds from step 1330 to step 1332.

In step 1332, the cable modem receives from the CMTS the message instructing the cable modem to reduce power. Operation proceeds from step 1332 to step 1334.

In step 1334, in response to the message received from the cable modem termination system instructing the cable modem to reduce power, the cable modem increases the buffer size of at least one of the following: a cable modem downlink buffer included in the cable modem or a cable modem uplink buffer included in the cable modem. The increase in the at least one of the cable modem uplink buffer or the cable modem downlink buffer resulting in a longer time/duration during which the cable modem can remain in power savings mode of operation. This in turn directly resulting in reducing the power consumed by the cable modem. In some embodiments, step 1334 includes one or more sub-steps 1336, 1338, 1340, and 1342. In sub-step 1336, the cable modem determines a first buffer size amount by which to increase the cable modem uplink buffer size. In sub-step 1338, the cable modem increases the cable modem uplink buffer size by the first buffer size amount. In sub-step 1340, the cable modem determines a second buffer size amount by which to increase the cable modem downlink buffer size. In sub-step 1342 the cable modem increases the cable modem downlink buffer size by the second buffer size amount. Operation proceeds from step 1334 to step 1346 shown on FIG. 12C via connection node B 1344.

In step 1346, when the cable modem increases its downlink buffer size, the cable modem also instructs the wireless base station and/or the CMTS to increase their downlink buffers, e.g., by an equal amount. In some embodiments step 1346 includes one or more sub-steps 1348, 1350, 1352 and 1354.

In sub-step 1348, the cable modem generates a message instructing the wireless base station to increase the size of the wireless base station downlink buffer, e.g., by an amount equal to or greater than the amount by which the cable modem increased the size of the cable modem downlink buffer.

In sub-step 1350, the cable modem transmits to the wireless base station the message instructing the wireless base station to increase the size of the wireless base station downlink buffer. In various embodiments, the message includes information from which the wireless base station determines the amount of buffer size increase which it will implement. In some embodiments, this message includes information specifying a minimum amount by which the wireless base station downlink buffer size is to be increased. In some embodiments, this message includes information specifying a requested amount by which the wireless base station downlink buffer size is to be increased. In some embodiments, this message specifies an exact amount by which the wireless base station downlink buffer size is to be increased. The amount of the increase specified will be an amount such that the downlink buffer size will be equal to or greater than the cable modem downlink buffer size.

In sub-step 1352, the cable modem generates a message instructing the cable modem termination system to increase the size of the cable modem termination system downlink buffer, e.g., by an amount equal to or greater than the amount by which the cable modem increased the size of the cable modem downlink buffer.

In sub-step 1354, the cable modem transmits to the cable modem termination system the message instructing the cable modem termination system to increase the size of the cable modem termination system downlink buffer. In various embodiments, the message includes information from which the cable modem termination system determines the amount of buffer size increase which it will implement. In some embodiments, this message includes information specifying a minimum amount by which the cable modem termination system downlink buffer size is to be increased. In some embodiments, this message includes information specifying a requested amount by which the cable modem termination system downlink buffer size is to be increased. In some embodiments, this message specifies an exact amount by which the cable modem termination system downlink buffer size is to be increased. The amount of the increase specified will be an amount such that the downlink buffer size will be equal to or greater than the cable modem downlink buffer size.

Operation proceeds from step 1346 to step 1356.

In step 1356, when the cable modem increases its uplink buffer size, the cable modem also instructs the wireless base station and/or the CMTS to increase their uplink buffers, e.g., by an equal amount. In some embodiments step 1356 includes one or more sub-steps 1358, 1360, 1362, and 1364.

In sub-step 1358, the cable modem generates a message instructing the wireless base station to increase the size of the wireless base station uplink buffer, e.g., by an amount equal to or greater than the amount by which the cable modem increased the size of the cable modem uplink buffer.

In sub-step 1360, the cable modem transmits to the wireless base station the message instructing the wireless base station to increase the size of the wireless base station uplink buffer. In some embodiments, this message includes information specifying a minimum amount by which the wireless base station uplink buffer size is to be increased. In various embodiments, the message includes information from which the wireless base station determines the amount of buffer size increase which it will implement. In some embodiments, this message includes information specifying a requested amount by which the wireless base station uplink buffer size is to be increased. In some embodiments, this message specifies an exact amount by which the wireless base station uplink buffer size is to be increased. The amount of the increase specified will be an amount such that the uplink buffer size will be equal to or greater than the cable modem uplink buffer size.

In sub-step 1362, the cable modem generates a message instructing the cable modem termination system to increase the size of the cable modem termination system uplink buffer, e.g., by an amount equal to or greater than the amount by which the cable modem increased the size of the cable modem uplink buffer.

In sub-step 1364, the cable modem transmits to the cable modem termination system the message instructing the cable modem termination system to increase the size of the cable modem termination system uplink buffer. In various embodiments, the message includes information from which the cable modem termination system determines the amount of buffer size increase which it will implement. In some embodiments, this message includes information specifying a minimum amount by which the cable modem termination system uplink buffer size is to be increased. In some embodiments, this message includes information specifying a requested amount by which the cable modem termination system uplink buffer size is to be increased. In some embodiments, this message specifies an exact amount by which the cable modem termination system uplink buffer size is to be increased. The amount of the increase specified will be an amount such that the uplink buffer size will be equal to or greater than the cable modem uplink buffer size.

Figure 12A:
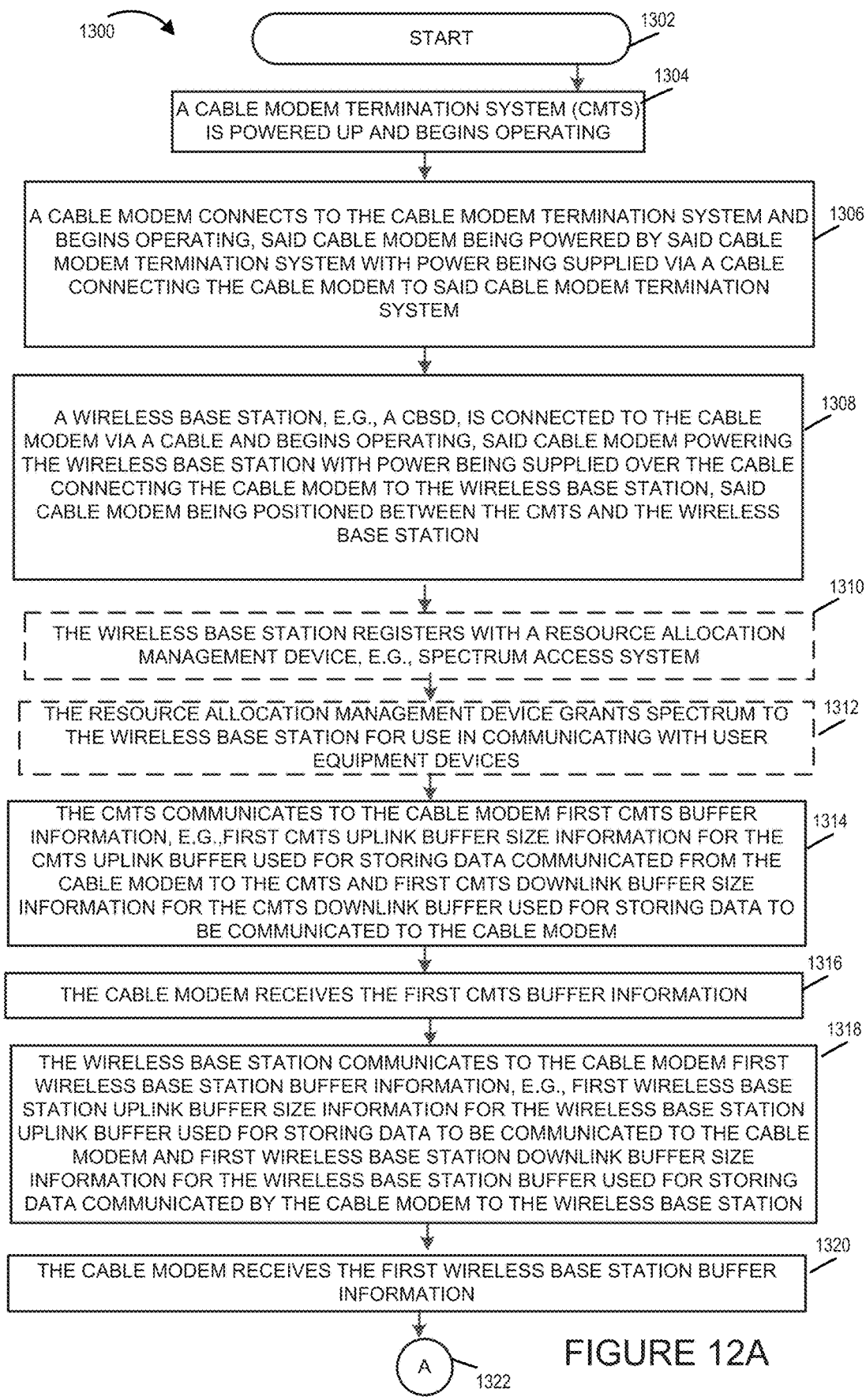
FIG. 12A illustrates the steps of the first part of an exemplary method in accordance with one embodiment of the present invention.
Figure 12B:
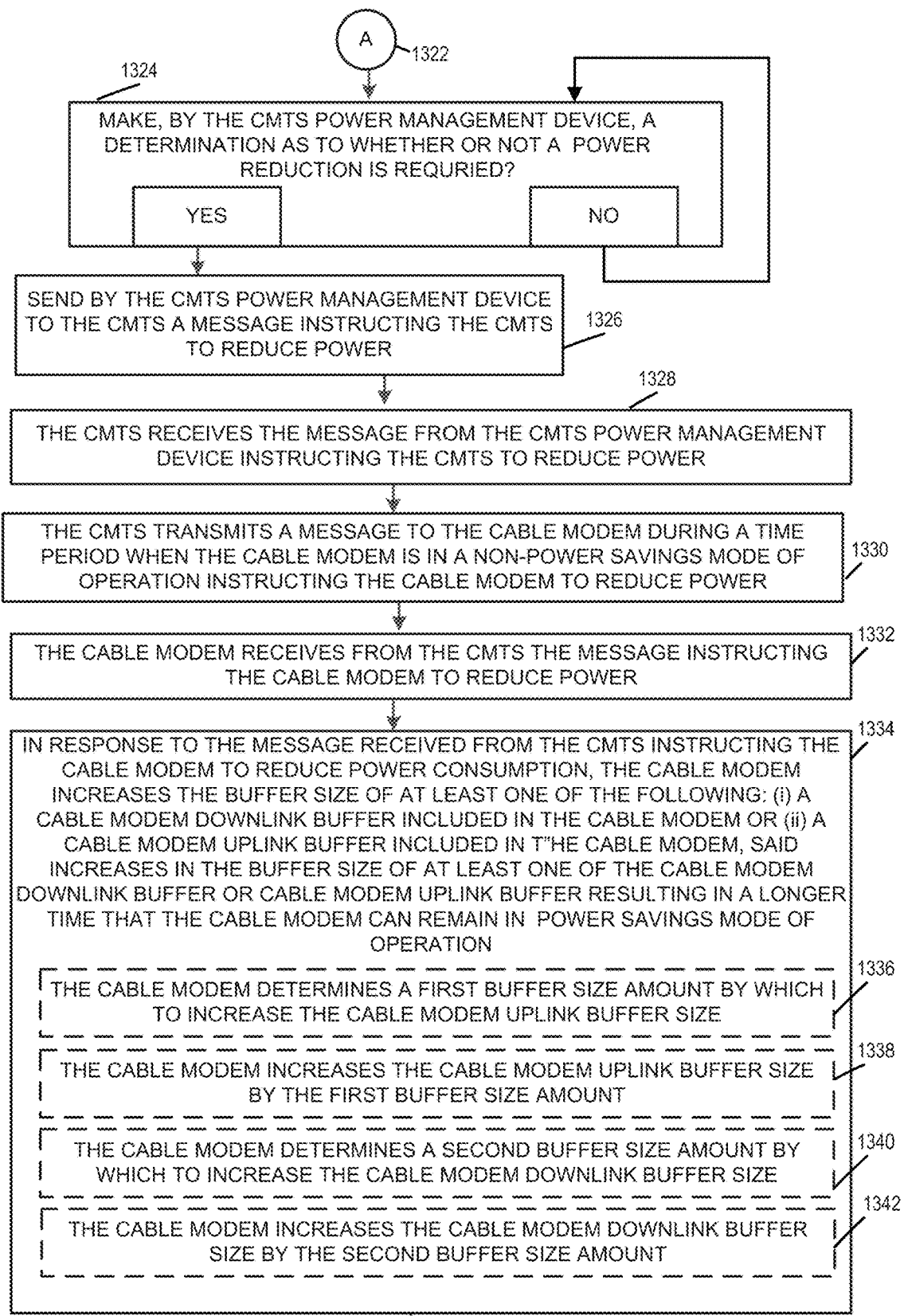
FIG. 12B illustrates the steps of the second part of an exemplary method in accordance with one embodiment of the present invention.
Figure 12C:
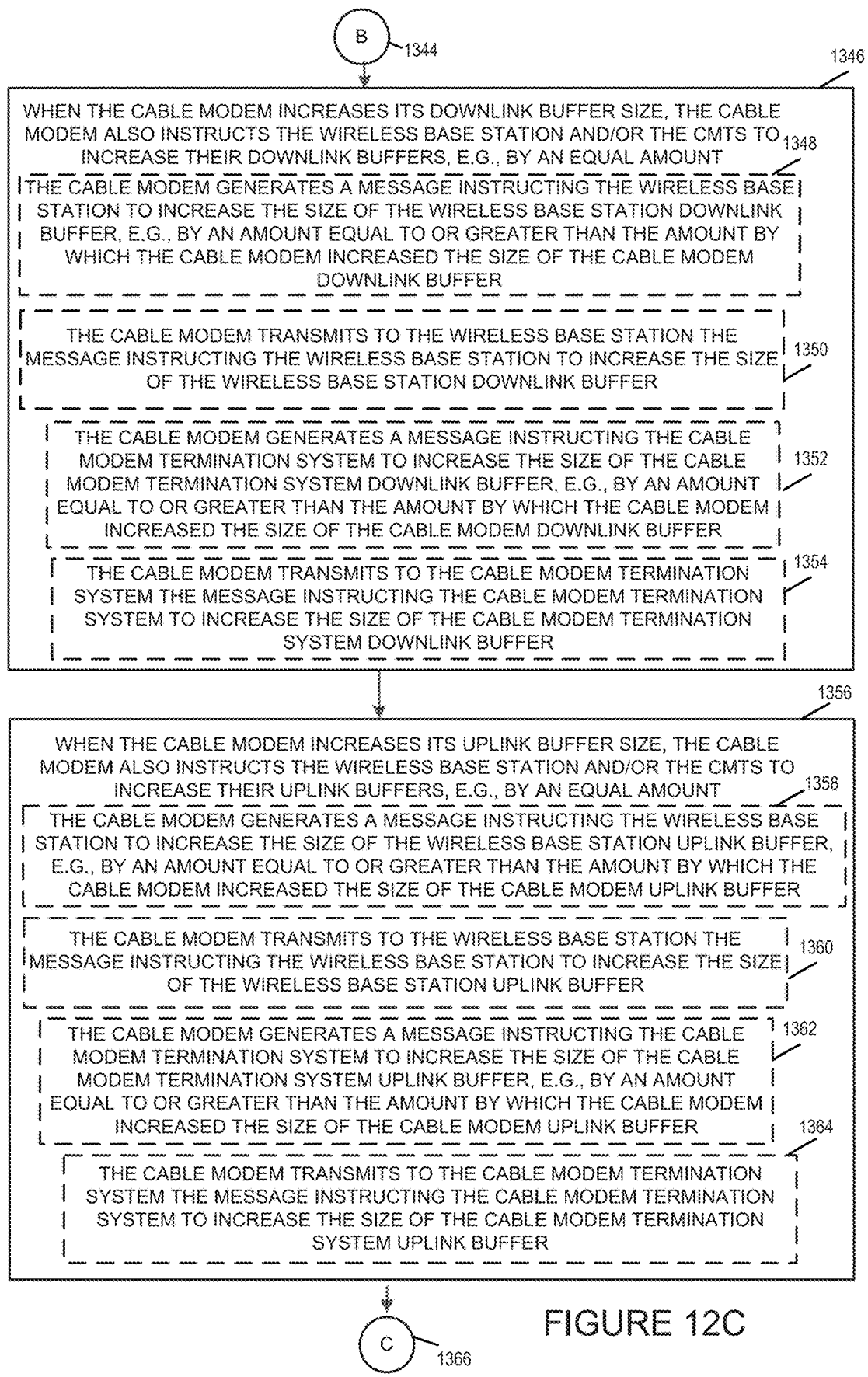
FIG. 12C illustrates the steps of the third part of an exemplary method in accordance with one embodiment of the present
Figure 12D:
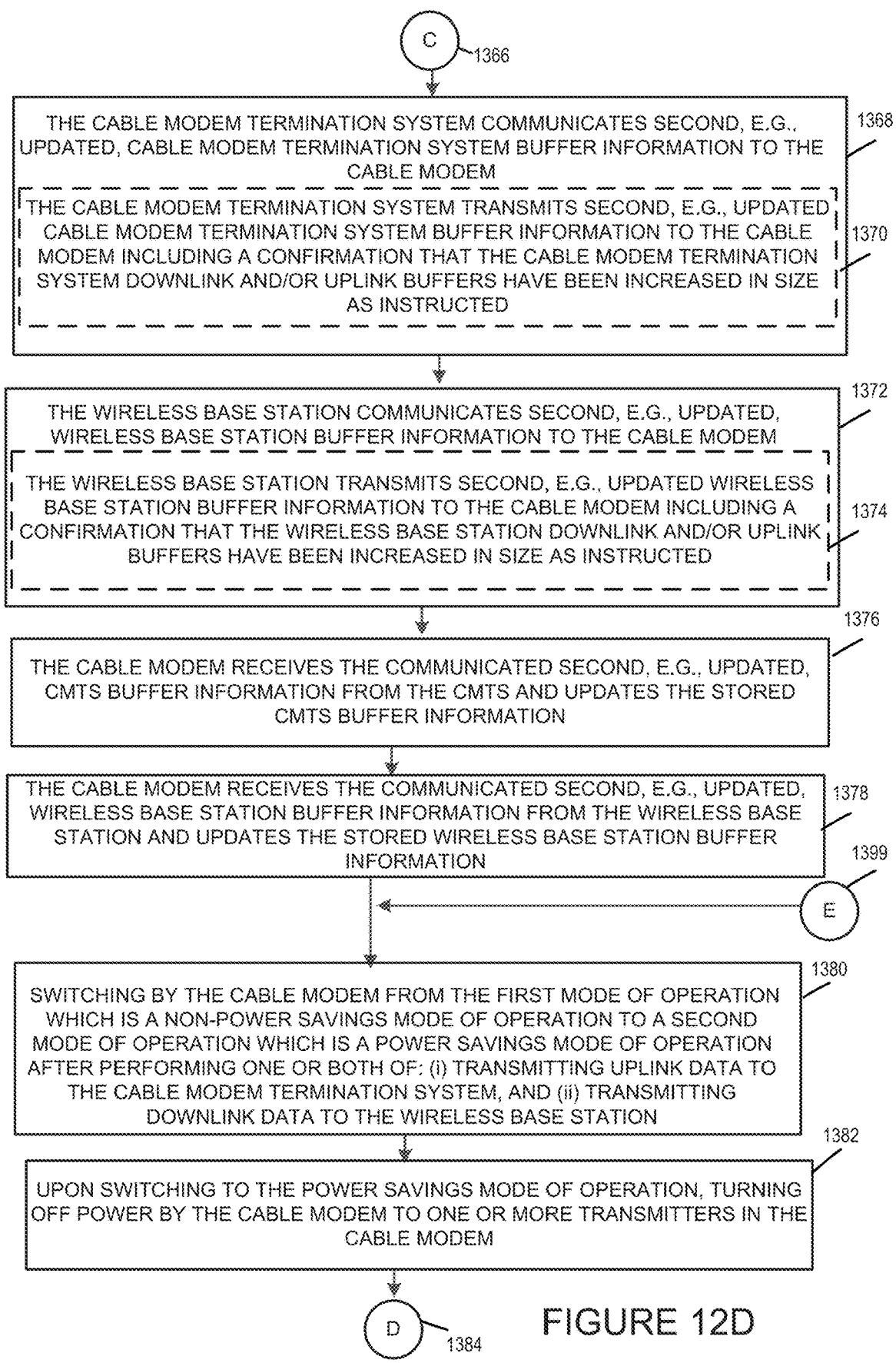
FIG. 12D illustrates the steps of the fourth part of an exemplary method in accordance with one embodiment of the present invention.
Figure 12E:
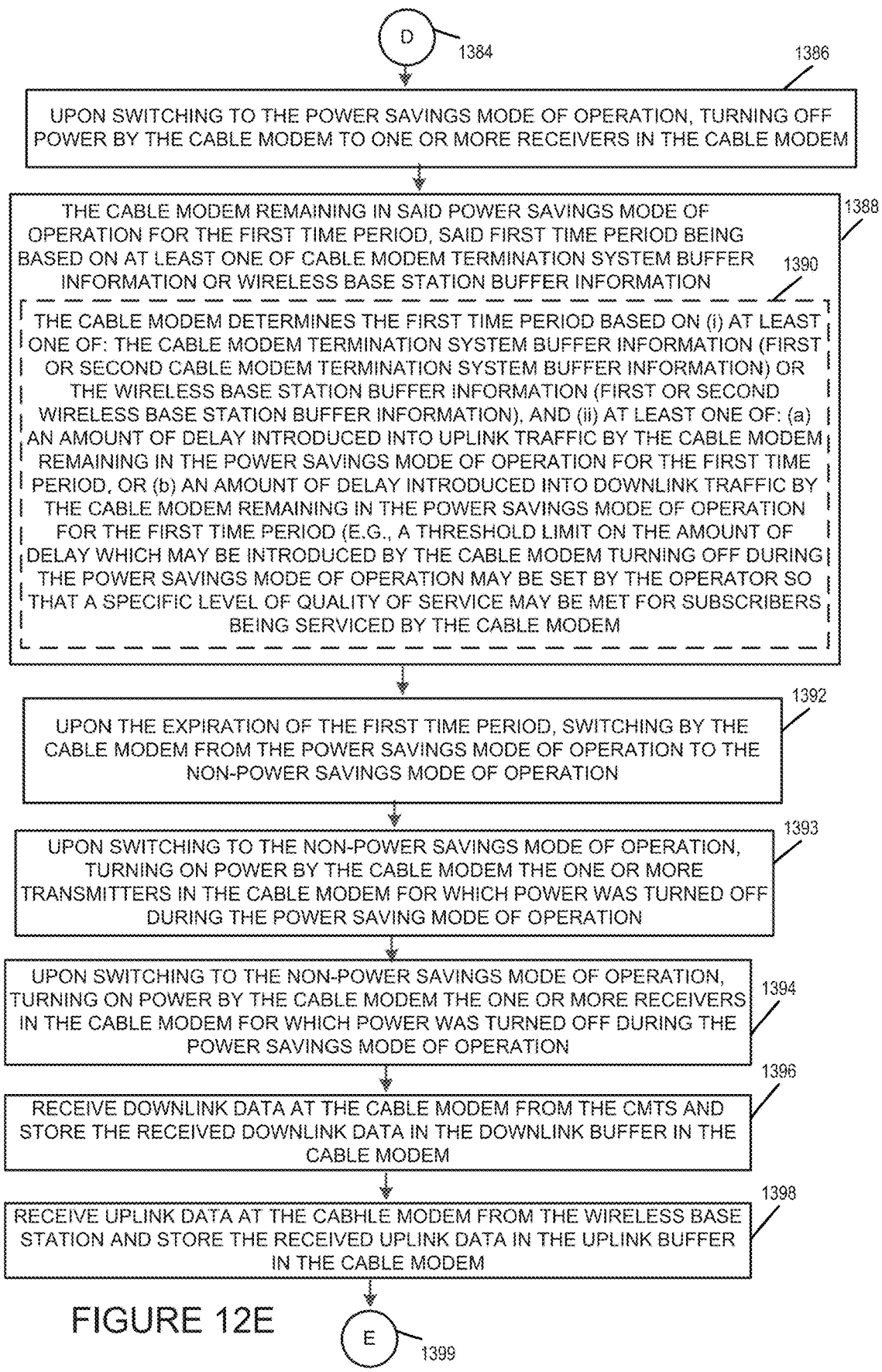
FIG. 12E illustrates the steps of the fifth part of an exemplary method in accordance with one embodiment of the present invention.

Operation proceeds from step 1356 via connection node C 1366 to step 1368 shown on FIG. 12D.

In step 1368, the cable modem termination system communicates second, e.g., updated, cable modem termination system buffer information to the cable modem. In some embodiments, step 1368 includes sub-step 1370. In sub-step 1370, the cable modem termination system transmits second, e.g., updated, cable modem termination system buffer information to the cable modem including a confirmation that the cable modem termination system downlink and/or uplink buffers have been increased in size as instructed. The second cable modem termination system buffer information may be, and in some embodiments is, the same type of buffer information discussed in connection with first cable modem termination system buffer information. Operation proceeds from step 1368 to step 1372.

In step 1372, the wireless base station communicates second, e.g., updated, wireless base station buffer information to the cable modem. In some embodiments, step 1372 includes sub-step 1374. In sub-step 1374, the wireless base station transmits the second, e.g., updated, wireless base station buffer information to the cable modem including a confirmation that the wireless base station downlink and/or uplink buffers have been increased in size as instructed. The second wireless base station buffer information may be, and in some embodiments is, the same type of buffer information discussed in connection with first wireless base station buffer information. Operation proceeds from step 1372 to step 1376.

In step 1376, the cable modem receives the communicated second, e.g., updated, CMTS buffer information from the CMTS and updates the stored CMTS buffer information to reflect the change from the first CMTS buffer information. The second or updated CMTS buffer information may be the same type of buffer information previously discussed. For example, the updated CMTS buffer information may, and in some embodiments does, include CMTS downlink and/or uplink buffer size information expressed as an amount of time for the CMTS buffer to become full. Operation proceeds from step 1376 to step 1378.

In step, 1378, the cable modem receives the communicated second, e.g., updated, wireless base station buffer information from the wireless base station and updates the stored wireless base station buffer information to reflect the change from the first wireless base station information. The second, e.g., updated, wireless base station buffer information may be the same type of buffer information previously discussed. For example, the updated wireless base station buffer information may, and in some embodiments does, include wireless base station buffer downlink and/or uplink buffer size information expressed as an amount of time for the wireless base station buffer to become full.

Operation proceeds from step 1378 to step 1380. In step 1380, the cable modem switches from the first mode of operation to a second mode of operation after performing one or both of: (i) transmitting uplink data to the cable modem termination system, and (ii) transmitting downlink data to the wireless base station. The first mode of operation being the non-power savings mode of operation. The second mode of operation being the power saving mode of operation. Operation proceeds from step 1380 to step 1382. Prior to transmitting the uplink data to the cable modem termination system and/or transmitting downlink data to the wireless base station, the cable modem will determine one or more of the following if the data stored in the cable modem uplink buffer has exceeded or equals a first threshold, the data stored in the cable modem downlink buffer has exceeded or equals a second threshold. In some embodiments, the first threshold value is the capacity of the cable modem uplink buffer. In some embodiments, the first threshold value is less than the capacity of the cable modem uplink buffer, e.g., 90% of capacity. In some embodiments, the second threshold value is equal to the capacity of the cable modem downlink buffer. In some embodiments, the second threshold value is less than the capacity of the cable modem downlink buffer, e.g., 90% of capacity.

In step 1382, upon switching to the power savings mode of operation, the cable modem turns off one or more transmitters in the cable modem. Operation proceeds from step 1382 via connection node D 1384 to step 1386 shown on FIG. 12E.

In step 1386, upon switching to the power savings mode of operation, the cable modem turns off one or more transmitters in the cable modem. Operation proceeds from step 1386 to step 1388.

In step 1388, the cable modem remains in the power savings mode of operation for a first time period. The first time period is based on at least one of the following: (i) cable modem termination system buffer information (e.g., the first CMTS buffer information plus the increased size or the second CMTS buffer information which may include CMTS buffer information after increase(s) have been made or a confirmation that the requested increase or increases in buffer size have been implemented, or (ii) wireless base station buffer information (e.g., the first wireless base station buffer information plus the increased size or the second wireless base station buffer information which may include wireless base station buffer information after increase(s) have been made or a confirmation that the requested increase or increases in buffer size have been implemented. In some embodiments, step 1388 includes sub-step 1390. In sub-step 1390, the cable modem determines the first time period based on (i) at least one of: (a) the cable modem termination system buffer information (e.g., first or second cable modem termination system buffer information), or (b) the wireless base station buffer information (first or second wireless base station buffer information), and (ii) at least one of: (a) an amount of delay introduced into uplink traffic by the cable modem remaining in the power savings mode of operation for the first time period, or (b) an amount of delay introduced into downlink traffic by the cable modem remaining in the power savings modem of operation for the first time period (e.g., a threshold limit on the amount of delay which may be introduced by the cable modem turning off (e.g., turning off one or more transmitters and/or turning off one or more receivers) during the power savings mode of operation may be set by the operator so that a specific level of quality of service may be met for subscribers being serviced by the cable modem. In some embodiments, the step of determining the first time period is further based on at least one of the following: a type of data being transmitted in the uplink data traffic or the type of data being transmitted in the downlink data traffic (e.g., whether the data passing through the cable modem is uplink dominated data traffic type, downlink dominated data traffic type, balanced uplink and downlink data traffic type, sensor data type can be used to in determining the first period of time as it may and in many instances will also be a determining factor in what the quality/level of service that is acceptable to a subscriber being serviced by a cable modem). Operation proceeds from step 1388 to step 1392.

In step 1392, upon the expiration of the first time period, the cable mode switches from the power savings mode of operation back to the non-power savings mode of operation. Operation proceeds from step 1392 to step 1393.

In step 1393, upon switching to the non-power savings mode of operation, the cable modem turns on the one or more transmitters in the cable modem which were turned off during the power savings mode of operation. Operation proceeds from step 1393 to step 1394.

In step 1394, upon switching to the non-power savings mode of operation, the cable modem turns on the one or more receivers in the cable modem which were turned off during the power savings mode of operation. Operation proceeds from step 1394 to step 1396.

In step 1396, the cable modem receives downlink data from the CMTS and stores the downlink data in the cable modem downlink buffer. Operation proceeds from step 1396 to step 1398.

In step 1398, the cable modem receives uplink data from the wireless base station and stores the uplink data in the cable modem uplink buffer. Operation proceeds from step 1398 via connection node E 1399 to step 1380 where the method continues as previously described.

As described in connection with other exemplary embodiments, while the process of dynamic management and reduction of power with respect to a single cable modem has been described the process is implemented by numerous cable modems under the control of the numerous CMTS. For example, with respect to CMTS 1 122 of system 100 it can send power reduction messages, commands, and/or instructions to the cable modems 1 104, . . . , cable modem Y 114. Similarly, CMTS 2 can instruct each of the cable modems under its control to reduce their power. In some embodiments, the CMTS may select which cable modems to which it is providing power to send the power reduction command. The selection may be, and in some embodiments is, based on one or more of the following: (i) maximum power usage reported by the cable modem when the cable modem transmits and/or receives with its buffer(s) full, (ii) the hardware version of the cable modem, (iii) software version of the cable modem, (iv) the amount of delay introduced by increasing the size of the uplink buffer and/or downlink buffer of the cable modem, (v) an amount of traffic passing through the cable modem, and (vi) the type of traffic passing through the cable modem.

Various exemplary numbered embodiments illustrating different features of the present invention will now be discussed. The various features discussed may be used in variety of different combinations. The numbered embodiments are only exemplary and are not meant to be limiting to the scope of the invention.

List of First Set of Exemplary Numbered Method Embodiments

Method Embodiment 1: A communications method comprising: receiving a message by a cable modem from a cable modem termination system instructing the cable modem to reduce power consumption; in response to receiving the message from the cable modem termination system instructing the cable modem to reduce power consumption, increasing, by the cable modem, a buffer size of at least one of: (i) a cable modem downlink buffer included in the cable modem, or (ii) a cable modem uplink buffer included in the cable modem; and switching, by the cable modem, from a first mode of operation to a second mode of operation after performing one or both of: (i) transmitting uplink data to the cable modem termination system, and (ii) transmitting downlink data to a wireless base station, said second mode of operation being a power savings modem of operation.

Method Embodiment 2. The communications method of Method Embodiment 1, further comprising: remaining in said power savings mode of operation for a first time period, said first time period being based on at least one of cable modem termination system buffer information or wireless base station buffer information.

Method Embodiment 3. The communications method of Method Embodiment 2, wherein the cable modem is positioned between the cable modem termination system and the wireless base station; wherein the cable modem uplink data buffer is used by the cable modem for storing uplink data received from the wireless base station; and wherein the cable modem downlink data buffer is used by the cable modem for storing downlink data received from the cable modem termination system.

Method Embodiment 4. The communications method of Method Embodiment 3, further comprising: receiving, by the cable modem, said cable modem termination system buffer information from the cable modem termination system; and receiving, by the cable modem, said wireless base station buffer information from the wireless base station.

Method Embodiment 5. The communications method of Method Embodiment 1, further comprising: instructing the wireless base station to increase a size of a wireless base station uplink buffer included in the wireless base station when said cable modem increases the buffer size of the cable modem uplink buffer.

Method Embodiment 5A. The communications method of Method Embodiment 2, further comprising: prior to increasing the cable modem uplink buffer size, determining, by the cable modem, whether or not to instruct the wireless base station to increase a size of a wireless base station uplink buffer included in the wireless base station.

Method Embodiment 5B. The communications method of Method Embodiment 5A, wherein said determining, by the cable modem, whether or not to instruct the wireless base station to increase the size of the wireless base station uplink buffer included in the wireless base station is based on: (i) said wireless base station buffer information, (ii) the size of the cable modem uplink buffer, and (ii) the amount by which the cable modem uplink buffer size is to be increased.

Method Embodiment 5C. The communications method of Method Embodiment 5B, further comprising: determining to instruct the wireless base station to increase the size of the wireless base station uplink buffer included in the wireless base station when the size of the cable modem uplink buffer plus the amount by which the cable modem uplink buffer size is to be increased is greater than uplink size threshold value; transmitting to the wireless base station a message indicating the wireless base station is to increase the size of the wireless base station uplink buffer after determining the size of the cable modem uplink buffer plus the amount by which the cable modem uplink buffer size is to be increased is greater than uplink size threshold value.

Method Embodiment 5D. The communications method of Method Embodiment 5C, wherein the uplink size threshold value is a value equal to or greater than the wireless base station uplink buffer size (e.g., if the cable modem uplink buffer size is increased to a value which is greater than the wireless base station uplink buffer size the wireless base station will need to increase it buffer size so that the cable modem can turn off for a longer duration of time to obtain a greater amount of power savings).

Method Embodiment 5E. The communications method of Method Embodiment 5D, wherein the step of instructing the wireless base station to increase the size of the wireless base station uplink buffer included in the wireless base station includes instructing the wireless base station to increase the size of the wireless base station uplink buffer by an amount equal to or greater than the increase of the size of the cable modem uplink buffer.

Method Embodiment 6. The communications method of Method Embodiment 5, wherein the step of instructing the wireless base station to increase the size of the wireless base station uplink buffer included in the wireless base station includes instructing the wireless base station to increase the size of the wireless base station uplink buffer by an amount equal to or greater than the increase of the size of the cable modem uplink buffer.

Method Embodiment 7. The communications method of Method Embodiment 5, further comprising: instructing the cable modem termination system to increase a size of a cable modem termination system downlink buffer included in the cable modem termination system used for storing data to be communicated to the cable modem when said cable modem increases the buffer size of the cable modem downlink buffer.

Method Embodiment 7A. The communications method of Method Embodiment 5, further comprising: prior to increasing the cable modem downlink buffer size, determining, by the cable modem, whether or not to instruct the cable modem termination system to increase a size of a cable modem downlink buffer included in the cable modem termination system.

Method Embodiment 7B. The communications method of Method Embodiment 7A, wherein said determining, by the cable modem, whether or not to instruct the cable modem termination system to increase the size of the wireless base station uplink buffer included in the wireless base station is based on: (i) said cable modem termination system buffer information, (ii) the size of the cable modem downlink buffer, and (ii) the amount by which the cable modem downlink buffer size is to be increased.

Method Embodiment 7C. The communications method of Method Embodiment 7B, further comprising: determining to instruct the cable modem termination system to increase the size of the cable modem termination downlink buffer included in the cable modem termination system when the size of the cable modem downlink buffer plus the amount by which the cable modem downlink buffer size is to be increased is greater than a downlink size threshold value; and transmitting to the cable modem termination system a message indicating the cable modem termination system is to increase the size of the cable modem downlink buffer used for storing data to be transmitted to the cable modem after determining by the cable modem that the size of the cable modem downlink buffer plus the amount by which the cable modem downlink buffer size is to be increased is greater than a downlink size threshold value.

Method Embodiment 7D. The communications method of Method Embodiment 7C, wherein the downlink size threshold value is a value equal to or greater than the wireless base station downlink buffer size (e.g., if the cable modem downlink buffer size is increased to a value which is greater than the cable modem termination system downlink buffer size for the cable modem termination system downlink buffer used to store downlink data to be transmitted to the cable modem, the cable modem termination system will need to increase its buffer size so that the cable modem can turn off for a longer duration of time to obtain a greater amount of power savings).

Method Embodiment 7E. The communications method of Method Embodiment 7D, wherein the step of instructing the cable modem termination system to increase the size of the cable modem termination system downlink buffer included in the cable modem termination system includes instructing the cable modem termination system to increase the size of the cable modem termination system downlink buffer used for storing downlink data to be transmitted to the cable modem by an amount equal to or greater than the increase of the size of the cable modem downlink buffer.

Method Embodiment 8. The communications method of Method Embodiment 7, wherein the step of instructing the cable modem termination system to increase the size of the cable modem termination system downlink buffer included in the cable modem termination system includes instructing the cable modem termination system to increase the size of the cable modem termination system downlink buffer used for storing downlink data to be transmitted to the cable modem by an amount equal to or greater than the increase of the size of the cable modem downlink buffer.

Method Embodiment 9. The communications method of Method Embodiment 2, further comprising: determining the first period of time based on: (i) at least one of: the cable modem termination system buffer information or the wireless base station buffer information; and (ii) at least one of: (a) an amount of delay introduced into uplink data traffic by the cable modem remaining in the power savings mode of operation for the first period of time, or (b) an amount of delay introduced into a downlink data traffic by the cable modem remaining in the power savings mode of operation for the first period of time (e.g., a threshold limit on the amount of delay which may be introduced by the cable modem turning off during a power saving mode of operation may be set by the operator so that a specific level of quality of service may be met for subscribers being serviced by the cable modem.)

Method Embodiment 9A. The communications method of Method Embodiment 9, wherein said determining the first period of time is further based on at least one of the following: a type of data being transmitted in the uplink data traffic or the type of data being transmitted in the downlink data traffic. (e.g., whether the data passing through the cable modem is uplink dominated data traffic type, downlink dominated data traffic type, balanced uplink and downlink data traffic type, sensor data type can be used to in determining the first period of time as it may and in many instances will also be a determining factor in what the quality/level of service that is acceptable to a subscriber being serviced by a cable modem.)

Method Embodiment 10. The communications method of Method Embodiment 1, further comprising: upon switching to said power savings mode of operation, turning off power by said cable modem to one or more cable modem transmitters included in said cable modem.

Method Embodiment 11. The communications method of Method Embodiment 10, further comprising: upon switching to said power savings mode of operation, turning off power by said cable modem to one or more cable modem receivers included in said cable modem.

List of Second Set of Exemplary Numbered Method Embodiments

Method Embodiment 1. A communications method comprising: receiving, by a cable modem positioned between a cable modem termination system and a wireless base station, cable modem termination system buffer information; receiving, by the cable modem, wireless base station buffer information; switching, by the cable modem, from a first mode of operation to a second mode of operation after performing one or both of: (i) transmitting uplink data to the cable modem termination system, and (ii) transmitting downlink data to the wireless base station, said second mode of operation being a power savings modem of operation; remaining in said power savings mode of operation for a first time period, said first time period being based on at least one of said cable modem termination system buffer information or said wireless base station buffer information.

Method Embodiment 1A. The communications method of Method Embodiment 1, wherein the wireless base station is part of a wireless network operated by a first service provider; wherein the cable modem is part of a cable network operated by the first service provider; and wherein the cable modem termination system is part of the cable network operated by the first service provider.

Method Embodiment 1AA. The communications method of Method Embodiment 1, wherein the wireless base station is a Citizens Broadband Service Device (CBSD) and the wireless network is Citizens Broadband Radio Service (CBRS) network.

Method Embodiment 1B. The communications method of Method Embodiment 1, wherein the cable modem is powered by the cable modem termination system.

Method Embodiment 1BB. The communications method of Method Embodiment 1B, wherein the wireless base station is powered by the cable modem termination system via the cable modem.

Method Embodiment 1C. The communications method of Method Embodiment 1, further comprising: receiving power by the cable modem from the cable modem termination system over a first cable connecting the cable modem termination system and the cable modem, said first cable also being used for communicating messages between the cable modem termination system and the cable modem.

Method Embodiment 1CC. The communications method of Method Embodiment 1C, further comprising: providing power by the cable modem to the wireless base station over a second cable connecting the cable modem to the wireless base station, said second cable also being used for communicating messages between the cable modem and the wireless base station.

Method Embodiment 1E. The communications method of Method Embodiment 1BB or 1CC, wherein power is provided by the cable modem termination system to the cable modem using power over Ethernet; and wherein power is provided by the cable modem to the wireless base station using power over Ethernet.

Method Embodiment 2. The communications method of Method Embodiment 1, wherein the cable modem termination system buffer information includes a first downlink buffer size value expressed as an amount of time (e.g., an amount of time it takes for the cable modem termination system downlink buffer for the cable modem to fill up to its capacity); wherein the wireless base station buffer information includes a first uplink buffer size value expressed as an amount of time (e.g., an amount of time it takes for the wireless base station uplink buffer to fill up to its capacity).

Method Embodiment 3. The communications method of Method Embodiment 1 further comprising: receiving, by the cable modem, while said cable modem is in said first mode of operation downlink data from the cable modem termination system; storing the received downlink data at the cable modem in a cable modem downlink buffer; receiving, by the cable modem, while said cable mode is in said first mode of operation uplink data from the wireless base station; storing the received uplink data at the cable modem in a cable modem uplink buffer; and waiting until at least one of the following occurs: (i) the amount of data in the cable modem uplink buffer reaches a first threshold value, or (ii) the amount of data in the cable modem downlink buffer reaches a second threshold value, before transmitting either the stored downlink data or the stored uplink data.

Method Embodiment 3A. The communications method of Method Embodiment 3, wherein the first threshold value is an amount wherein 100% of all buffer entries in the cable modem uplink buffer are occupied (i.e., the buffer is full).

Method Embodiment 3AA. The communications method of Method Embodiment 3, wherein the first threshold value is an amount less than 100% of all buffer entries in the cable modem uplink buffer being occupied.

Method Embodiment 3AAA. The communications method of Method Embodiment 3, wherein the first threshold value is an amount wherein 95% of all buffer entries in the cable modem uplink buffer are occupied (i.e., 95% of the buffer's capacity has been utilized—this case allows for some spare capacity should it be necessary).

Method Embodiment 3B. The communications method of Method Embodiment 3A, wherein the second threshold value is an amount wherein 100% of all buffer entries in the cable modem downlink buffer are occupied (i.e., the buffer is full).

Method Embodiment 3BB. The communications method of Method Embodiment 3AA, wherein the second threshold value is an amount less than 100% of all buffer entries in the cable modem uplink buffer being occupied (e.g., the buffer is full and receipt of additional data will cause it to overflow).

Method Embodiment 3BBB. The communications method of Method Embodiment 3, wherein the second threshold value is an amount wherein 95% of all buffer entries in the cable modem uplink buffer are occupied (i.e., 95% of the buffer's capacity has been utilized—this case allows for some spare capacity should it be necessary).

Method Embodiment 5. The communications method of Method Embodiment 1, further comprising: upon switching to said power savings mode of operation, turning off power by said cable modem to one or more cable modem transmitters included in said cable modem.

Method Embodiment 6. The communications method of Method Embodiment 5, further comprising: upon switching to said power savings mode of operation, turning off power by said cable modem to one or more cable modem receivers included in said cable modem.

Method Embodiment 6A. The communications method of Method Embodiment 6, wherein the switching, by the cable modem, from the first mode of operation to the second mode of operation occurs after performing both of: (i) transmitting uplink data to the cable modem termination system, and (ii) transmitting downlink data to the wireless base station, said second mode of operation being a power savings modem of operation.

Method Embodiment 6AA. The communications method of Method Embodiment 6AA, wherein said turning off power by said cable modem to one or more cable modem transmitters included in said cable modem includes turning off power to all transmitters included in said cable modem; wherein said turning off power by said cable modem to one or more cable modem receivers included in said cable modem includes turning off power to all receivers included in said cable modem.

Method Embodiment 7. The communications method of Method Embodiment 6, further comprising: prior to turning off said one or more cable modem transmitters, (i) transmitting by the cable modem a first message to the wireless base station indicating that data is not to be sent by the wireless base station to the cable modem; and (ii) transmitting a second message to the cable modem termination system indicating that data is not to be sent by the cable modem termination system to the cable modem.

Method Embodiment 8. The communications method of Method Embodiment 7, further comprising: after the cable modem has remained in the power savings mode of operation for the first time period, switching by the cable modem from the power savings mode of operation back to the first mode of operation.

Method Embodiment 8A. The communications method of Method Embodiment 8, further comprising: setting, by the cable modem, a power saving timer to expire after a first time value equal to said first time period prior to or upon entering said power saving mode of operation.

Method Embodiment 8B. The communications method of Method Embodiment 8A, wherein the expiration of said power saving timer causes the cable modem to switch from said power saving mode of operation to the first mode of operation.

Method Embodiment 9. The communications method of Method Embodiment 8, further comprising: upon switching from power savings mode of operation to said first mode of operation, turning power on to: (i) the one or more cable modem transmitters for which power was turned off, and (ii)) the one or more cable mode receivers for which the power was turned off.

Method Embodiment 10. The communications method of Method Embodiment 9, further comprising: after turning on power to the one or more transmitters and one or more receivers, transmitting a message to the cable modem termination system indicating the cable modem termination system is to send data to the cable modem; after turning on power to the one or more transmitters and one or more receivers, transmitting a message to the wireless base station indicating the wireless base station is to send data to the cable modem.

Method Embodiment 11. The communications method of Method Embodiment 1, further comprising: determining, by the cable modem, the first time period based on at least one of the wireless base station buffer information or the cable modem termination system buffer information.

Method Embodiment 11A. The communications method of Method Embodiment 11, wherein said determining, by the cable modem, the first time period based on at least one of the wireless base station buffer information or the cable modem termination system buffer information includes: determining, by the cable modem, the first time period to be less than the smaller of: (i) an amount of time for a wireless base station uplink buffer used for storing uplink data to be transmitted to the cable modem to fill up or reach its capacity or (ii) an amount of time for the cable modem termination system downlink buffer used for storing downlink data to be transmitted to the cable modem to fill up or reach its capacity.

Method Embodiment 12. The communications method of Method Embodiment 1, further comprising: receiving a first message by the cable modem from the cable modem termination system instructing the cable modem to reduce power consumption; and in response to receiving the first message from the cable modem termination system instructing the cable modem to reduce power consumption, increasing, by the cable modem, the buffer size of at least one of: (i) the cable modem downlink buffer, or (ii) the cable modem uplink buffer.

Method Embodiment 13. The communications method of Method Embodiment 12, further comprising: instructing the wireless base station to increase a size of a wireless base station uplink buffer included in the wireless base station when said cable modem increases the buffer size of the cable modem uplink buffer.

Method Embodiment 13A. The communications method of Method Embodiment 13, wherein the step of instructing the wireless base station to increase the size of the wireless base station uplink buffer included in the wireless base station includes instructing the wireless base station to increase the size of the wireless base station uplink buffer by an amount: (i) equal to the increase of the size of the cable modem uplink buffer or (ii) equal to or greater than the increase of the size of the cable modem uplink buffer.

Method Embodiment 14. The communications method of Method Embodiment 13, further comprising: instructing the cable modem termination system to increase a size of a cable modem termination system downlink buffer included in the cable modem termination system used for storing data to be communicated to the cable modem when said cable modem increases the buffer size of the cable modem downlink buffer.

Method Embodiment 14A. The communications method of Method Embodiment 13, wherein the step of instructing the cable modem termination system to increase the size of the cable modem termination system downlink buffer includes: instructing the cable modem termination system to increase the size of the cable modem termination system downlink buffer by an amount: (i) equal to the increase of the size of the cable modem uplink buffer or (ii) equal to the increase of the size of the cable modem uplink buffer.

Method Embodiment 15. The communications method of Method Embodiment 14, further comprising: after the cable modem performs the operation of increasing the buffer size of at least one of: (i) the cable modem downlink buffer, or (ii) the cable modem uplink buffer, switching, by the cable modem, from the first mode of operation to the second mode of operation after performing one or both of: (i) transmitting uplink data to the cable modem termination system, and (ii) transmitting downlink data to the wireless base station; remaining in said power savings mode of operation for a second time period, said second time period being based on at least one of: (i) the size of the cable modem termination system downlink buffer or (ii) the size of the wireless base station uplink buffer, said second time period being longer than said first time period.

Method Embodiment 16. The communications method of Method Embodiment 14, further comprising: after the cable modem performs the operation of increasing the buffer size of at least one of: (i) the cable modem downlink buffer, or (ii) the cable modem uplink buffer, switching, by the cable modem, from the first mode of operation to the second mode of operation after performing one or both of: (i) transmitting uplink data to the cable modem termination system, and (ii) transmitting downlink data to the wireless base station; remaining in said power savings mode of operation for a second time period, said second time period being based on at least one of: (i) the size of the cable modem uplink buffer or (ii) the size of the cable modem downlink buffer, said second time period being longer than said first time period.

List of First Set of Exemplary Numbered Apparatus Embodiments

Apparatus Embodiment 1. A cable modem comprising: a memory, said memory including an uplink buffer and a downlink buffer; and a processor that controls the cable modem to perform the following operations: receiving a message by a cable modem from a cable modem termination system instructing the cable modem to reduce power consumption; in response to receiving the message from the cable modem termination system instructing the cable modem to reduce power consumption, increasing, by the cable modem, a buffer size of at least one of: (i) a cable modem downlink buffer included in the cable modem, or (ii) a cable modem uplink buffer included in the cable modem; and switching, by the cable modem, from a first mode of operation to a second mode of operation after performing one or both of: (i) transmitting uplink data to the cable modem termination system, and (ii) transmitting downlink data to a wireless base station, said second mode of operation being a power savings modem of operation.

Apparatus Embodiment 2. The cable modem of Apparatus Embodiment 1, wherein the processor further controls the cable modem to perform the following additional operation: remaining in said power savings mode of operation for a first time period, said first time period being based on at least one of cable modem termination system buffer information or wireless base station buffer information.

Apparatus Embodiment 3. The cable modem of Apparatus Embodiment 2, wherein the cable modem is positioned between the cable modem termination system and the wireless base station; wherein the cable modem uplink data buffer is used by the cable modem for storing uplink data received from the wireless base station; and wherein the cable modem downlink data buffer is used by the cable modem for storing downlink data received from the cable modem termination system.

Apparatus Embodiment 4. The cable modem of Apparatus Embodiment 3, wherein the processor further controls the cable modem to perform the following additional operations: receiving, by the cable modem, said cable modem termination system buffer information from the cable modem termination system; and receiving, by the cable modem, said wireless base station buffer information from the wireless base station.

Apparatus Embodiment 5. The cable modem of Apparatus Embodiment 1, wherein the processor further controls the cable modem to perform the following additional operation: instructing the wireless base station to increase a size of a wireless base station uplink buffer included in the wireless base station when said cable modem increases the buffer size of the cable modem uplink buffer.

Apparatus Embodiment 5A. The cable modem of Apparatus Embodiment 2, wherein prior to increasing the cable modem uplink buffer size, the processor further controls the cable modem to perform the following additional operation: determining, by the cable modem, whether or not to instruct the wireless base station to increase a size of a wireless base station uplink buffer included in the wireless base station.

Apparatus Embodiment 5B. The cable modem of Apparatus Embodiment 5A, wherein said operation of determining, by the cable modem, whether or not to instruct the wireless base station to increase the size of the wireless base station uplink buffer included in the wireless base station is based on: (i) said wireless base station buffer information, (ii) the size of the cable modem uplink buffer, and (ii) the amount by which the cable modem uplink buffer size is to be increased.

Apparatus Embodiment 5C. The cable modem of Apparatus Embodiment 5B, wherein the processor further controls the cable modem to perform the following additional operations: determining to instruct the wireless base station to increase the size of the wireless base station uplink buffer included in the wireless base station when the size of the cable modem uplink buffer plus the amount by which the cable modem uplink buffer size is to be increased is greater than uplink size threshold value; and transmitting to the wireless base station a message indicating the wireless base station is to increase the size of the wireless base station uplink buffer after determining the size of the cable modem uplink buffer plus the amount by which the cable modem uplink buffer size is to be increased is greater than uplink size threshold value.

Apparatus Embodiment 5D. The cable modem of Apparatus Embodiment 5C, wherein the uplink size threshold value is a value equal to or greater than the wireless base station uplink buffer size (e.g., if the cable modem uplink buffer size is increased to a value which is greater than the wireless base station uplink buffer size the wireless base station will need to increase it buffer size so that the cable modem can turn off for a longer duration of time to obtain a greater amount of power savings).

Apparatus Embodiment 5E. The cable modem of Apparatus Embodiment 5D, wherein the step of instructing the wireless base station to increase the size of the wireless base station uplink buffer included in the wireless base station includes instructing the wireless base station to increase the size of the wireless base station uplink buffer by an amount equal to or greater than the increase of the size of the cable modem uplink buffer.

Apparatus Embodiment 6. The cable modem of Apparatus Embodiment 5, wherein the step of instructing the wireless base station to increase the size of the wireless base station uplink buffer included in the wireless base station includes instructing the wireless base station to increase the size of the wireless base station uplink buffer by an amount equal to or greater than the increase of the size of the cable modem uplink buffer.

Apparatus Embodiment 7. The cable modem of Apparatus Embodiment 5, wherein the processor further controls the cable modem to perform the following additional operation: instructing the cable modem termination system to increase a size of a cable modem termination system downlink buffer included in the cable modem termination system used for storing data to be communicated to the cable modem when said cable modem increases the buffer size of the cable modem downlink buffer.

Apparatus Embodiment 7A. The cable modem of Apparatus Embodiment 5, wherein prior to increasing the cable modem downlink buffer size, the processor further controls the cable modem perform the additional operation of: determining, by the cable modem, whether or not to instruct the cable modem termination system to increase a size of a cable modem downlink buffer included in the cable modem termination system.

Apparatus Embodiment 7B. The cable modem of Apparatus Embodiment 7A, wherein said operation of determining, by the cable modem, whether or not to instruct the cable modem termination system to increase the size of the wireless base station uplink buffer included in the wireless base station is based on: (i) said cable modem termination system buffer information, (ii) the size of the cable modem downlink buffer, and (ii) the amount by which the cable modem downlink buffer size is to be increased.

Apparatus Embodiment 7C. The cable modem of Apparatus Embodiment 7B, wherein the processor further controls the cable modem to perform the additional operations of: determining to instruct the cable modem termination system to increase the size of the cable modem termination downlink buffer included in the cable modem termination system when the size of the cable modem downlink buffer plus the amount by which the cable modem downlink buffer size is to be increased is greater than a downlink size threshold value; and transmitting to the cable modem termination system a message indicating the cable modem termination system is to increase the size of the cable modem downlink buffer used for storing data to be transmitted to the cable modem after determining by the cable modem that the size of the cable modem downlink buffer plus the amount by which the cable modem downlink buffer size is to be increased is greater than a downlink size threshold value.

Apparatus Embodiment 7D. The cable modem of Apparatus Embodiment 7C, wherein the downlink size threshold value is a value equal to or greater than the wireless base station downlink buffer size (e.g., if the cable modem downlink buffer size is increased to a value which is greater than the cable modem termination system downlink buffer size for the cable modem termination system downlink buffer used to store downlink data to be transmitted to the cable modem, the cable modem termination system will need to increase its buffer size so that the cable modem can turn off for a longer duration of time to obtain a greater amount of power savings).

Apparatus Embodiment 7E. The cable modem of Apparatus Embodiment 7D, wherein the operation of instructing the cable modem termination system to increase the size of the cable modem termination system downlink buffer included in the cable modem termination system includes instructing the cable modem termination system to increase the size of the cable modem termination system downlink buffer used for storing downlink data to be transmitted to the cable modem by an amount equal to or greater than the increase of the size of the cable modem downlink buffer.

Apparatus Embodiment 8. The cable modem of Apparatus Embodiment 7, wherein the operation of instructing the cable modem termination system to increase the size of the cable modem termination system downlink buffer included in the cable modem termination system includes instructing the cable modem termination system to increase the size of the cable modem termination system downlink buffer used for storing downlink data to be transmitted to the cable modem by an amount equal to or greater than the increase of the size of the cable modem downlink buffer.

Apparatus Embodiment 9. The cable modem of Apparatus Embodiment 2, wherein the processor further controls the cable modem to perform the additional operation of: determining the first period of time based on: (i) at least one of: the cable modem termination system buffer information or the wireless base station buffer information; and (ii) at least one of: (a) an amount of delay introduced into an uplink data traffic by the cable modem remaining in the power savings mode of operation for the first period of time, or (b) an amount of delay introduced into a downlink data traffic by the cable modem remaining in the power savings mode of operation for the first period of time (e.g., a threshold limit on the amount of delay which may be introduced by the cable modem turning off during a power saving mode of operation may be set by the operator so that a specific level of quality of service may be met for subscribers being serviced by the cable modem.)

Apparatus Embodiment 9A. The cable modem of Apparatus Embodiment 9, wherein said operation of determining the first period of time is further based on at least one of the following: a type of data being transmitted in the uplink data traffic or the type of data being transmitted in the downlink data traffic. (e.g., whether the data passing through the cable modem is uplink dominated data traffic type, downlink dominated data traffic type, balanced uplink and downlink data traffic type, sensor data type can be used to in determining the first period of time as it may and in many instances will also be a determining factor in what the quality/level of service that is acceptable to a subscriber being serviced by a cable modem.)

Apparatus Embodiment 10. The cable modem of Apparatus Embodiment 1, wherein the processor further controls the cable modem to perform the following additional operation: upon switching to said power savings mode of operation, turning off power by said cable modem to one or more cable modem transmitters included in said cable modem.

Apparatus Embodiment 11. The cable modem of Apparatus Embodiment 10, wherein the processor further controls the cable modem to perform the following additional operation: upon switching to said power savings mode of operation, turning off power by said cable modem to one or more cable modem receivers included in said cable modem.

List of Second Set of Exemplary Numbered
Apparatus Embodiments

Apparatus Embodiment 1. A cable modem comprising: a memory, said memory including an uplink buffer and a downlink buffer; and a processor that controls the cable modem to perform the following operations: receiving cable modem termination system buffer information, said cable modem being positioned between a cable modem termination system and a wireless base station; receiving wireless base station buffer information; switching from a first mode of operation to a second mode of operation after performing one or both of: (i) transmitting uplink data to the cable modem termination system, and (ii) transmitting downlink data to the wireless base station, said second mode of operation being a power savings modem of operation; remaining in said power savings mode of operation for a first time period, said first time period being based on at least one of said cable modem termination system buffer information or said wireless base station buffer information.

Apparatus Embodiment 1A. The cable modem of Apparatus Embodiment 1, wherein the wireless base station is part of a wireless network operated by a first service provider; wherein the cable modem is part of a cable network operated by the first service provider; and wherein the cable modem termination system is part of the cable network operated by the first service provider.

Apparatus Embodiment 1AA. The cable modem of Apparatus Embodiment 1, wherein the wireless base station is a Citizens Broadband Service Device (CBSD) and the wireless network is Citizens Broadband Radio Service (CBRS) network.

Apparatus Embodiment 1B. The cable modem of Apparatus Embodiment 1, wherein the cable modem is powered by the cable modem termination system.

Apparatus Embodiment 1BB. The cable mode of Apparatus Embodiment 1B, wherein the wireless base station is powered by the cable modem termination system via the cable modem.

Apparatus Embodiment 1C. The cable modem of Apparatus Embodiment 1, wherein the processor further controls the cable modem to perform the following additional operation: receiving power by the cable modem from the cable modem termination system over a first cable connecting the cable modem termination system and the cable modem, said first cable also being used for communicating messages between the cable modem termination system and the cable modem.

Apparatus Embodiment 1CC. The cable modem of Apparatus Embodiment 1C, wherein the processor further controls the cable modem to perform the following additional operation: providing power by the cable modem to the wireless base station over a second cable connecting the cable modem to the wireless base station, said second cable also being used for communicating messages between the cable modem and the wireless base station.

Apparatus Embodiment 1E. The cable modem of Apparatus Embodiment 1BB or 1CC, wherein power is provided by the cable modem termination system to the cable modem using power over Ethernet; and wherein power is provided by the cable modem to the wireless base station using power over Ethernet.

Apparatus Embodiment 2. The cable modem of Apparatus Embodiment 1, wherein the cable modem termination system buffer information includes a first downlink buffer size value expressed as an amount of time (e.g., an amount of time it takes for the cable modem termination system downlink buffer for the cable modem to fill up to its capacity); wherein the wireless base station buffer information includes a first uplink buffer size value expressed as an amount of time (e.g., an amount of time it takes for the wireless base station uplink buffer to fill up to its capacity).

Apparatus Embodiment 3. The cable modem of Apparatus Embodiment 1, wherein the processor further controls the cable modem to perform the additional operations of: receiving, by the cable modem, while said cable modem is in said first mode of operation downlink data from the cable modem termination system; storing the received downlink data at the cable modem in a cable modem downlink buffer; receiving, by the cable modem, while said cable mode is in said first mode of operation uplink data from the wireless base station; storing the received uplink data at the cable modem in a cable modem uplink buffer; and waiting until at least one of the following occurs: (i) the amount of data in the cable modem uplink buffer reaches a first threshold value, or (ii) the amount of data in the cable modem downlink buffer reaches a second threshold value, before transmitting either the stored downlink data or the stored uplink data.

Apparatus Embodiment 3A. The cable modem of Apparatus Embodiment 3, wherein the first threshold value is an amount wherein 100% of all buffer entries in the cable modem uplink buffer are occupied (i.e., the buffer is full).

Apparatus Embodiment 3AA. The cable modem of Apparatus Embodiment 3, wherein the first threshold value is an amount less than 100% of all buffer entries in the cable modem uplink buffer being occupied.

Apparatus Embodiment 3AAA. The cable modem of Apparatus Embodiment 3, wherein the first threshold value is an amount wherein 95% of all buffer entries in the cable modem uplink buffer are occupied (i.e., 95% of the buffer's capacity has been utilized—this case allows for some spare capacity should it be necessary).

Apparatus Embodiment 3B. The cable modem of Apparatus Embodiment 3A, wherein the second threshold value is an amount wherein 100% of all buffer entries in the cable modem downlink buffer are occupied (i.e., the buffer is full).

Apparatus Embodiment 3BB. The cable modem of Apparatus Embodiment 3AA, wherein the second threshold value is an amount less than 100% of all buffer entries in the cable modem uplink buffer being occupied (e.g., the buffer is full and receipt of additional data will cause it to overflow).

Apparatus Embodiment 3BBB. The cable modem of Apparatus Embodiment 3, wherein the second threshold value is an amount wherein 95% of all buffer entries in the cable modem uplink buffer are occupied (i.e., 95% of the buffer's capacity has been utilized—this case allows for some spare capacity should it be necessary).

Apparatus Embodiment 5. The cable modem of Apparatus Embodiment 1, wherein the processor further controls the cable modem to perform the following additional operation upon switching to said power savings mode of operation: turning off power by said cable modem to one or more cable modem transmitters included in said cable modem.

Apparatus Embodiment 6. The cable modem of Apparatus Embodiment 5, wherein the processor further controls the cable modem to perform the following additional operation upon switching to said power savings mode of operation: turning off power by said cable modem to one or more cable modem receivers included in said cable modem.

Apparatus Embodiment 6A. The cable modem of Apparatus Embodiment 6, wherein the switching, by the cable modem, from the first mode of operation to the second mode of operation occurs after performing both of: (i) transmitting uplink data to the cable modem termination system, and (ii)

transmitting downlink data to the wireless base station, said second mode of operation being a power savings modem of operation.

Apparatus Embodiment 6AA. The cable modem of Apparatus Embodiment 6AA, wherein said turning off power by said cable modem to one or more cable modem transmitters included in said cable modem includes turning off power to all transmitters included in said cable modem; wherein said turning off power by said cable modem to one or more cable modem receivers included in said cable modem includes turning off power to all receivers included in said cable modem.

Apparatus Embodiment 7. The cable modem of Apparatus Embodiment 6, wherein prior to turning off said one or more cable modem transmitters, the processor further controls the cable modem to perform the following additional operations: (i) transmitting by the cable modem a first message to the wireless base station indicating that data is not to be sent by the wireless base station to the cable modem; and (ii) transmitting a second message to the cable modem termination system indicating that data is not to be sent by the cable modem termination system to the cable modem.

Apparatus Embodiment 8. The cable modem of Apparatus Embodiment 7, wherein after the cable modem has remained in the power savings mode of operation for the first time period, the processor further controls the cable modem to perform the following additional operation: switching by the cable modem from the power savings mode of operation back to the first mode of operation.

Apparatus Embodiment 8A. The cable modem of Apparatus Embodiment 8, wherein the processor further controls the cable modem to perform the following additional operation: setting, by the cable modem, a power saving timer to expire after a first time value equal to said first time period prior to or upon entering said power saving mode of operation.

Apparatus Embodiment 8B. The cable modem of Apparatus Embodiment 8A, wherein the expiration of said power saving timer causes the cable modem to switch from said power saving mode of operation to the first mode of operation.

Apparatus Embodiment 9. The cable modem of Apparatus Embodiment 8, wherein the processor further controls the cable modem upon switching from power savings mode of operation to said first mode of operation to perform the following additional operation: turning power on to: (i) the one or more cable modem transmitters for which power was turned off, and (ii)) the one or more cable mode receivers for which the power was turned off.

Apparatus Embodiment 10. The cable modem of Apparatus Embodiment 9, wherein after turning on power to the one or more transmitters and one or more receivers, the processor further controls the cable modem to perform the following additional operations: transmitting a message to the cable modem termination system indicating the cable modem termination system is to send data to the cable modem; and transmitting a message to the wireless base station indicating the wireless base station is to send data to the cable modem.

Apparatus Embodiment 11. The cable modem of Apparatus Embodiment 1, wherein the processor further controls the cable modem to perform the following additional operation: determining, by the cable modem, the first time period based on at least one of the wireless base station buffer information or the cable modem termination system buffer information.

Apparatus Embodiment 11A. The cable modem of Apparatus Embodiment 12, wherein said determining, by the cable modem, the first time period based on at least one of the wireless base station buffer information or the cable modem termination system buffer information includes: determining, by the cable modem, the first time period to be less than the smaller of: (i) an amount of time for a wireless base station uplink buffer used for storing uplink data to be transmitted to the cable modem to fill up or reach its capacity or (ii) an amount of time for the cable modem termination system downlink buffer used for storing downlink data to be transmitted to the cable modem to fill up or reach its capacity.

Apparatus Embodiment 12. The cable modem of Apparatus Embodiment 1, wherein the processor further controls the cable modem to perform the following additional operation: receiving a first message by the cable modem from the cable modem termination system instructing the cable modem to reduce power consumption; and in response to receiving the first message from the cable modem termination system instructing the cable modem to reduce power consumption, increasing, by the cable modem, the buffer size of at least one of: (i) the cable modem downlink buffer, or (ii) the cable modem uplink buffer.

Apparatus Embodiment 13. The cable modem of Apparatus Embodiment 12, wherein the processor further controls the cable modem to perform the following additional operation instructing the wireless base station to increase a size of a wireless base station uplink buffer included in the wireless base station when said cable modem increases the buffer size of the cable modem uplink buffer.

Apparatus Embodiment 13A. The cable modem of Apparatus Embodiment 13, wherein the operation of instructing the wireless base station to increase the size of the wireless base station uplink buffer included in the wireless base station includes instructing the wireless base station to increase the size of the wireless base station uplink buffer by an amount: (i) equal to the increase of the size of the cable modem uplink buffer or (ii) equal to or greater than the increase of the size of the cable modem uplink buffer.

Apparatus Embodiment 14. The cable modem of Apparatus Embodiment 13, wherein the processor further controls the cable modem to perform the following additional operation: instructing the cable modem termination system to increase a size of a cable modem termination system downlink buffer included in the cable modem termination system used for storing data to be communicated to the cable modem when said cable modem increases the buffer size of the cable modem downlink buffer.

Apparatus Embodiment 14A. The cable modem of Apparatus Embodiment 13, wherein the operation of instructing the cable modem termination system to increase the size of the cable modem termination system downlink buffer includes: instructing the cable modem termination system to increase the size of the cable modem termination system downlink buffer by an amount: (i) equal to the increase of the size of the cable modem uplink buffer or (ii) equal to the increase of the size of the cable modem uplink buffer.

Apparatus Embodiment 15. The cable modem of Apparatus Embodiment 14, wherein the processor further controls the cable modem to perform the following additional operation: after the cable modem performs the operation of increasing the buffer size of at least one of: (i) the cable modem downlink buffer, or (ii) the cable modem uplink buffer, switching, by the cable modem, from the first mode of operation to the second mode of operation after performing one or both of: (i) transmitting uplink data to the cable modem termination system, and (ii) transmitting downlink data to the wireless base station; remaining in said power savings mode of operation for a second time period, said second time period being based on at least one of: (i) the size of the cable modem termination system downlink buffer or (ii) the size of the wireless base station uplink buffer, said second time period being longer than said first time period.

Apparatus Embodiment 16. The cable modem of Apparatus Embodiment 14, wherein the processor further controls the cable modem to perform the following additional operation: after the cable modem performs the operation of increasing the buffer size of at least one of: (i) the cable modem downlink buffer, or (ii) the cable modem uplink buffer, switching, by the cable modem, from the first mode of operation to the second mode of operation after performing one or both of: (i) transmitting uplink data to the cable modem termination system, and (ii) transmitting downlink data to the wireless base station; remaining in said power savings mode of operation for a second time period, said second time period being based on at least one of: (i) the size of the cable modem uplink buffer or (ii) the size of the cable modem downlink buffer, said second time period being longer than said first time period.

List of First Set of Exemplary Numbered Non-Transitory Computer Readable Medium Embodiments Non-transitory Computer Readable Medium Embodiment 1. A non-transitory computer readable medium including a first set of computer executable instructions which when executed by a processor of a cable modem cause the cable modem to perform the steps of: receiving a message by a cable modem from a cable modem termination system instructing the cable modem to reduce power consumption; in response to receiving the message from the cable modem termination system instructing the cable modem to reduce power consumption, increasing, by the cable modem, a buffer size of at least one of: (i) a cable modem downlink buffer included in the cable modem, or (ii) a cable modem uplink buffer included in the cable modem; and switching, by the cable modem, from a first mode of operation to a second mode of operation after performing one or both of: (i) transmitting uplink data to the cable modem termination system, and (ii) transmitting downlink data to a wireless base station, said second mode of operation being a power savings modem of operation.

Non-transitory Computer Readable Medium Embodiment 2. The non-transitory computer readable medium of Non-transitory Computer Readable Medium Embodiment 1, wherein the first set of computer executable instructions which when executed by the processor of the cable modem further cause the cable modem to perform the additional step of: remaining in said power savings mode of operation for a first time period, said first time period being based on at least one of cable modem termination system buffer information or wireless base station buffer information.

List of Second Set of Exemplary Numbered Non-Transitory Computer Readable Medium Embodiments Non-transitory Computer Readable Medium Embodiment 1. A non-transitory computer readable medium including a first set of computer executable instructions which when executed by a processor of a cable modem cause the cable modem to perform the steps of: receiving cable modem termination system buffer information, said cable modem being positioned between a cable modem termination system and a wireless base station; receiving wireless base station buffer information; switching from a first mode of operation to a second mode of operation after performing one or both of: (i) transmitting uplink data to the cable modem termination system, and (ii) transmitting downlink data to the wireless base station, said second mode of operation being a power savings modem of operation; remaining in said power savings mode of operation for a first time period, said first time period being based on at least one of said cable termination system buffer information or said wireless base station buffer information.

Non-transitory Computer Readable Medium Embodiment 2. The Non-transitory Computer Readable Medium of Non-transitory Computer Readable Medium Embodiment 1, wherein the cable modem is powered by the cable modem termination system.

Non-transitory Computer Readable Medium Embodiment 3. The Non-transitory Computer Readable Medium of Non-transitory Computer Readable Medium Embodiment 2, wherein the wireless base station is powered by the cable modem termination system via the cable modem.

Non-transitory Computer Readable Medium Embodiment 4. The Non-transitory Computer Readable Medium of Non-transitory Computer Readable Medium Embodiment 1, wherein the first set of computer executable instructions which when executed by the processor of the cable modem cause the cable modem to perform the following additional step: receiving a first message by the cable modem from the cable modem termination system instructing the cable modem to reduce power consumption; and in response to receiving the first message from the cable modem termination system instructing the cable modem to reduce power consumption, increasing, by the cable modem, the buffer size of at least one of: (i) the cable modem downlink buffer, or (ii) the cable modem uplink buffer.

Non-transitory Computer Readable Medium Embodiment 5. The Non-transitory Computer Readable Medium of Non-transitory Computer Readable Medium Embodiment 4, wherein the first set of computer executable instructions which when executed by the processor of the cable modem cause the cable modem to perform the following additional step of: instructing the wireless base station to increase a size of a wireless base station uplink buffer included in the wireless base station when said cable modem increases the buffer size of the cable modem uplink buffer.

Non-transitory Computer Readable Medium Embodiment 5A. The Non-transitory Computer Readable Medium of Non-transitory Computer Readable Medium Embodiment 5, wherein the step of instructing the wireless base station to increase the size of the wireless base station uplink buffer included in the wireless base station includes instructing the wireless base station to increase the size of the wireless base station uplink buffer by an amount: (i) equal to the increase of the size of the cable modem uplink buffer or (ii) equal to or greater than the increase of the size of the cable modem uplink buffer.

Non-transitory Computer Readable Medium Embodiment 6. The Non-transitory Computer Readable Medium of Non-transitory Computer Readable Medium Embodiment 5, wherein the first set of computer executable instructions which when executed by the processor of the cable modem cause the cable modem to perform the following additional step of: instructing the cable modem termination system to increase a size of a cable modem termination system downlink buffer included in the cable modem termination system used for storing data to be communicated to the cable modem when said cable modem increases the buffer size of the cable modem downlink buffer.

Non-transitory Computer Readable Medium Embodiment 6A. The Non-transitory Computer Readable Medium of Non-transitory Computer Readable Medium Embodiment 5, wherein the step of instructing the cable modem termination system to increase the size of the cable modem termination system downlink buffer includes: instructing the cable modem termination system to increase the size of the cable modem termination system downlink buffer by an amount: (i) equal to the increase of the size of the cable modem uplink buffer or (ii) equal to the increase of the size of the cable modem uplink buffer.

Non-transitory Computer Readable Medium Embodiment 7. The Non-transitory Computer Readable Medium of Non-transitory Computer Readable Medium Embodiment 6, wherein the first set of computer executable instructions which when executed by the processor of the cable modem cause the cable modem to perform the following additional step of: after the cable modem performs the operation of increasing the buffer size of at least one of: (i) the cable modem downlink buffer, or (ii) the cable modem uplink buffer, switching, by the cable modem, from the first mode of operation to the second mode of operation after performing one or both of: (i) transmitting uplink data to the cable modem termination system, and (ii) transmitting downlink data to the wireless base station; remaining in said power savings mode of operation for a second time period, said second time period being based on at least one of: (i) the size of the cable modem termination system downlink buffer or (ii) the size of the wireless base station uplink buffer, said second time period being longer than said first time period.

Non-transitory Computer Readable Medium Embodiment 8. The Non-transitory Computer Readable Medium of Non-transitory Computer Readable Medium Embodiment 6, wherein the first set of computer executable instructions which when executed by the processor of the cable modem cause the cable modem to perform the following additional step of: after the cable modem performs the operation of increasing the buffer size of at least one of: (i) the cable modem downlink buffer, or (ii) the cable modem uplink buffer, switching, by the cable modem, from the first mode of operation to the second mode of operation after performing one or both of: (i) transmitting uplink data to the cable modem termination system, and (ii) transmitting downlink data to the wireless base station; remaining in said power savings mode of operation for a second time period, said second time period being based on at least one of: (i) the size of the cable modem uplink buffer or (ii) the size of the cable modem downlink buffer, said second time period being longer than said first time period.

The techniques of various embodiments may be implemented using software, hardware and/or a combination of software and hardware. Various embodiments are directed to apparatus, e.g., cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements. Various embodiments are also directed to methods, e.g., method of controlling and/or operating cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments devices, e.g., cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements described herein are implemented using one or more components to perform the steps corresponding to one or more methods, for example, generating or creating buffers, implementing timers, connections, message reception, message transmission, powering on and off receivers, transmitters, and or transceivers, buffering data, flushing data from buffers, determining buffer sizes and amount of time for a buffer to fill to its capacity, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements are configured to perform the steps of the methods described as being performed by the cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements, with a processor which includes a component corresponding to each of the steps of the various described methods performed by the device in which the processor is included. In some but not all embodiments a device, e.g., cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of a method, e.g., a method of controlling a device, e.g., cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements, Session Management Function nodes/devices, subscriber devices, servers, nodes and/or elements. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method comprising:
   receiving, at a cable modem termination system (CMTS), cable modem power consumption information from a plurality of cable modems connected to the CMTS, the cable modem power consumption information received from an individual cable modem indicating an amount of power used by the individual cable modem to transmit all data from a fully occupied uplink buffer;
   receiving, at the CMTS, a first reduce power consumption command from a Cable Modem Termination System power management device; and
   determining, by the CMTS, based on the received cable modem power consumption information, to which of the plurality of cable modems to send a reduce power consumption message.

2. The communications method of claim 1,
   wherein said determining, by the CMTS, to which of the plurality of cable modems to send a reduce power consumption message is further based on an amount of delay introduced by increasing a size of an uplink buffer of the cable modem.

3. The communications method of claim 2,
   wherein the cable modem power consumption information received from an individual cable modem further indicates an amount of power used by the individual cable modem to transmit all data from a fully occupied downlink buffer to a wireless base station.

4. The communications method of claim 3,
   wherein said determining, by the CMTS, to which of the plurality of cable modems to send a reduce power consumption message is further based on an amount of delay introduced by increasing a size of a downlink buffer of the cable modem.

5. The communications method of claim 2,
wherein said determining, by the CMTS, to which of the plurality of cable modems to send a reduce power consumption message includes determining to send a reduce power consumption message to a first cable modem of the plurality of cable modems; and
wherein the communications method further comprises:
in response to receiving, at the CMTS, the first reduce power consumption command from the Cable Modem Termination System power management device, transmitting a first reduce power consumption message to the first cable modem.

6. The communications method of claim 5, further comprising:
in response to receiving the first reduce power consumption message at the first cable modem: (i) increasing, by the first cable modem, a buffer size of a cable modem uplink buffer included in the first cable modem; and (ii) transmitting, by the first cable modem, an instruction to a first wireless base station to increase an uplink buffer included in the first wireless base station for storing data to be transmitted to the cable modem by a size equal to or greater than the increase of the buffer size of the cable modem uplink buffer included in the first cable modem;
receiving uplink data, by the first cable modem, from the first wireless base station until said cable modem uplink buffer is fully occupied; and
switching, by the first cable modem, from a first mode of operation to a power savings mode of operation after transmitting all uplink data in the fully occupied cable modem uplink buffer to the CMTS, said power savings mode of operation including the first cable modem turning off power for one or more transmitters of the first cable modem for a first period of time.

7. The communications method of claim 6, further comprising:
prior to switching to the power savings mode of operation by the first cable modem, communicating a message to the first wireless base station to not send any data to the first cable modem.

8. The communications method of claim 7,
wherein the first cable modem is connected to the first wireless base station via an Ethernet cable, said Ethernet cable being used for exchanging messages between the first cable modem and the first wireless base station; and
wherein power is supplied by the first cable modem to the first wireless base station using Power over Ethernet.

9. The communications method of claim 7, further comprising:
after the first period of time, switching, by the first cable modem from the power savings mode of operation to the first mode of operation; and
upon switching, by the first cable modem, to the first mode of operation:
(i) turning on, by the first cable modem, the one or more transmitters which had been turned off;
(ii) communicating, by the first cable modem, a message to the first wireless base station indicating the first wireless base station is to flush the uplink buffer the first wireless base station uses for storing uplink data for the first cable modem; and
(iii) upon determining, by the first cable modem, that the uplink buffer in the first cable modem is fully occupied, (a) transmitting, by the first cable modem, all of the uplink data in the fully occupied uplink buffer to the CMTS, (b) transmitting, by the first cable modem, a do not send data message to the first wireless base station, and (c) switching, by the first cable modem, from the first mode of operation to the power savings mode of operation.

10. The communications method of claim 3,
wherein one or more of said plurality of cable modems connected to the CMTS, operate independently with respect to a power savings mode of operation for uplink traffic and downlink traffic.

11. A communications system comprising:
a cable modem termination system (CMTS), said CMTS including:
memory, and
a first processor, said first processor controlling the CMTS to perform the following operations:
receiving, at the CMTS, cable modem power consumption information from a plurality of cable modems connected to the CMTS, the cable modem power consumption information received from an individual cable modem indicating an amount of power used by the individual cable modem to transmit all data from a fully occupied uplink buffer;
receiving, at the CMTS, a first reduce power consumption command from a Cable Modem Termination System power management device; and
determining, by the CMTS, based on the received cable modem power consumption information, to which of the plurality of cable modems to send a reduce power consumption message.

12. The communications system of claim 11,
wherein said determining, by the CMTS, to which of the plurality of cable modems to send a reduce power consumption message is further based on an amount of delay introduced by increasing a size of an uplink buffer of the cable modem.

13. The communications system of claim 12,
wherein the cable modem power consumption information received from an individual cable modem further indicates an amount of power used by the individual cable modem to transmit all data from a fully occupied downlink buffer to a wireless base station.

14. The communications system of claim 13,
wherein said determining, by the CMTS, to which of the plurality of cable modems to send a reduce power consumption message is further based on an amount of delay introduced by increasing a size of a downlink buffer of the cable modem.

15. The communications system of claim 12,
wherein said determining, by the CMTS, to which of the plurality of cable modems to send a reduce power consumption message includes determining to send a reduce power consumption message to a first cable modem of the plurality of cable modems; and
wherein the first processor further controls the CMTS to perform the following additional operation:
in response to receiving, at the CMTS, the first reduce power consumption command from the Cable Modem Termination System power management device, transmitting a first reduce power consumption message to the first cable modem.

16. The communications system of claim 15, wherein the first cable modem includes memory and a second processor, said second processor controlling the first cable modem to perform the following operations:
  in response to receiving the first reduce power consumption message at the first cable modem: (i) increasing, by the first cable modem, a buffer size of a cable modem uplink buffer included in the first cable modem; and (ii) transmitting, by the first cable modem, an instruction to a first wireless base station to increase an uplink buffer included in the first wireless base station for storing data to be transmitted to the first cable modem by a size equal to or greater than the increase of the buffer size of the cable modem uplink buffer included in the first cable modem;
  receiving uplink data, by the first cable modem, from the first wireless base station data until said cable modem uplink buffer is fully occupied; and
  switching, by the first cable modem, from a first mode of operation to a power savings mode of operation after transmitting all uplink data in the fully occupied cable modem uplink buffer to the CMTS, said power savings mode of operation including the first cable modem turning off power for one or more transmitters of the first cable modem for a first period of time.

17. The communications system of claim 16,
  wherein the first cable modem is connected to the first wireless base station via an Ethernet cable, said Ethernet cable being used for exchanging messages between the first cable modem and the first wireless base station; and
  wherein power is supplied by the first cable modem to the first wireless base station using Power over Ethernet.

18. The communications system of claim 13,
  wherein a first cable modem of the plurality of cable modems operates independently with respect to a power savings mode of operation for uplink traffic and downlink traffic.

19. The communications system of claim 18,
  wherein an amount of time the first cable modem operates in a power savings mode of operation for uplink traffic is dependent on a size of an uplink buffer included in the first cable modem; and
  wherein an amount of time the first cable modem operates in a power savings mode of operation for downlink traffic is dependent on a size of a downlink buffer included in the first cable modem.

20. A non-transitory computer readable medium including a first set of computer executable instructions which when executed by a processor of a cable modem termination system (CMTS) cause the CMTS to perform the steps of:
  receiving, at the CMTS, cable modem power consumption information from a plurality of cable modems connected to the CMTS, the cable modem power consumption information received from an individual cable modem indicating an amount of power used by the individual cable modem to transmit all data from a fully occupied uplink buffer;
  receiving, at the CMTS, a first reduce power consumption command from a Cable Modem Termination System power management device; and
  determining, by the CMTS, based on the received cable modem power consumption information, to which of the plurality of cable modems to send a reduce power consumption message.

* * * * *